United States Patent
Glommen et al.

(10) Patent No.: US 11,870,841 B2
(45) Date of Patent: Jan. 9, 2024

(54) SYSTEM AND METHOD FOR CONSTRUCTING CONTENT SITE VISITOR PROFILES

(71) Applicant: TEALIUM INC., San Diego, CA (US)

(72) Inventors: Charles Glommen, Oceanside, CA (US); Larry Xu, San Diego, CA (US); Michael Anderson, Carlsbad, CA (US)

(73) Assignee: TEALIUM INC., San Diego, CA (US)

( * ) Notice: Subject to any disclaimer, the term of this patent is extended or adjusted under 35 U.S.C. 154(b) by 0 days.

(21) Appl. No.: 17/970,919

(22) Filed: Oct. 21, 2022

(65) Prior Publication Data
US 2023/0156073 A1   May 18, 2023

Related U.S. Application Data

(63) Continuation of application No. 17/091,441, filed on Nov. 6, 2020, now Pat. No. 11,483,378, which is a
(Continued)

(51) Int. Cl.
| | |
|---|---|
| *G06F 15/16* | (2006.01) |
| *H04L 67/10* | (2022.01) |
| *G06F 16/335* | (2019.01) |
| *H04L 67/01* | (2022.01) |
| *H04L 67/50* | (2022.01) |
| *H04L 67/306* | (2022.01) |
| *H04L 67/146* | (2022.01) |

(52) U.S. Cl.
CPC ............ *H04L 67/10* (2013.01); *G06F 16/337* (2019.01); *H04L 67/01* (2022.05); *H04L 67/146* (2013.01); *H04L 67/306* (2013.01); *H04L 67/535* (2022.05)

(58) Field of Classification Search
CPC ....... H04L 67/10; H04L 67/01; H04L 67/146; H04L 67/306; H04L 67/535; G06F 16/337
See application file for complete search history.

(56) References Cited

U.S. PATENT DOCUMENTS

| | | | |
|---|---|---|---|
| 6,067,565 | A | 5/2000 | Horvitz |
| 6,553,393 | B1 | 4/2003 | Eilbott |
(Continued)

FOREIGN PATENT DOCUMENTS

| | | |
|---|---|---|
| CN | 102693501 A | 9/2012 |
| WO | WO 2009/009109 | 1/2009 |
(Continued)

OTHER PUBLICATIONS

Access your campaign report in Google Analytics, http://help.campaignmonitor.com/topic.aspx?t=112, retrieved on Feb. 10, 2014, in 5 pages.
(Continued)

*Primary Examiner* — John B Walsh
(74) *Attorney, Agent, or Firm* — Knobbe, Martens, Olson and Bear LLP

(57) ABSTRACT

Embodiments of the systems described herein can implement one or more visitor stitching processes. Visitor stitching can include, among other things, one or more processes by which multiple visitors that may appear distinctly independent may be merged into a new single united visitor profile due to the leveraging of one or more unique persistent identifiers.

20 Claims, 35 Drawing Sheets

Related U.S. Application Data continuation of application No. 16/250,948, filed on Jan. 17, 2019, now Pat. No. 10,834,175, which is a continuation of application No. 15/698,023, filed on Sep. 7, 2017, now Pat. No. 10,187,456, which is a continuation of application No. 15/166,111, filed on May 26, 2016, now Pat. No. 9,769,252, which is a continuation of application No. 14/456,289, filed on Aug. 11, 2014, now Pat. No. 9,357,023, which is a continuation of application No. 14/216,801, filed on Mar. 17, 2014, now Pat. No. 8,805,946.

(60) Provisional application No. 61/939,972, filed on Feb. 14, 2014, provisional application No. 61/900,274, filed on Nov. 5, 2013, provisional application No. 61/896,351, filed on Oct. 28, 2013, provisional application No. 61/889,876, filed on Oct. 11, 2013, provisional application No. 61/872,530, filed on Aug. 30, 2013.

(56) References Cited

U.S. PATENT DOCUMENTS

| | | |
|---|---|---|
| 6,553,461 B1 | 4/2003 | Gupta |
| 6,836,799 B1 | 12/2004 | Philyaw et al. |
| 7,117,429 B2 | 10/2006 | Vedullapalli |
| 7,669,183 B2 | 2/2010 | Bowman |
| 7,685,168 B2 | 3/2010 | Koinuma et al. |
| 7,685,200 B2 | 3/2010 | Gunawardena et al. |
| 7,805,670 B2 | 9/2010 | Lipton et al. |
| 7,823,059 B2 | 10/2010 | Hodgkinson |
| 7,890,461 B2 | 2/2011 | Oeda et al. |
| 7,908,336 B2 | 3/2011 | Carlson et al. |
| 7,992,135 B1 | 8/2011 | Wong et al. |
| 8,010,890 B2 | 8/2011 | Gumz et al. |
| 8,019,777 B2 | 9/2011 | Hauser |
| 8,131,861 B2 | 3/2012 | Butler et al. |
| 8,185,610 B2 | 5/2012 | Goff |
| 8,316,188 B2 | 11/2012 | Kadambi et al. |
| 8,375,319 B2 | 2/2013 | Decker et al. |
| 8,407,321 B2 | 3/2013 | Mickens et al. |
| 8,413,046 B1 | 4/2013 | Mocanu |
| 8,429,243 B1 | 4/2013 | Wang et al. |
| 8,539,345 B2 | 9/2013 | Appleyard et al. |
| 8,560,610 B2 | 10/2013 | Lunt et al. |
| 8,566,696 B1 | 10/2013 | Hamon |
| 8,682,964 B1 | 3/2014 | Brundage |
| 8,744,988 B1 | 6/2014 | Hamon |
| 8,805,946 B1 | 8/2014 | Glommen et al. |
| 8,843,827 B2 | 9/2014 | Koo et al. |
| 8,904,278 B1 | 12/2014 | Anderson et al. |
| 8,990,298 B1 | 3/2015 | Anderson |
| 9,021,352 B2 | 4/2015 | Goel |
| 9,081,789 B2 | 7/2015 | Anderson |
| 9,116,608 B2 | 8/2015 | Koo et al. |
| 9,165,308 B2 | 10/2015 | Cook |
| 9,288,256 B2 | 3/2016 | Goodwin |
| 9,313,287 B2 | 4/2016 | Glommen |
| 9,357,023 B2 | 5/2016 | Glommen |
| 9,412,115 B2 | 8/2016 | Seolas |
| 9,479,609 B2 | 10/2016 | Anderson |
| 9,503,499 B1 | 11/2016 | Donaldson |
| 9,537,964 B2 | 1/2017 | Glommen et al. |
| 9,690,868 B2 | 6/2017 | Anderson |
| 9,769,252 B2 | 9/2017 | Glommen |
| 2001/0042171 A1 | 11/2001 | Vermeulen |
| 2002/0078147 A1 | 6/2002 | Bouthors et al. |
| 2002/0083167 A1 | 6/2002 | Costigan et al. |
| 2003/0001888 A1 | 1/2003 | Power |
| 2003/0184452 A1 | 10/2003 | Goodgoll |
| 2004/0003130 A1 | 1/2004 | Becker |
| 2004/0054784 A1 | 3/2004 | Busch et al. |
| 2004/0083259 A1 | 4/2004 | Tenembaum |
| 2004/0123044 A1 | 6/2004 | Franaszek |
| 2004/0243939 A1 | 12/2004 | Perepa |
| 2005/0125289 A1 | 6/2005 | Beyda et al. |
| 2005/0125290 A1 | 6/2005 | Beyda et al. |
| 2005/0138143 A1 | 6/2005 | Thompson |
| 2005/0154781 A1 | 7/2005 | Carlson et al. |
| 2005/0165643 A1 | 7/2005 | Wilson |
| 2006/0031778 A1 | 2/2006 | Goodwin et al. |
| 2006/0195779 A1 | 8/2006 | McElroy |
| 2006/0218223 A1 | 9/2006 | Uchida |
| 2006/0271669 A1 | 11/2006 | Bouguenon et al. |
| 2006/0277198 A1 | 12/2006 | Error |
| 2007/0250618 A1 | 10/2007 | Hammond |
| 2008/0046562 A1 | 2/2008 | Butler |
| 2008/0077561 A1 | 3/2008 | Yomtobian |
| 2008/0228578 A1 | 9/2008 | Mashinsky |
| 2008/0244051 A1 | 10/2008 | Morris |
| 2009/0006945 A1 | 1/2009 | Gumz et al. |
| 2009/0228774 A1 | 9/2009 | Matheny |
| 2009/0248494 A1 | 10/2009 | Hueter et al. |
| 2009/0293001 A1 | 11/2009 | Lu et al. |
| 2010/0066688 A1 | 3/2010 | Jeon |
| 2010/0179967 A1 | 7/2010 | Zhang et al. |
| 2010/0228850 A1 | 9/2010 | Fomitchev |
| 2010/0251128 A1 | 9/2010 | Cordasco |
| 2010/0281008 A1 | 11/2010 | Braunwarth |
| 2010/0281178 A1 | 11/2010 | Sullivan |
| 2010/0318976 A1 | 12/2010 | Everly et al. |
| 2011/0015981 A1 | 1/2011 | Subramanian |
| 2011/0055314 A1 | 3/2011 | Rosenstein et al. |
| 2011/0055710 A1 | 3/2011 | Kirkby et al. |
| 2011/0082858 A1 | 4/2011 | Yu et al. |
| 2011/0093461 A1 | 4/2011 | Mui et al. |
| 2011/0119374 A1 | 5/2011 | Ruhl et al. |
| 2011/0153422 A1 | 6/2011 | Cousins |
| 2011/0153796 A1 | 6/2011 | Branson |
| 2011/0167391 A1 | 7/2011 | Momeyer et al. |
| 2011/0185016 A1 | 7/2011 | Kandasamy et al. |
| 2011/0219115 A1 | 9/2011 | Capel et al. |
| 2011/0246879 A1 | 10/2011 | White et al. |
| 2011/0282739 A1 | 11/2011 | Mashinsky et al. |
| 2011/0296322 A1 | 12/2011 | Dhanjal et al. |
| 2011/0302306 A1 | 12/2011 | Hanson et al. |
| 2011/0314092 A1 | 12/2011 | Lunt et al. |
| 2012/0005257 A1 | 1/2012 | Narayanan et al. |
| 2012/0016836 A1 | 1/2012 | Fender et al. |
| 2012/0054596 A1 | 3/2012 | Kroger et al. |
| 2012/0066289 A1 | 3/2012 | Bland |
| 2012/0096013 A1 | 4/2012 | Ciancutti |
| 2012/0124131 A1 | 5/2012 | Muret et al. |
| 2012/0154292 A1 | 6/2012 | Zhao et al. |
| 2012/0169624 A1 | 7/2012 | Garn et al. |
| 2012/0221411 A1 | 8/2012 | Graham |
| 2013/0055104 A1 | 2/2013 | Everingham |
| 2013/0073401 A1 | 3/2013 | Cook |
| 2013/0086484 A1 | 4/2013 | Antin et al. |
| 2013/0091025 A1 | 4/2013 | Farahat et al. |
| 2013/0110818 A1 | 5/2013 | O'Brien-Strain |
| 2013/0124332 A1 | 5/2013 | Doughty et al. |
| 2013/0185291 A1 | 7/2013 | Tyndall |
| 2013/0191208 A1 | 7/2013 | Chourey et al. |
| 2013/0254897 A1 | 9/2013 | Reedy |
| 2013/0282898 A1 | 10/2013 | Kalus et al. |
| 2013/0290480 A1 | 10/2013 | Manion et al. |
| 2013/0332604 A1 | 12/2013 | Seth et al. |
| 2014/0013203 A1 | 1/2014 | Rogoveanu |
| 2014/0081981 A1 | 3/2014 | Morris |
| 2014/0089330 A1 | 3/2014 | Cui |
| 2014/0123253 A1 | 5/2014 | Davis et al. |
| 2014/0215050 A1 | 7/2014 | Lu |
| 2014/0304389 A1 | 10/2014 | Reavis |
| 2014/0379840 A1 | 12/2014 | Dao et al. |
| 2015/0066587 A1 | 3/2015 | Glommen et al. |
| 2015/0127720 A1 | 5/2015 | Glommen et al. |
| 2015/0169784 A1 | 6/2015 | Anderson |
| 2015/0200994 A1 | 7/2015 | Jain et al. |
| 2015/0212992 A1 | 7/2015 | Anderson |
| 2016/0004673 A1 | 1/2016 | Cook |
| 2016/0026720 A1 | 1/2016 | Lehrer et al. |
| 2016/0087932 A1 | 3/2016 | Hergenhan |

(56) References Cited

U.S. PATENT DOCUMENTS

| | | |
|---|---|---|
| 2016/0381122 A1 | 12/2016 | Glommen |
| 2017/0041426 A1 | 2/2017 | Anderson |
| 2017/0208146 A1 | 7/2017 | Glommen et al. |
| 2023/0156073 A1* | 5/2023 | Glommen ............... H04L 67/01 709/203 |

FOREIGN PATENT DOCUMENTS

| | | |
|---|---|---|
| WO | WO 2011/128924 | 10/2011 |
| WO | WO 2013/003302 | 1/2013 |

OTHER PUBLICATIONS

Adobe Analytics/Tag management, http://www.adobe.com/in/solutions/digital-analytics/tag-management.html, retrieved on Feb. 10, 2014, in 1 page.

Behnam, Ali, "Taking Your Test Platform to the Next Level", http://tealium.com/blog/digital-marketing/taking-your-test-platform-to-the-next-level/, retrieved Jan. 12, 2014, in 10 pages.

"Boosting Marketing Agility with Enterprise Tag & Data Management", Ensighten, dated Jun. 2013, in 14 pages.

eVisit Analyst 8 Features, http://www.evisitanalyst.com/eva8, retrieved on Feb. 10, 2014, in 6 pages.

Handwrite on mobile, Google, https://support.google.com/websearch/answer/2649515?p=sbw_tips&hl=en&rd=2, retrieved Jan. 12, 2014, in 3 pages.

Improving Testing & Optimization Through Tag Management—Key Factors to Consider When Choosing the Right Tag Management Solution, Tealium, dated Sep. 2013, in 12 pages.

Padolsey, James, "Avoiding DOM Flickering", published: Jul. 23, 2009, pp. 1-6, http://james.padolsey.com/javascript/avoiding-dom-flickering/.

"Site Tagging Best Practices Version 1.0 Draft Public Comment", iab (Interactive Advertising Bureau), dated Nov. 29, 2012, in 18 pages.

"TagMan and Digital Fulcrum Join Forces to Optimize Performance of Legacy 3rd Party Tags", http://www.tagman.com/tagman-and-digital-fulcrum-join-forces-to-optimize-performance-of-legacy-3rd-party-tags/ New York, NY, dated Feb. 9, 2012, in 3 pages.

Website: 'TheScarms', "ASP.net V2.0 Client-Side JavaScript Callbacks (AJAX)", published: Jul. 18, 2007, pp. 1-4, https://web.archive.org/web/20070718054551/http://www.thescarms.com/dotnet/ajax.aspx.

West, "Tag management Systems: How do I choose?" Demystified, Jul. 29, 2013, in 5 pages.

International Search Report and Written Opinion issued in International Application No. PCT/US2014/012217 dated May 21, 2014, in 11 pages.

"Preload CSS/JavaScript without execution," http://www.phpied.com/preload-cssjavascript-without-execution, Apr. 21, 2010, in 14 pages.

"What are the ways to load JavaScript or CSS without executing them?" http://stackoverflow.com/questions/8843132/what-are-the-ways-to-load-javascript-or-css-without-executing-them, Jan. 12, 2012, in 4 pages.

"Separating JavaScript Download and Execution," http://www.nczonline.net/blog/2011/02/14/separating-javascript-download-and-execution, Feb. 14, 2014, in 7 pages.

International Search Report and Written Opinion issued in International Application No. PCT/US2014/052774 dated Dec. 29, 2014, in 23 pages.

International Search Report and Written Opinion issued in International Application No. PCT/US2014/052766 dated Dec. 8, 2014, in 11 pages.

International Search Report and Written Opinion issued in International Application No. PCT/US2014/063927 dated Jan. 29, 2015, in 11 pages.

MSDN, "Event Handling in HTML Elements Sample", Dec. 18, 2010, pp. 1-5.

David Flanagan, "JavaScript: The Definitive Guide", 2002, p. 185.

"Does the <script> tag position in HTML affects performance of the webpage?", Published; Apr. 24, 2013, pp. 1-7.

"Features—Segment, Features to Explore," screenshot of website retrieved from <http://www.segment.com/tour/features> on Nov. 4, 2015, 4 pages.

Floodlight Tag Format—DFA Partner Help, https://support.google.com/dfa/partner/answer/154049, accessed on Apr. 13, 2016, in 5 pages.

Google, Google Tag Manager: iOS v3—Getting Started, https://developers.google.com/tagmanager/ios/v3/, retrieved on Sep. 8, 2017, from the Sep. 15, 2014 wayback machine capture (https://web.archive.org/web/20140915200723/https://developers.google.com/tag-manager/ios/v3/) (13 pages).

"Segment—We make customer data simple," screenshot of website retrieved from <http://www.segment.com/home> on Nov. 4, 2015, 4 pages.

"Integrations for every team," screenshot of website retrieved from <http://www.segment.com/home> on Nov. 4, 2015, 1 page.

* cited by examiner

FIG. 20

SYSTEM AND METHOD FOR CONSTRUCTING CONTENT SITE VISITOR PROFILES

RELATED APPLICATIONS

This application is a continuation of U.S. patent application Ser. No. 17/091,441, filed Nov. 6, 2020, entitled "TAG MANAGEMENT SYSTEM AND METHOD," which a continuation of U.S. patent application Ser. No. 16/250,948, filed Jan. 17, 2019, entitled "SYSTEM AND METHOD FOR CONSTRUCTING CONTENT SITE VISITOR PROFILES," which is a continuation of U.S. patent application Ser. No. 15/698,023, filed Sep. 7, 2017, entitled "SYSTEM AND METHOD FOR APPLYING CONTENT SITE VISITOR PROFILES," which is a continuation of U.S. patent application Ser. No. 15/166,111, filed May 26, 2016, entitled "SYSTEM AND METHOD FOR CONSTRUCTING CONTENT SITE VISITOR PROFILES," which is a continuation of U.S. patent application Ser. No. 14/456,289, filed Aug. 11, 2014, entitled "SYSTEM AND METHOD FOR COMBINING CONTENT SITE VISITOR PROFILES," which is a continuation of U.S. patent application Ser. No. 14/216,801, filed Mar. 17, 2014, entitled "SYSTEM AND METHOD FOR COMBINING CONTENT SITE VISITOR PROFILES," which claims priority under 35 U.S.C. § 119(e) as a nonprovisional application of the following U.S. Provisional Applications:

| App. No. | Filing Date | Title | Attorney Docket |
|---|---|---|---|
| 61/872,530 | Aug. 30, 2013 | CONTENT SITE VISITOR PROCESSING SYSTEM | TEALM.001PR |
| 61/889,876 | Oct. 11, 2013 | COMBINED SYNCHRONOUS AND ASYNCHRONOUS TAG DEPLOYMENT | TEALM.002PR |
| 61/900,274 | Nov. 5, 2013 | UNIVERSAL VISITOR IDENTIFICATION IN TAG MANAGEMENT SYSTEMS | TEALM.003PR |
| 61/896,351 | Oct. 28, 2013 | SYSTEM FOR PREFETCHING DIGITAL MARKETING TAGS | TEALM.004PR |
| 61/939,972 | Feb. 14, 2014 | SYSTEM AND METHOD FOR COMBINING VISITOR PROFILES | TEALM.008PR |

The disclosures of each of the foregoing applications are hereby incorporated by reference in their entirety. Further, any subset of the embodiments described herein can be implemented in combination with any subset of the embodiments described in the foregoing applications.

BACKGROUND

Some operators of content sites, such as websites, regularly obtain the results of analytics performed with regard to user interactions on their content sites. User analytics can include any type of data regarding interactions of end users with content sites, among other types of data. There are different approaches to gathering analytics data, one of which includes employing the use of tags.

Tags can include small pieces of website code that allow a website operator to measure traffic and visitor behavior, understand the impact of online advertising and social channels, use remarketing and audience targeting, and test and improve a content site, among optionally other functions. Adding tags to a content site has typically included involving a developer to manually insert tag code into one or more pages of a website.

SUMMARY

In certain embodiments, a method of combining content site visitor profiles can include, under control of a hardware processor, receiving first content site interaction data from a first tag embedded within a first content page, where the first content site interaction data includes a cookie-derived first visitor identifier associated with a first visitor of the first content page; identifying a first persistent identifier of the first visitor from the first content site interaction data; receiving second content site interaction data from a second tag embedded within a second content page, where the second content site interaction data includes a cookie-derived second visitor identifier associated with a second visitor of the second content page; identifying a second persistent identifier of the second visitor from the second content site interaction data; determining that the first and second persistent identifiers are the same; and in response to said determining, aggregating the first content site interaction data with the second content site interaction data in a single visitor profile, such that the first and second visitors are considered to be the same visitor.

In certain embodiments, the method of the previous paragraph may be implemented with any subcombination of the following features: the first and second content pages can be the same content page, and the first and second tags can be separate instances of the same tag; the first and second content pages can be accessed from separate computing devices of a single user; the first and second content pages can both be accessed by a single computing device, and the second content page can be accessed by a user after the user removed a cookie associated with the first content page from the user device; the persistent identifier can include an email address or social network identifier; the persistent identifier can include a phone number or mailing address; and the persistent identifier can include a login credential.

In various embodiments, a system for combining content site visitor profiles can include a hardware processor that can: access a first visitor profile associated with a first visitor to a content page; access a second visitor profile associated with a second visitor to a content page, where the second visitor profile is separately identified from the first visitor profile by a second visitor identifier different than a first visitor identifier of the first visitor profile; identify an alternative identifier of the first visitor separate from the first visitor identifier; determine that the alternative identifier is also associated with the second visitor; and relate the first and second visitor profiles to produce a third visitor profile in response to the determination that the alternative identifier is also associated with the second visitor.

In certain embodiments, the system of the previous paragraph may be implemented with any subcombination of the following features: the alternative identifier can be a persistent identifier including one or more of the following: an email address, a social network identifier, and a login credential; the alternative identifier can be provided by a third party tag other than a first party tag used to create the first and second visitor identifiers; the alternative identifier can be provided by a third party tag other than a first party tag used to create the first and second visitor identifiers; the hardware processor can also identify an alternative identifier from visitor-supplied data obtained from a tag script embedded within the content page; the hardware processor can also associate a second alternative identifier with the third visitor profile; the hardware processor can also store a hash of the alternative identifier in association with the third visitor profile; the hardware processor can also redirect processing of the third visitor profile from a first server to a second server in response to computing the hash; and the hardware processor can also select the second server based on a value of the hash.

Moreover, in certain embodiments, non-transitory physical computer storage includes instructions stored thereon that, when executed by a hardware processor, can implement a visitor processing system for combining content site visitor profiles. The visitor processing system can: create a first visitor profile based on first data regarding first interactions of a first visitor with a first content page, where the first interaction data may be obtained from a first tag embedded in the first content page; create a second visitor profile based on second data regarding second interactions of a second visitor with a second content page, where the second interaction data can be obtained from a second tag embedded in the second content page; identify a first identifier of the first visitor from the first interaction data, where the first identifier is not generated by the visitor processing system; identify a second identifier of the first visitor from the first interaction data, where the second identifier also is not generated by the visitor processing system; compare the first and second identifiers; determine that the first and second identifiers are equivalent based on the comparison; and combine the first and second visitor profiles in response to said determination that the first and second identifiers are equivalent.

In certain embodiments, the non-transitory physical computer storage of the previous paragraph may be implemented with any subcombination of the following features: the visitor processor system can also interleave overlapping portions of the first and second interaction data based on timestamps in the first and second interaction data responsive to the determination that the first and second identifiers are equivalent; the visitor processor system can also receive third interaction data subsequent to the receipt of the second interaction data, where the third interaction data identifies a visitor identifier generated by the visitor processing system, and where the visitor identifier is associated with the first and second visitor profiles; and the visitor processor system can also combine the third interaction data with the first and second interaction data.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 5-7, 8A, 8B, 9-17, 18A, 18B, and 19-23 depict example user interfaces that provide functionality for customizing visitor profiles.

DETAILED DESCRIPTION

I. Introduction to Visitor Processing

Figure 1:
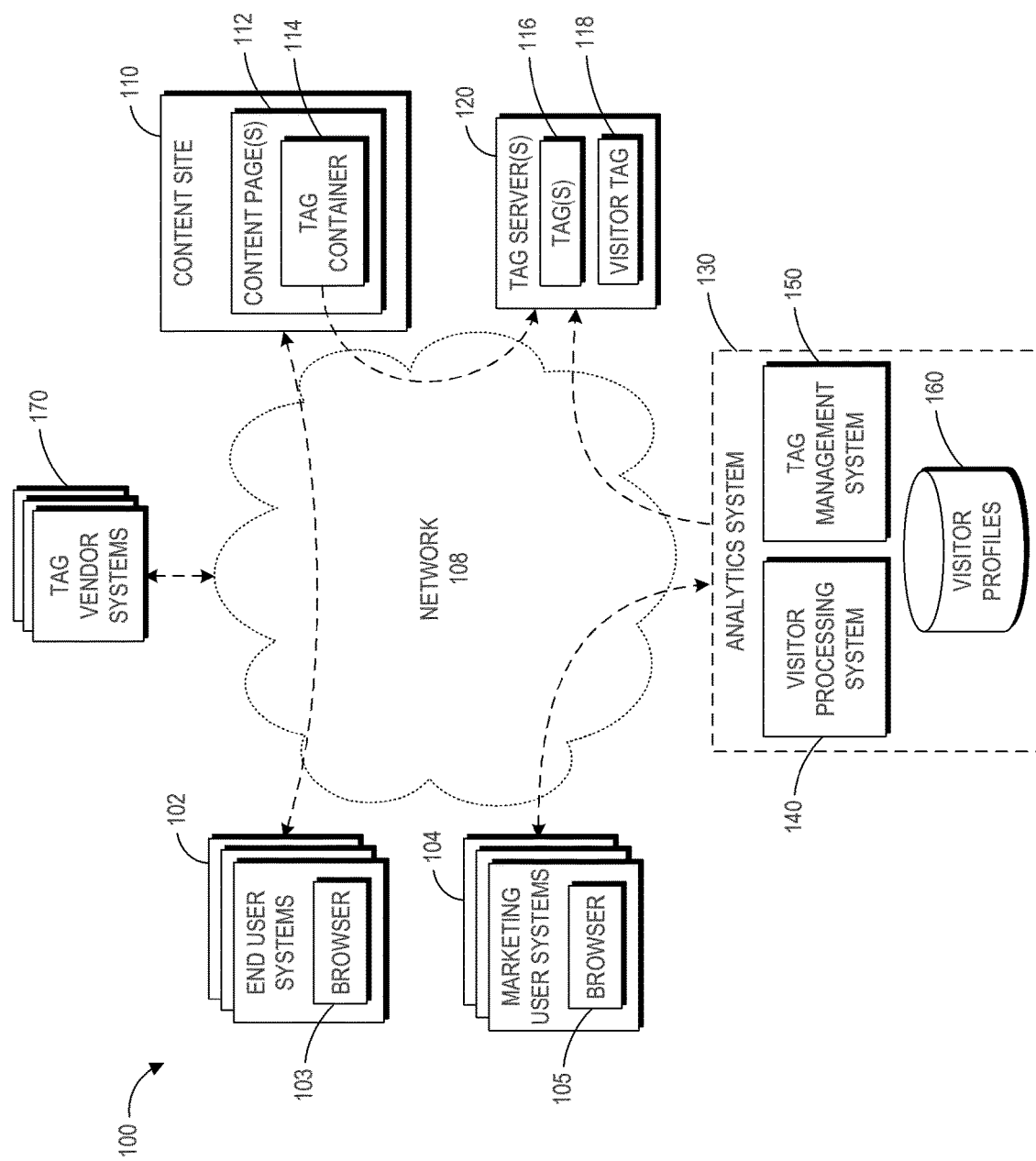
FIG. 1 depicts an embodiment of a computing environment that provides access to an analytics system including a visitor processing system and/or a tag management system.

Adding tags to web pages without efficient management can create significant problems and inconveniences. For instance, the code that is associated with multiple tags can bog down a content site and be a major performance drain. Redundant or incorrectly applied tags can also distort measurements and result in duplicate costs or missing data. Poor tag management can also be time consuming for the information technology (IT) department or webmaster team to add new tags, which may mean that important marketing and measurement programs might be significantly delayed.

Tag management systems have recently been introduced to improve the management of tags. Currently available tag management systems provide content site operators somewhat greater control and ease of use in managing tag deployments in their content pages. In addition, some known tag management systems provide some reporting functionality that leverages data obtained from the tags.

Some of those existing systems provide rich but slow batch-based data processing. Many of the batch-based systems tend to be batched on a daily basis and therefore cannot provide immediate notification of any changes in web site visitor behavior throughout a day. Additionally, acting on the collected data from such systems typically requires custom-coded and less flexible solutions.

Real time reporting may be available with some tag management systems, but the reports generated by such systems tend to be inflexible and are predetermined by the vendor of the tag solution. These reports will almost certainly not be visitor-centric, making them difficult to use for inferring business-critical correlations. Additionally, acting on the data in such systems is virtually impossible given the aggregated nature of the reporting data. Various solution vendors such as data management platforms (DMP) or web analytics provide actionable segmented visitor based data sets. However, such solutions often lack flexibility regarding the visitor definitions as well as lacking consistency across the disparate vendor data sets used to create the rich visitor profiles. Further, these systems tend to provide little agility and certainly no real-time definition of visitor definitions.

This disclosure describes embodiments of systems and methods that can address at least some or all of the foregoing drawbacks, among possibly others. In certain embodiments, a tag management system can deploy a single tag or a tag container to a content site. Each page or any subset of pages in the content site can incorporate the tag container as a universal tag that can be used to gather any type of visitor data of a visitor to a content site. This tag container can be used to interface with any number of third party vendor tags without requiring, in certain embodiments, such tags to be coded expressly in the code of the content pages of the content site. Thus, changes to the tagging of a content site may be made through a user interface provided by the tag management system without having to use a developer to add the tags to the content pages manually. As a result, the tag management system can be more accessible to marketing people without IT or programming knowledge.

This tag container approach to tag management can promote high scalability and provide marketing agility, enabling marketers and other marketing users to rapidly change data collected or analyzed by the tag management system. Further, since one tag container is embedded within the content pages, in certain embodiments, the content pages may load faster and, therefore, include many performance improvements. Additionally, the architecture of the tag management system and the tag containers themselves can facilitate other performance improvements which will be described in greater detail below. Moreover, there may be reduction of IT costs provided by using the disclosed tag management system because IT personnel can shift away from performing marketing work to focusing on IT work.

In certain embodiments, a visitor processing system is also described herein, which can provide additional levels of marketing agility by providing a solution that allows for a fully configurable visitor model. The visitor processing system may, but need not, be implemented in conjunction with the tag management system. The visitor processing system may provide the ability to see the results of this visitor model in a real time or pseudo real time (such as within seconds or minutes of making changes to the visitor model). This level of configurability can be beneficial when a goal is to reduce a visitor set to a highly targeted visitor segment. This rich configurability can include the ability to set and manipulate a number of attributes on a visitor. Such attributes can include badges, metrics (such as numerical functions), properties, dates, flags (such as Boolean values), and advanced attributes (such as funnels and sequences). By allowing marketing users to configure attributes regarding their content sites' visitors, the visitor processing system can enable marketing users to obtain real-time (or near real-time) reports on these visitors. These reports can provide a highly desirable capability to filter a live and/or historic stream of visitors on the specified attributes, resulting in precisely targeted reporting on a highly segmented and highly targeted segment of visitors in certain embodiments.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

II. Example Visitor Processing Systems and Methods

Turning to FIG. 1, an embodiment of a computing environment 100 is shown for implementing various tag features, including some or all of the tag management and/or visitor processing features described above. In the computing environment 100, one or more end user systems 102 communicate over a network 108 with a content site 110. The end user systems 102 can include any form of computing device and may be desktops, laptops, smartphones, tablets, or the like. A browser 103 or other application software installed in the end user systems 102 accesses one or more content pages 112 of the content site 110. The content pages may be web pages or other documents or files that may be accessed remotely and provided to the end user systems 102. The content site 110 may be a website, a web server, an application server, a database server, combinations of the same, or the like. Further, the network 108 can include a local area network (LAN), a wide area network (WAN), a company intranet, the public Internet, combinations of the same, or the like.

As shown, one or more content pages 112 of the content site 110 can include a tag container 114. The tag container 114 can be an example of the tag container described above and can be a universal tag that is installed or incorporated in one or more content pages 112 in place of, or instead of, incorporating numerous tags in each page. The tag container 114 can communicate with one or more data collection tags 116, 118 implemented on one or more tag servers 120. Both the content site 110 and the tag servers 120 can be implemented in computer hardware and/or software. The tags 116, 118 can include third party tags 116 provided by tag vendors that are different entities than an operator of, or provider of, the tag container 114. In addition, the tags can include a visitor tag or tags 118 that can be provided by the same provider as the provider of the tag container 114 (or a different provider in some embodiments).

An analytics system 130 is shown in communication with the tag servers 120. The analytics system 130 can be implemented in computer hardware and/or software. In the depicted embodiment, the analytics system 130 includes a visitor processing system 140 and a tag management system 150, as well as a visitor profile data repository 160. The visitor processing and tag management systems 140, 150 are shown separately for illustrative purposes, although their functionality may be implemented by a single system. The analytics system 130 can also be implemented without a tag management system 150, and thus, the functionality of the visitor processing system 140 can be implemented independent of any tag management functionality.

In certain embodiments, the visitor processing system 140 can enable marketing users (described below) to configure the types of data tracked for different visitors of the content site 110, as well as analyze and report on this visitor data. For instance, in one embodiment, the visitor processing system 140 can provide one or more user interfaces that enable customization of collecting information about visitors to the content site 110. This information can be obtained initially by the visitor tag(s) 118, which may be provided through the tag container 114 to the end user systems 102 for execution in the browser 103. Upon execution in the browser 103, the visitor tag(s) 118 can supply visitor data to the visitor processing system 140 (optionally through the tag servers 120). Such visitor data can be stored in visitor profiles in the visitor profile data repository 160, which may include physical computer storage. Marketing users can subsequently query the visitor profiles to obtain reports or other information about visitors to the content site 110. Other uses for visitor profile data are described in greater detail below.

The tag management system 150 can be used to manage the tags 116 provided by third party vendors. For instance, the tag management system 150 can provide functionality for marketing users to select which third party vendor tags 116 to associate with the tag container 114 for a variety of vendor-specific processing purposes. These purposes can include obtaining analytics for data analysis or business intelligence, tracking affiliate activity with respect to the content site 110, obtaining user data for displaying targeted ads, obtaining user data for customizing search functionality or email campaigns targeted to the end users, obtaining user data for personalizing content of the content pages 112, obtaining user data for integration with social networking functionality, obtaining user data for big data analysis, combinations of the same, or the like. Data collected by the tags 116 can be provided to tag vendor systems 170, which can perform any of this vendor-specific processing. The data may alternatively be passed to the tag vendor systems 170 through the tag management system 150.

In an embodiment, the tag management system 150 provides functionality (such as one or more user interfaces) for marketing users to map data sources in the content pages 112 to data sources gathered by the third party vendor tags 116. For instance, if one of the content pages 112 includes a shopping cart value named "cart value," the tag management system can provide a user interface that enables a user to tell the tag management system 150 to collect data on the "cart value" and map this data to a "cart_value" variable of one of the tags 116. In addition, the tag management system 150 can provide similar functionality for identifying which data sources of the content pages 112 are to be gathered by the visitor tag 118.

However, in some embodiments, the visitor tag 118 can instead perform a greedy collection of some or all data available in the content page(s) 112. Since the visitor tag 118, tag container 114, and visitor processing system 140 can be provided by the same entity, the data obtained by the visitor tag 118 need not be mapped to third party mappings like the data obtained by the third party tags 116. Instead, some or all of the data available to the visitor tag 118 can be provided to the visitor processing system 140 for processing. Thus, the visitor tag 118 can facilitate vendor-neutral data gathering of some or all of the data elements in a content page 112. Since this data is not mapped to a vendor-specific format in certain embodiments, the data can be exported to business intelligence systems without a need to massage the data from its mapped form (which can be cumbersome) to its original, raw form.

Various marketing user systems 104 can access the analytics system 130 and/or the tag servers 120 via the network 108. Like the end user systems 102, the marketing user systems 104 can include a browser 105 or other application software that can access network applications over the network 108. The marketing user systems 104 can also be any type of computing device including, but not limited to, a desktop, laptop, tablet, smartphone, or the like. The marketing user systems 104 can be operated by marketing users such as marketing professionals, website operators, business users, operators of the content site 110, or any other individual who uses tags or data obtained from tags. Marketing users are not the end users of the content site 110 in certain embodiments. A marketing user might use a marketing user system 104 to dynamically update the types of data tracked or analyzed for different visitors of the content site 110. This data can be tracked by the visitor processing system 140 via either updating the visitor tag 116 stored on the tag server 120 or by updating processing of data obtained from the visitor tag 116 to build updated visitor profiles 130, many example features of which will be described in greater detail below.

Figure 2:
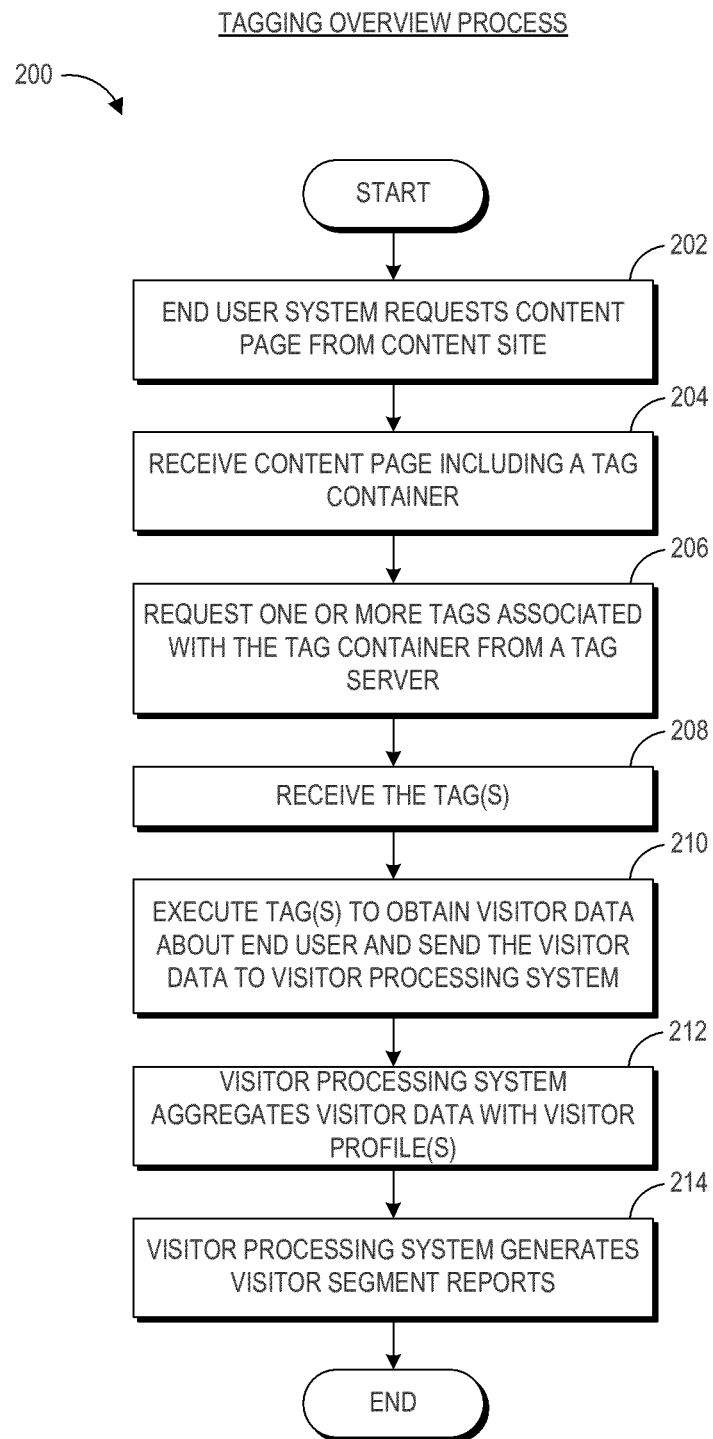
FIG. 2 depicts an embodiment of a tagging overview process.

Turning to FIG. 2, an embodiment of a tagging overview process 200 is shown. The tagging overview process 200 illustrates an example mode of operation of the computing environment 100 of FIG. 1 and may be implemented by the various components shown in the computing environment 100 of FIG. 1.

At block 202, of the process 200, an end user system 102 requests content such as a content page 112 from the content site 110. The end user system 102 receives the content page 112 including a tag container 114 at block 204. Thereafter, at block 206 the end user system 102 can request one or more tags 116 associated with the tag container 114 from a tag server 120. The tag container 114 may include script code such as Javascript code or the like embedded in the source of the content page 112 initially requested by the end user system. The tag container 112, upon being processed by the browser 103 of the end user system 102, can programmatically access the visitor tag 118 (or other tag) stored on the tag server 120 to request the tag 118 to be provided or downloaded to the end user system 102. The tag 118 itself may be a static file or the like that includes executable code such as HTML code and/or script code, such as Javascript or the like.

The tag(s) 118 are received at block 208 at the end user system 102, and the tag or tags 118 are executed at block 210 by the end user 102 system to obtain visitor data about the end user 102 and to send the visitor data to the visitor processing system 140. In another embodiment, the visitor data is sent to the tag server 110, which may store and process the data or may forward the visitor data on to the visitor processing system 140. The visitor data may also be sent to both the tag server 120 and the visitor processing system 140.

The visitor data can include any of a variety of information about the end user and the end user's interactions with the content site 110. For instance, the visitor data may include information about what type of browser 103 or application the end user is using to access the content site 110. The visitor data may also include information about a geographic location of the user, a duration that the user is accessing the content site 110 or is logged into the content site, or the like. In addition, the visitor data can include information about any interaction by the visitor with the content site 110 including, for example, any clicks made by the visitor on links on the content page 112 served by the content site 110, any user selection of a form element, or any user scroll behavior, text entry behavior in form text boxes, chat boxes, e-mail boxes, social networking, other user interaction with other user interface controls, combinations of the same, or the like.

The visitor processing system 140 can aggregate the visitor data with unique visitor profiles for each end user visitor to the content site 110 at block 212. By storing the visitor data in association with unique visitor profiles, the data may be associated with individual visitors. Unique visitor profiles may be maintained by obtaining, via the tag 118, identification data associated with the end users so as to match the visitor data with a particular user's visitor profile. The identification data may be obtained by the tag 118, for example, by accessing a cookie that may be installed in the end user system 102, by accessing login information associated with the user if the user logged into the content site 110, by identifying the user's internet protocol (IP) address and/or a Media Access Control (MAC) address from network packets transmitted to and/or from the content site 110 and the end user systems 102, combinations of the same or the like.

At block 214, the visitor processing system 140 generates visitor segment reports, which can be custom reports accessible by marketing users and which may include segment information on the aggregated visitor profile data organized by visitor segments. This segment information can include information regarding visitors who are frequent visitors to the content site 110, or information regarding visitors who are frequent purchasers of the content sit 110, to name a few examples. Segments may advantageously be defined by the marketing users via customization user interfaces provided by the visitor processing system 140, many examples of which are described in greater detail below (see FIGS. 5 through 20). The custom reports provided by the visitor processing system 140 can be generated or updated in real time or substantially real time, for example, on the order of seconds or minutes in response to receiving updated visitor data.

In addition, marketing user customizations made to reports and/or types of visitor data gathered or operations upon the data can take effect in real or near real time. The reports can reflect this dynamic activity, advantageously in certain embodiments overcoming deficiencies in existing systems that apply batch processing daily. Even in existing systems that provide real time reporting, such systems may be controlled by the tag vendor and, therefore, may be inflexible or impossible to customize by the marketing users. In contrast, the visitor processing system 140 can enable the marketing users to have control over the types of data collected and/or processed, the configuration rules that process the data, and the way that such processed data is output via reports to those users. As a result, in certain embodiments, the visitor processing system 140 can provide greater marketing agility to marketing users and can provide increased performance for tracking visitor data.

Figure 3:
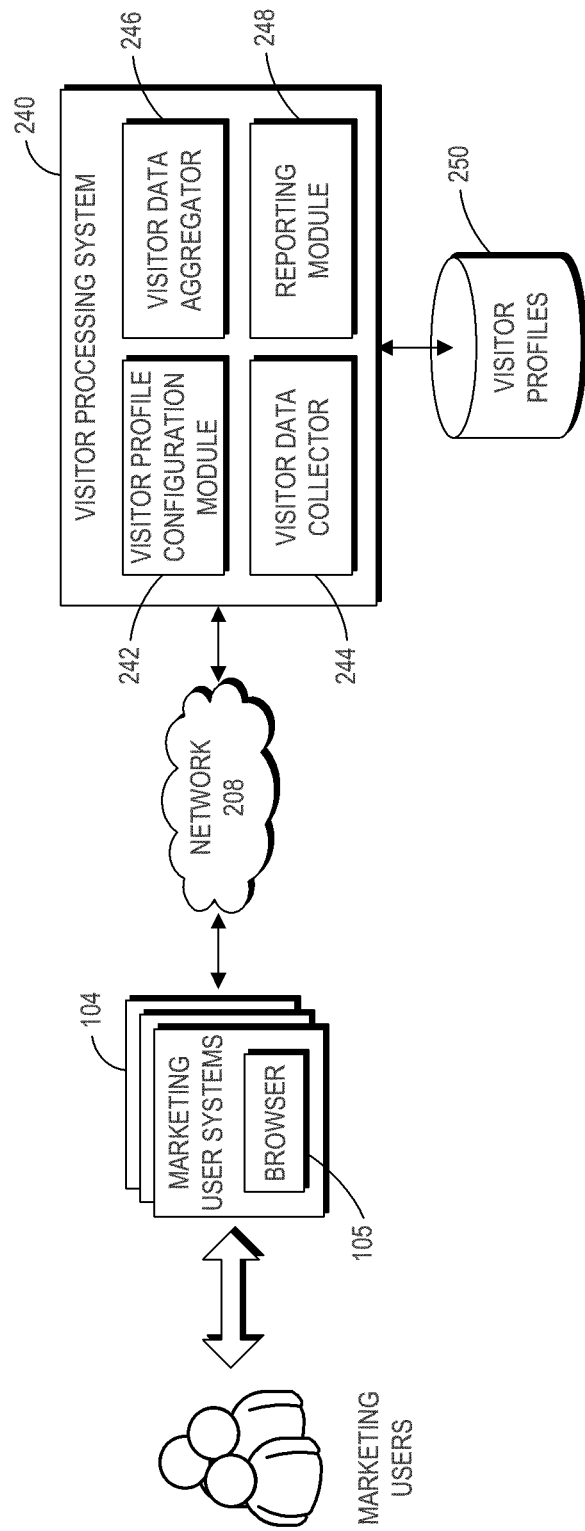
FIG. 3 depicts a more detailed embodiment of the visitor processing system of FIG. 1.

Turning to FIG. 3, an embodiment of a visitor processing system 240 is shown in greater detail. The visitor processing system 240 can have all the features of the visitor processing system 140. In the depicted embodiment, the visitor processing system 240 is in communication with the marketing user systems 104 over a network 208, which may be the network 108 described above with respect to FIG. 1. The visitor processing system 240 as shown includes various components such as a visitor profile configuration module 242, a visitor data collector 244, a visitor data aggregator 246, and a reporting module 248. A visitor profiles data store 250 is also in communication with the visitor processing system 240. The visitor processing system 240 and each of the components thereof can be implemented in computer hardware and/or software. In some embodiments, the visitor processing system 240 can be part of or used in conjunction with a tag management system, such as the tag management system 150.

The visitor profile configuration module 242 can output one or more user interfaces that enable marketing users of the user systems 104 to customize the way that visitor data is tracked and/or analyzed by the visitor processing system 240. Many example such user interfaces are described in greater detail below. In general, in one embodiment, the visitor profile configuration module 242 allows marketing users to define visitor profile definitions or templates that include attributes of data to be collected from the content site 110 as well as rules to be used in transforming collected visitor data into visitor profiles for further analysis. The visitor profile templates can be stored in the visitor profile data repository 250. Visitor data transformed into visitor profiles based on one or more visitor profile templates may also be stored in the data repository 250. These visitor profiles may be accessed by marketing users for reporting and marketing or business intelligence analysis. The profiles may also be accessed from the repository 250 programmatically for taking further programmatic action such as content page personalization (described in greater detail below).

The visitor data collector 244 can perform the actual data collection of visitor profile data by communicating with the tag 118 in the tag server 120 described above with respect to FIG. 1. In one embodiment, the data collection process works by the tag 118 itself including an inline frame ("iframe") HTML element that further includes an HTML form. This frame may or may not be visible on the content page 112. The form can automatically obtain visitor data elements from the content page and submit those visitor data elements to the visitor processing system 240 (and/or tag server 120) via an HTTP POST or GET operation. In another embodiment, the tag can provide the visitor data to the visitor data collector 244 using a web services communication scheme, for example, by making application programming interface (API) calls over the network 108 to the visitor data collector 244.

The visitor data aggregator 246 can aggregate like data based on the particular visitor and/or the type of data being aggregated, for example, based on attributes of the data and/or user. For instance, if a user has visited a site a number of times, each time the user visits the site the visitor data aggregator 246, can increment a variable or attribute corresponding to the number of times the user has visited the site. Further, the visitor data aggregator 246 can apply one or more rules to those attributes in the visitor data to transform the visitor data into segment-based data. This segment data can provide enhanced information about segments of visitors to the content site 110. For instance, the visitor data aggregator 246 can assign one or more badges or labels to a particular class of visitors based on a rule-based analysis of the visitors' browsing habits with respect to the content site 110. Users that share a particular badge can represent a segment of users having certain characteristics that may be interesting to study for targeted marketing or other purposes. The badges can also represent gamification of analytics that can provide useful insights to marketing users about visitor behavior. Badges are described in greater detail below (see, e.g., FIGS. 7 through 10).

Another example of information that can be aggregated by the visitor data aggregator 246 is metrics about the data.

For instance, the visitor data aggregator 246 can compute a metric such as the total number of purchases made by a user on an ecommerce content site or other numerical values related to the user's interactions with the content site. In still other embodiments, the visitor data aggregator 246 can compile attributes such as flags or Boolean values associated with the visitor's profile. Such flags might represent data related to whether a user has left unpurchased items in an electronic shopping cart, whether a user tends to use a chat function, or whether a user clicks social networking links to share information about the content site, to name a few examples. Such flags or Boolean values can provide useful insight into the activities of different users with respect to the content site. Still other attributes that can be determined by the visitor aggregator module 246 includes funnels, such as purchase funnels, and sequences, as well as properties, dates and other attributes. These attributes are described in greater detail below with respect to FIGS. 7 and 11-17.

The reporting module 248 can provide a custom reporting user interface that allows marketing users to query visitor attributes and organize visitor attributes based on different segments or dimensions of those visitor attributes. For instance, such a user interface can allow users to sort or organize or otherwise view a portion of visitors that share a common attribute such as a badge or flag or funnel characteristic or the like. Thus, the reporting module 248 can provide a flexible interface for marketing users to view different segments of the visitor profile data. Further, changes made by users via the visitor profile configuration module 242 can be reflected in the reports provided by the reporting module 248 in real time or near real-time. Thus, for example, if an marketing user desires to track a new characteristic implemented on a content page, the user can easily specify via the visitor profile configuration module 242 to track this particular attribute, and the visitor data collector 244 can begin tracking this data almost immediately. Likewise, the visitor data aggregator 246 can rapidly begin aggregating the collected data, and the reporting module 248 can also rapidly output this information in a format requested by the user. This type of flexibility provided by the visitor processing system 240 in certain embodiments can greatly enhance the ability of marketing users to see rapidly-changing visitor behavior and gain insights into how to personalize content pages to better target visitors or to promote purchases or other desired visitor behavior.

Figure 4A:
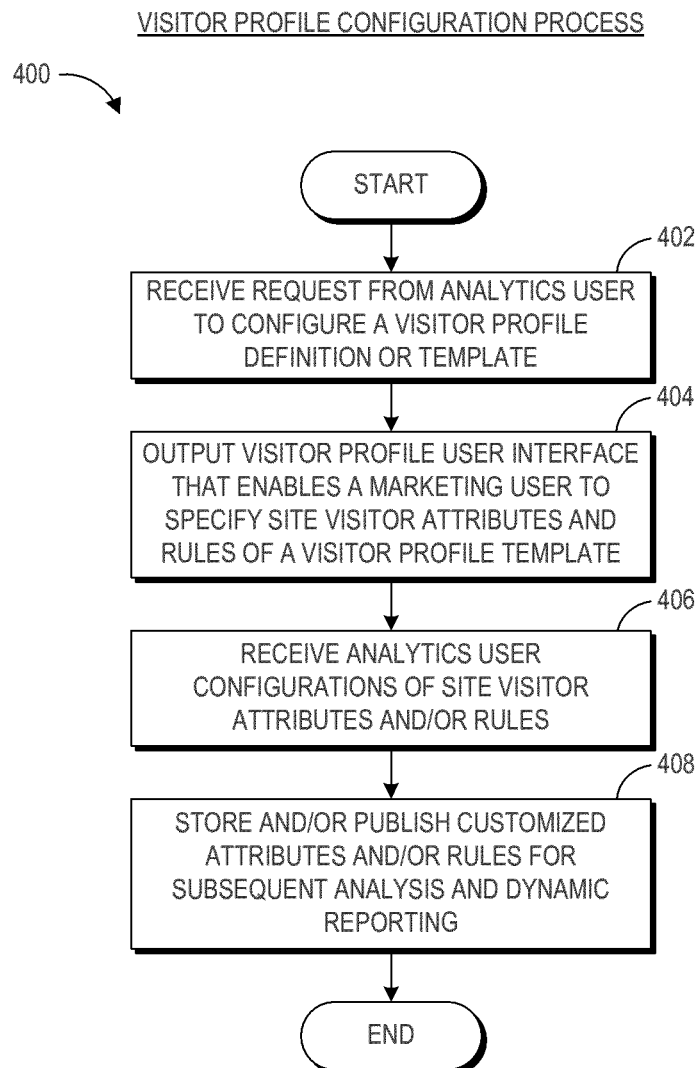
FIG. 4A depicts an embodiment of a visitor profile configuration process.
Figure 4B:
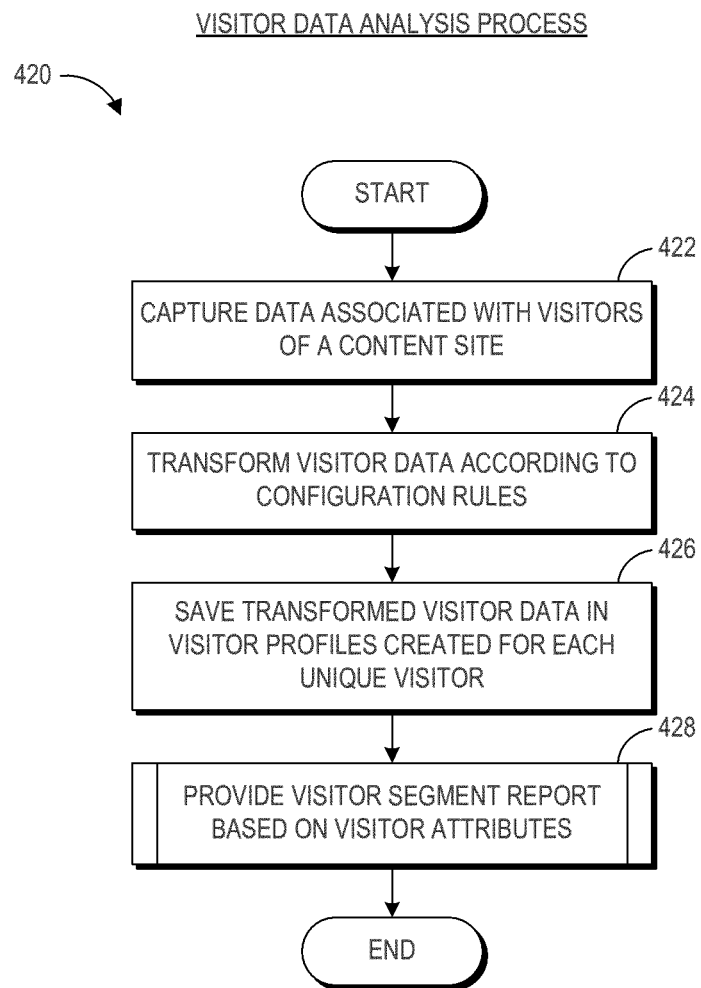
FIG. 4B depicts an embodiment of a visitor data analysis process.
Figure 4C:
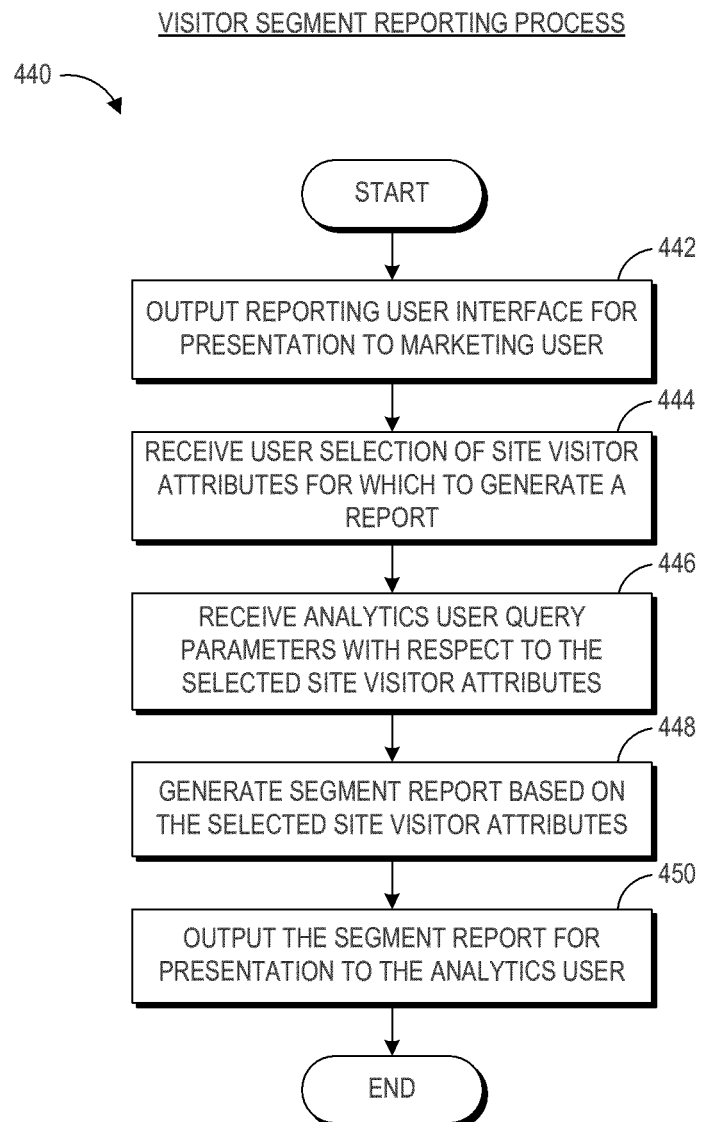
FIG. 4C depicts an embodiment of a visitor segment reporting process.

Turning to FIGS. 4A through 4C, various additional processes 400, 420, and 440 are shown, which may be implemented by the visitor processing system 140 or 240 (or other components of the computing environment 100 of FIG. 1). For instance, in FIG. 4A an embodiment of a visitor profile configuration process 400 is shown, which may be implemented by the visitor profile configuration module 242 of FIG. 2.

At block 402 of FIG. 4A, the visitor profile configuration module 242 can receive a request from a marketing user to configure a visitor profile definition or template. In response, at block 404, the configuration module 242 can output a visitor profile user interface that enables the marketing user to specify site visitor attributes and rules of a visitor profile template to be applied to visitor data. Generally, any collection of one or more attributes and/or one or more rules may be part of a visitor profile definition or template. A user need not define a specific visitor template explicitly, but may rather do so implicitly by defining one or more attributes and/or one or more rules. Thus, for convenience, the remainder of this specification frequently describes the definition of attributes and/or rules without specifically referring to the creation of visitor profile definitions or templates. It should be understood that any reference to attribute or rule creation/editing features can be considered to refer to creation or editing of visitor profile templates.

At block 406 of FIG. 4A, the configuration module 242 can receive marketing user configurations of site visitor attributes and/or rules and store customized attributes and/or rules for later analysis and dynamic reporting at block 408.

Turning to FIG. 4B, an embodiment of a visitor data analysis process 420 is shown that can be implemented, for example, by the visitor data aggregator 246. The visitor data aggregator 246 can capture data associated with the visitors of a content site at block 422 and transform this visitor data according to configuration rules 424. The configuration rules may have been specified by an marketing user using the process 400 or the like described above. The visitor data analysis process 420 via the visitor data aggregator 246 can save the transformed visitor data in visitor profiles created for each unique visitor at block 426. At block 428, a visitor segment report can be provided based on the visitor attributes and this block 428 may be implemented or performed by the reporting module 248.

A more detailed view of a segment reporting process 440 is shown in FIG. 4C. In the example process 440, the reporting module 248 can output a reporting user interface for presentation to an marketing user at block 442. The reporting module 248 can receive a user selection of the site visitor attributes for which to generate a report at block 444. At block 446, the reporting module 248 can receive an marketing user query parameters with respect to the selected site visitor attributes and may generate the segment report based on the selected visitor attributes at block 448. The reporting module 248 can output the segment report for presentation to the marketing user at block 450.

III. Example Visitor Processing System User Interfaces

Figure 21:
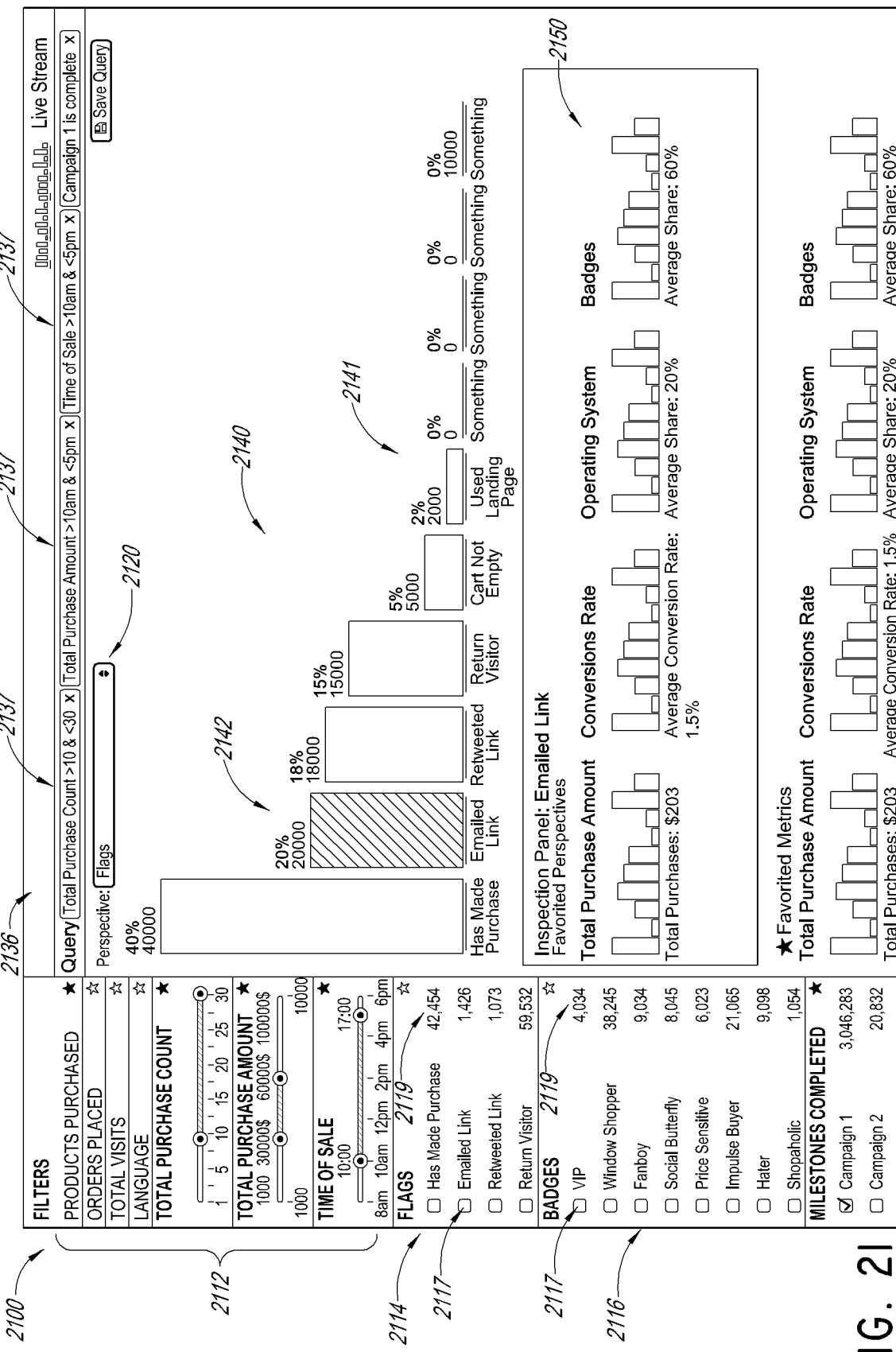
Figure 22:
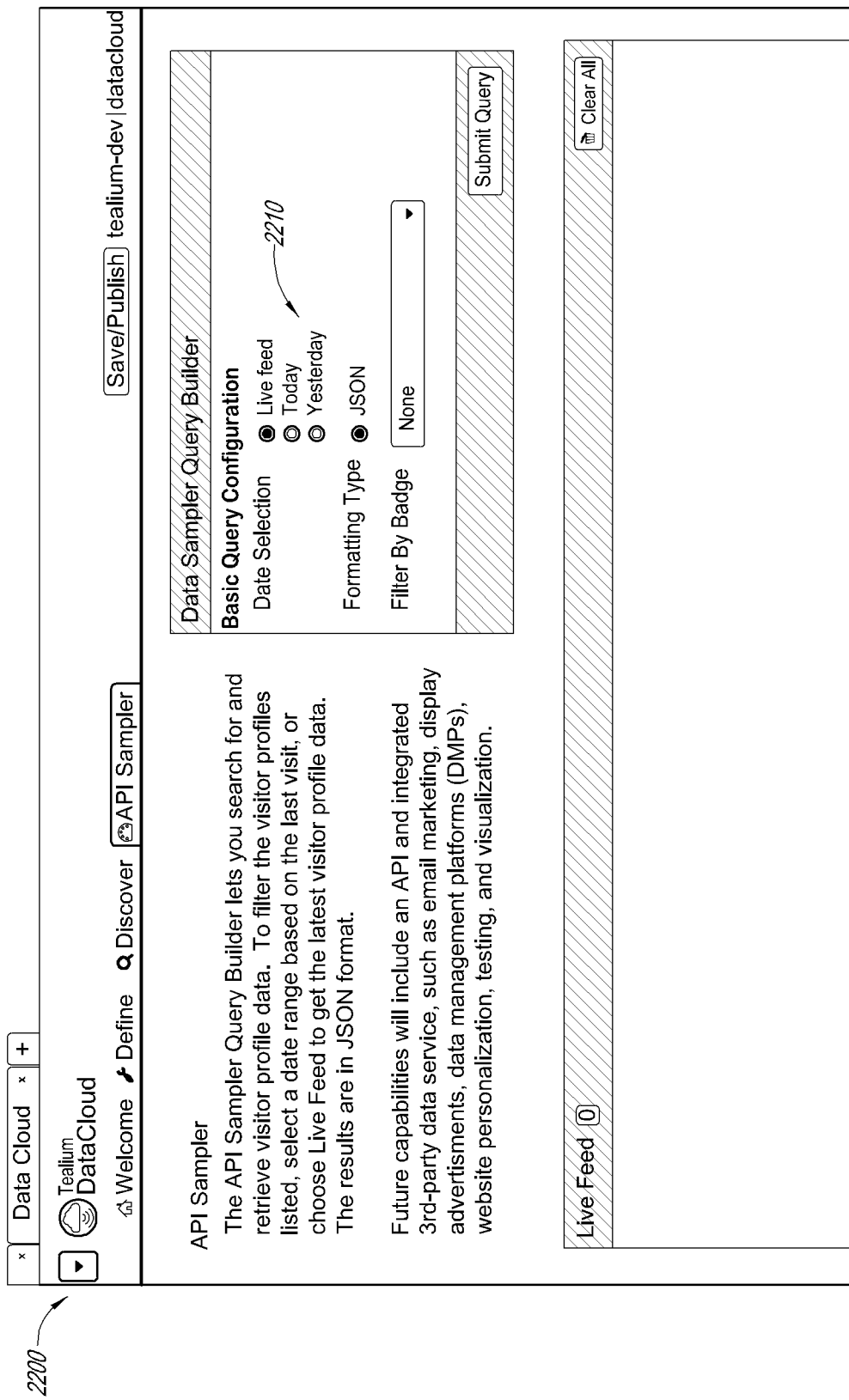
Figure 23:
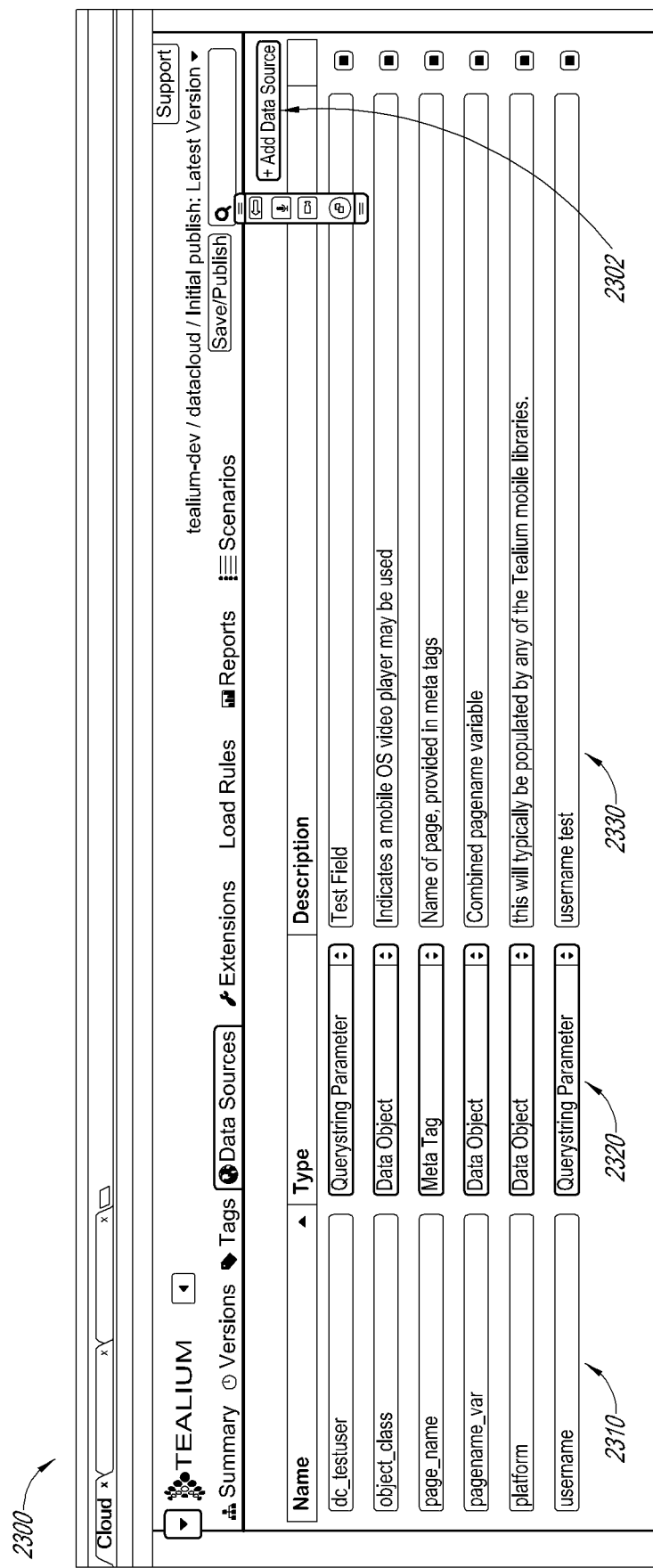
Figure 24:
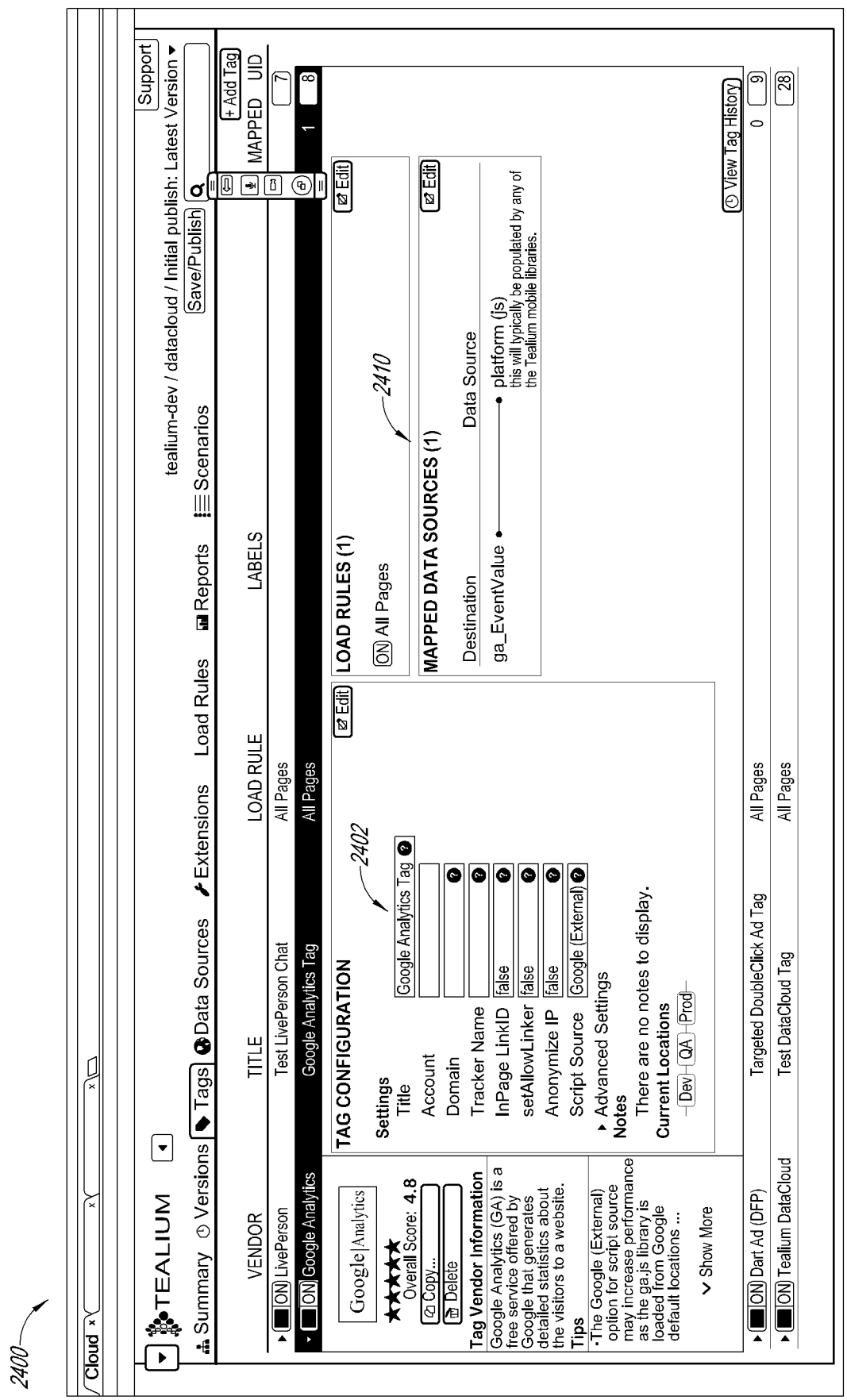
FIG. 24 depicts an embodiment of a reporting user interface.

FIGS. 5 through 24 depict example user interfaces that can be output by the visitor processing system 140 or 240. These user interfaces include features for customizing visitor profile template configurations, analyzing and generating segment reports, integrating visitor data collected by the visitor processing system with external vendor features, and the like. In particular, FIGS. 5 through 20 depict visitor profile configuration user interfaces that can be generated by the visitor profile configuration module 242, FIG. 21 is an example user reporting interface described below, and FIG. 22 is an example integration user interface which is also described below. In addition, FIG. 23 depicts an example data source user interface, and FIG. 24 depicts an example data mapping user interface. Each of these user interfaces are described in greater detail below.

Each of the user interfaces shown includes one or more user interface controls that can be selected by an marketing user, for example, using a browser or other application software. Thus, each of the user interfaces shown may be output for presentation by a browser such as the browser 105 or the like or any other application software. The user interface controls shown are merely illustrative examples and can be varied in other embodiments. For instance, buttons, dropdown boxes, select boxes, text boxes, check boxes, slider controls, and other user interface controls shown may be substituted with other types of user interface controls that provide the same or similar functionality. Further, user interface controls may be combined or divided into other sets of user interface controls such that similar functionality or the same functionality may be provided with very different looking user interfaces. Moreover, each of the user interface controls may be selected by a user using one or more input options, such as a mouse, touch screen input, or keyboard input, among other user interface input options.

Figure 5:
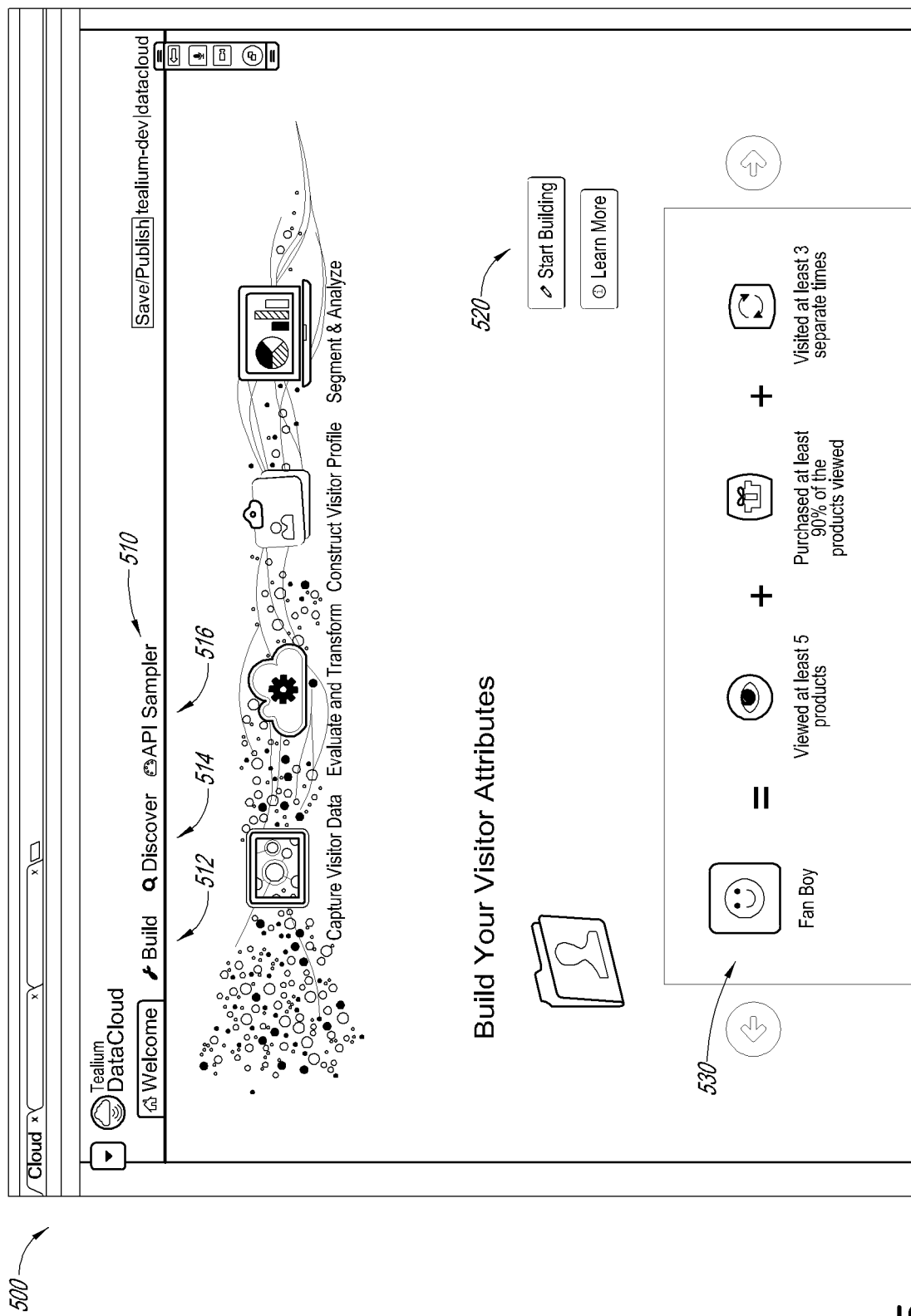

Turning to the visitor profile configuration user interfaces of FIGS. 5 through 20, a visitor profile configuration user interface 500 in FIG. 5 is shown. The user interface 500 includes features for constructing visitor profile templates, discovering data with respect to visitor profiles created from visitor data by generating reports and features for obtaining visitor profiles through API access. The example visitor profile configuration user interfaces can provide functionality for marketing users to specify different types of visitor profile templates to be used in creating visitor profiles from captured visitor data.

In FIG. 5, the user interface 500 includes various menu options 510 for accessing features of the visitor profile configuration module 242 and reporting module 248 of the visitor processing system 240. These menu options 510 include a set of tabs 512, 514 and 516 that may be selected by a user. The menu options 510 include a build option 512 which upon selection can output a user interface 600 shown in FIG. 6 (described below) or the like, a discover option 514 which upon selection can output a custom reports interface 2400 shown in FIG. 21 (described below) or the like, and an API sampler option 516 which, upon selection, can output an integration user interface 2200 shown in FIG. 22 (described below) or the like.

Using the build option 512, an marketing user can configure visitor profile templates. As described above, a visitor profile template can be made up of one or more attributes (or rules, discussed below) which are defined or customized by a marketing user. Some attributes may be updated each time an event happens, such as a visitor interaction with a content page, while other attributors may be composed of multiple conditions and rely on values of other attributes created by the marketing user. As described above, badges are one example of these attributes. A badge can include an icon or label that may be assigned to a visitor based on different attributes or characteristics of that visitor's interactions with the content page, whether within a single visit or over multiple visits.

One example of such a badge is shown in FIG. 5, the badge 530. The badge 530 is shown as merely an example to illustrate one optional configuration of an attribute that may be made by a marketing user. The badge 530 is titled "fan boy" and depicts a square icon with a smiley face superimposed therein. The "fanboy" badge represents the following other attributes of a visitor, including that: the visitor has viewed at least five products on the content site, has purchased at least 90% of the products viewed, and has visited the content site at least three separate times. These attributes may be configured by a marketing user using the various user interfaces shown in FIGS. 6 through 20. Another example of a badge that might be configured by a marketing user is a window shopper badge. For instance, the window shopper might be assigned to a user having the following attributes: the user is visited at least four times to the content site, has never made a purchase, and has never added items to his shopping cart (or has added items to his or her shopping cart but has never purchased any of those items).

As another example, a frequent visitor badge might be assigned to a user who has visited a content site a total of at least 20 times and has visited at least two times in the last seven days. As another example, an impulse buyer badge might be assigned to a user who has an average product view per purchase of less than two and a total products purchased is greater than one. Further, still another example of a badge might be a VIP user badge that might be assigned if a user has visited a content site more than two times per week, has a spending total in excess of $1,000, and has tweeted a link or liked an item on the content page on Facebook (or another social networking site). These badges and the criteria that trigger their assignment to visitors are merely examples of a massively customizable number of badges that may be configured by marketing users to represent visitors to the content site based on the attributes of their visiting interactions with the content site.

As described above, data about the user visits may be obtained by the tag container and the tag on the tag server and provided to the visitor processing system. The visitor processing system can apply the attributes and rules for transforming those attributes into badges or other types of attributes which will be described in greater detail below. Further, using the reporting user interface 2100 of FIG. 21 or the like, a marketing user can analyze different segments of visitors based on the data collected about those visitors and transformed into specific attributes such as badges.

a. Attribute Creation Overview and Example Badge Attribute Creation

Figure 6:
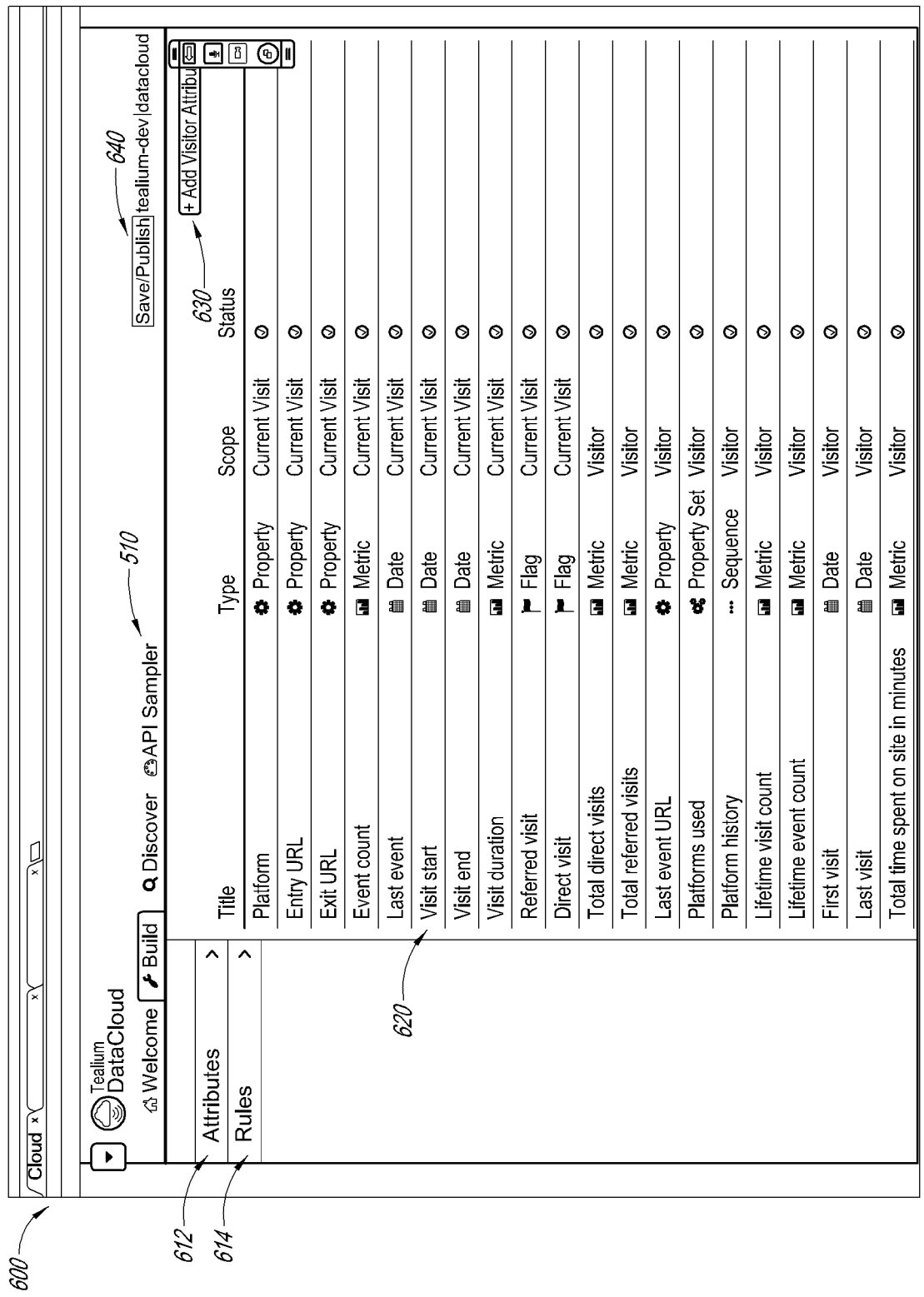

Turning to FIG. 6, a user interface 600 is shown that may be obtained by a user selecting the build menu option 512 from FIG. 5. In the user interface 600, user interface 600 options for selecting attributes 612 and rule 614 are provided. The attributes 612 can be attributes of visitors or attributes associated with visitor interactions with the content site. The attributes may be as simple as flags indicating whether a user has performed a certain interaction with respect to the content site, such as clicking on a link or purchasing a product. Conversely, the attributes may be as complex as a funnel representing a predefined ordered list of events, such as a payment funnel that occurs through a series of clicks or item selection events made by a user.

In the depicted embodiment, the attributes option 612 is selected and a plurality of example attributes 620 are shown organized by title, type, and scope. Some examples of these attributes include a "visit start date" that may be set to determine when a user started visiting a website, a "visit end date" that may be used to determine when a visitor ended his visit, a "visit duration," "lifetime visit count," and the like. The attributes 620 shown can be collected for all end users that visit the content site or a subset thereof. Options may be provided in some embodiments for a marketing user to determine which subset of users will be tracked according to the selected attributes.

The example types of attributes 620 shown include properties, metrics, dates, flags, sequences, and the like. Other attributes may also be provided, examples of which will be described in greater detail below. The scope of the attributes can relate to the current visit that a visitor is experiencing with respect to the content site. The current visit can be a current browse session, for instance, with respect to the content site. The current visit may begin when the user initially loads a content page from the content site and may end when the user leaves the content page or is otherwise inactive for a period of time (such as 30 minutes or more). Alternatively, the scope can refer to the visitor instead of the current visit and may therefore correspond to lifetime visits to the content page by the visitor. Other scopes are possible, including a configurable time period such as the past 30 days or the like.

An add visitor attribute button 630 is also shown in the depicted embodiment. The add visitor attribute button 630 may be selected by a user to add a new visitor attribute to the list of attributes 620. Likewise, any of the attributes 620 may be selected by a marketing user to edit the attribute 620. Upon selection of the visitor attribute button 630, a user interface such as the user interface 700 of FIG. 7 may be output for presentation to the user.

Figure 7:
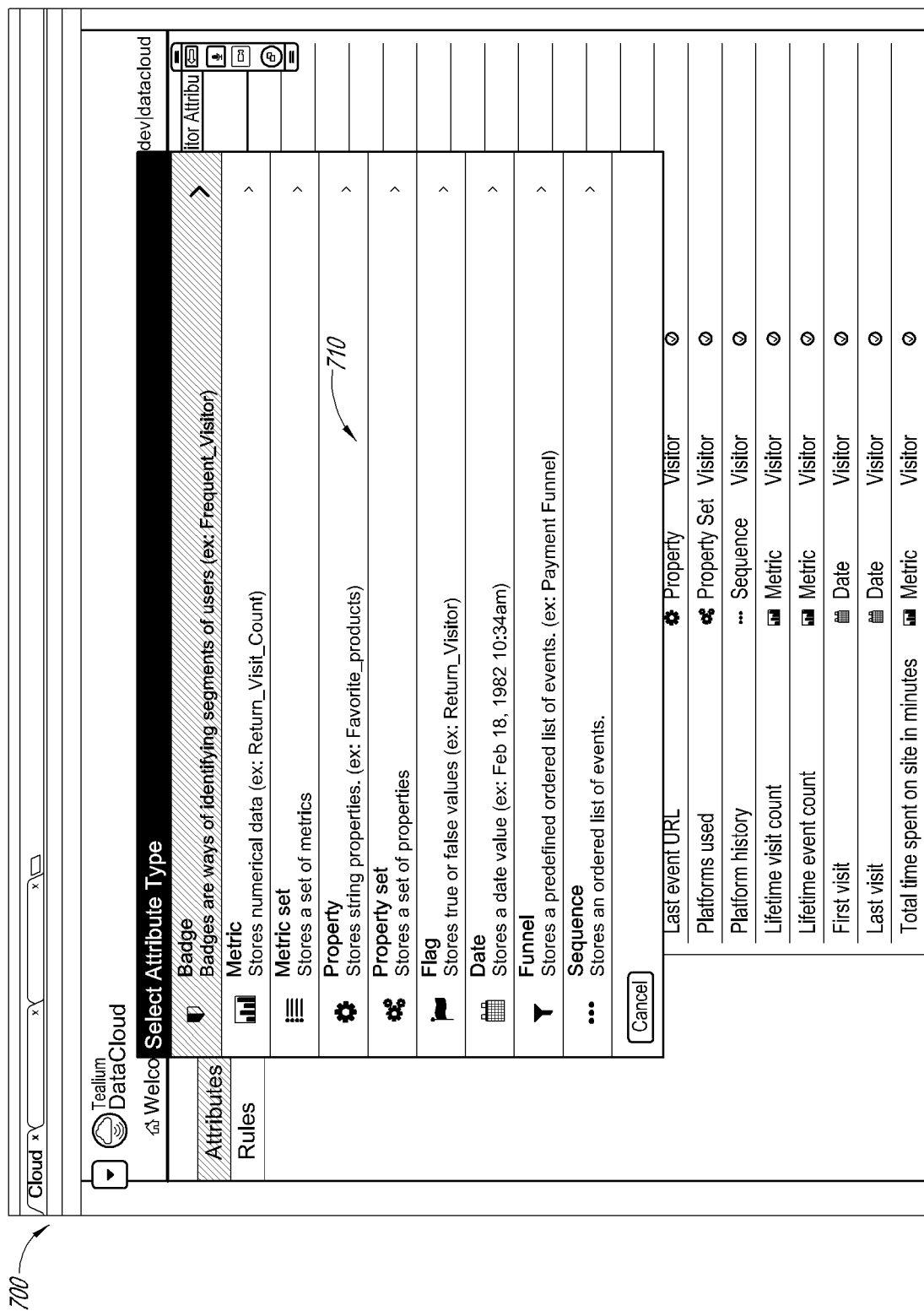

In the user interface 700 of FIG. 7, various options for selecting attribute types 710 to create a new attribute are shown. Upon selection of one of the attribute types 710, the user can define specific characteristics associated with the attribute to be used for analysis of data collected with respect to end users. Users whose characteristics in interacting with the content site satisfy characteristics or rules associated with an attribute can be assigned that attribute. In the depicted embodiment, the attribute types that can be selected from include badges, which can include labels or other indicia used to identify segments of users (e.g., frequent visitors); metrics, which can store numerical data such as a return visit count; metric sets, which can store sets or collections of metrics; properties, which can store strings such as the name of a favorite product; property sets, which can store sets of properties; flags, which can store true or false or Boolean values; dates, which can store a date value such as a date when a user last visited the content page; funnels, which can store a predetermined order list of events such as a payment funnel; and sequences, which can store an ordered list of events.

For illustrative purposes, creation of an attribute of the badge type is shown in detail with respect to FIGS. 8A through 10. Example user interfaces for customizing other attribute types are described below with respect to FIGS. 11 through 17.

Figure 8A:
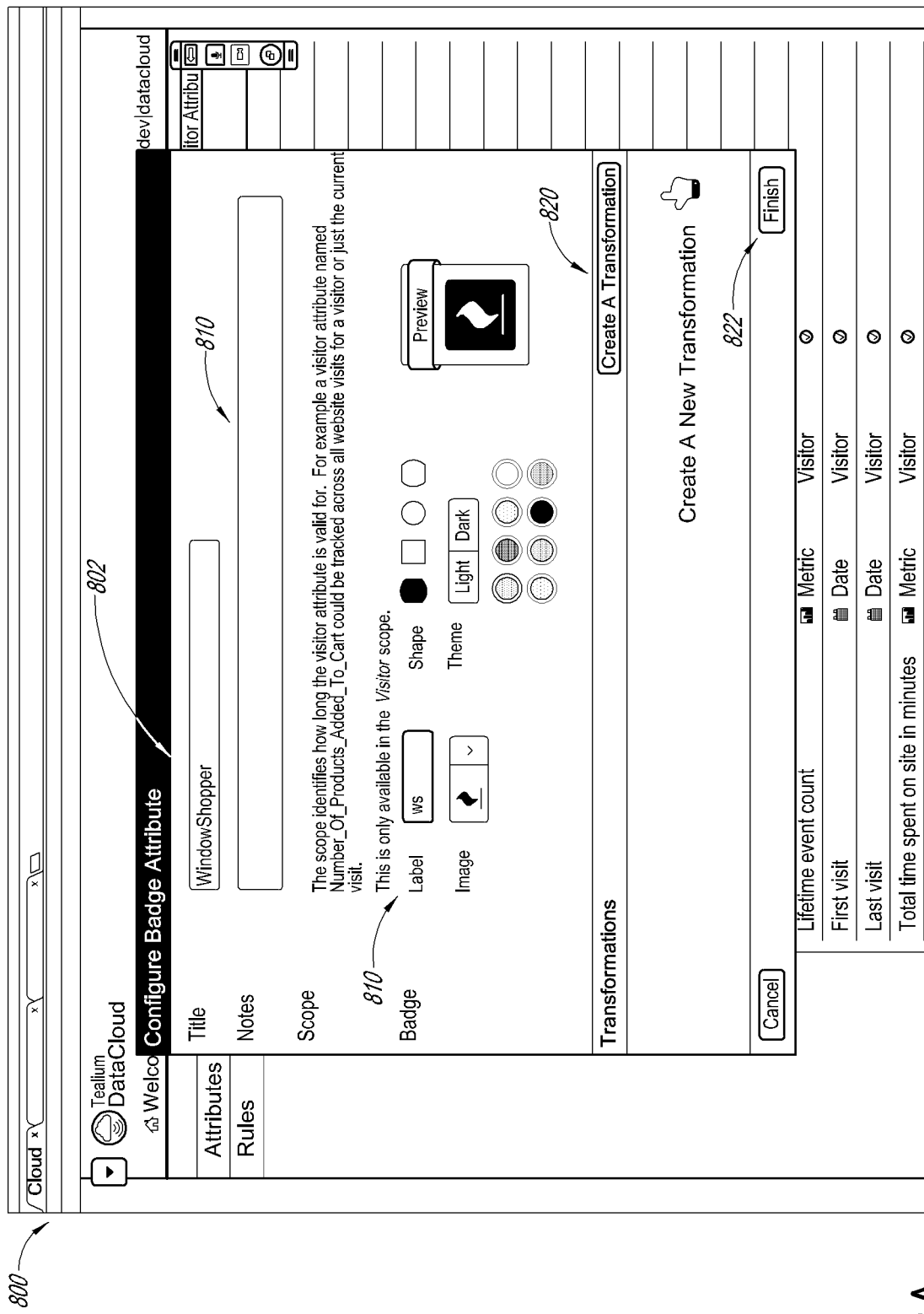

Referring to FIG. 8A, if the badge attribute type 710 is selected in FIG. 7, a user interface 800 or the like may be output for presentation to a user. In the user interface 800, various options 802 for configuring a badge attribute are output for presentation to a user. These options 802 include controls 810 for configuring characteristics of a badge, such as the title of the badge. In the depicted example, the title of the badge is "Window Shopper" and may have been entered by a marketing user. The options 802 also include controls 810 for entering any notes that a marketing user may wish to enter to describe the badge.

In the depicted embodiment, the scope for badges is the visitor scope, and thus the badge may correspond to lifetime visits by the visitor. However, in other embodiments, the scope can be for a current visit instead of the visitor scope, or for some other time period as described above. The user interface controls 810 also include functionality for specifying further details about the badge itself, such as a text label to be displayed for the badge, an image to be selected for the badge, shape, theme, and colors to be selected for the badge, and the like. Thus, a marketing user can define any characteristic to be associated with a badge to distinguish the badge from other badges and to provide customization of the look and feel of the badge.

In addition, a created transformation button 820 is also provided that can be selected by a marketing user to add a transformation for the badge. The transformation can include one or more conditions or rules that transform incoming visitor data collected by the visitor data collector 244 into data that represents the attribute shown. In particular, in the depicted embodiment, the rules can transform visitor data into an indication of whether a visitor should be assigned the "Window Shopper" badge. The transformations may be performed by the visitor data aggregator 246 of FIG. 2, which can aggregate the data and transform the data into a useable format according to the one or more conditions or rules specified in the transformation. By selecting a finish button 830, the badge attribute can be created.

If the created transformation button 820 is selected, a popup box (not shown) can provide options for either assigning a badge based on a set of conditions or removing a badge from visitors when those conditions no longer apply. Other conditions for assigning the badge to the visitor can include when the visitor is a new visitor or when it is a new visit or upon any page event or the like.

Figure 8B:
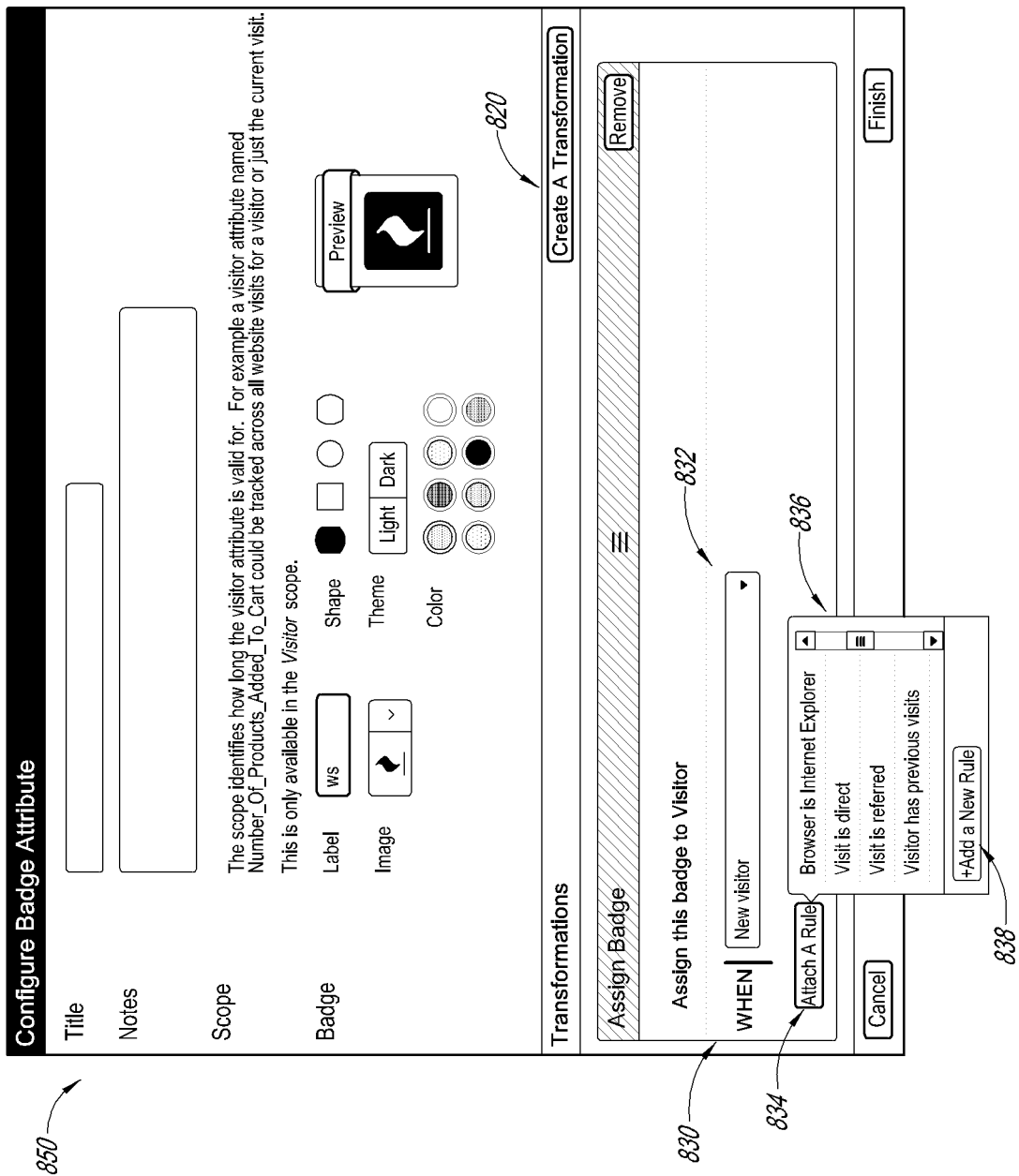

If a user selects to assign a badge from the popup box, a user interface such as user interface 850 of FIG. 8B can be displayed. In the user interface 850 of FIG. 8B, an example transformation 830 is shown. The example transformation 830 includes an example condition 932 that assigns this badge to a visitor when a visit has ended. Additional rules may be specified for triggering the assignment of this badge by selecting an "attach a rule" button 834. Upon selection of the attach rule button 834, a list of rules 836 can be displayed, from which a user can select to attach to the transformation. Some example rules are shown in the list of rules 836, including "visit is direct," "visit is referred," and so forth. Other rules may be selected by scrolling down through the list 836. These rules may be created by accessing the rules option 614 of FIG. 6, for example, as described in greater detail with respect to FIG. 18A below.

Rules can also be created by selecting an "add a new rule" button 838. Selection of this button 838 can cause a user interface 900 shown FIG. 9 to be displayed. (A similar interface can be selected from FIG. 6 to create a new rule; see FIGS. 18A and 18B) In the user interface 900 of FIG. 9, a new rule creation box is shown that includes options for creating a new rule, including a text box 910 for titling the rule. In this particular embodiment for the window shopper badge, a user has created a title "Did not purchase this" for this rule. One or more conditions 920 can be selected for the rule. The condition 920 shown is an "if" condition and includes subconditions 922, 924, 926, and 927. The subconditions include a dropdown box 922 for selecting an attribute (see also FIG. 18B). Any attribute available in the attribute list 620 of FIG. 6 can be selected or a new attribute can be created (see FIG. 18B). A dropdown box 924 includes options for comparing the attribute selected in the box 922 with some value selected from box 926. The value selected in box 926 can be an attribute, such as a metric, or some custom value that can be specified in box 927. Controls 928 are provided for adding (or removing) additional conditions to the "if" statement. An "add or condition" button 929 may also be selected to add a Boolean "OR" condition to the rule.

Figure 9:
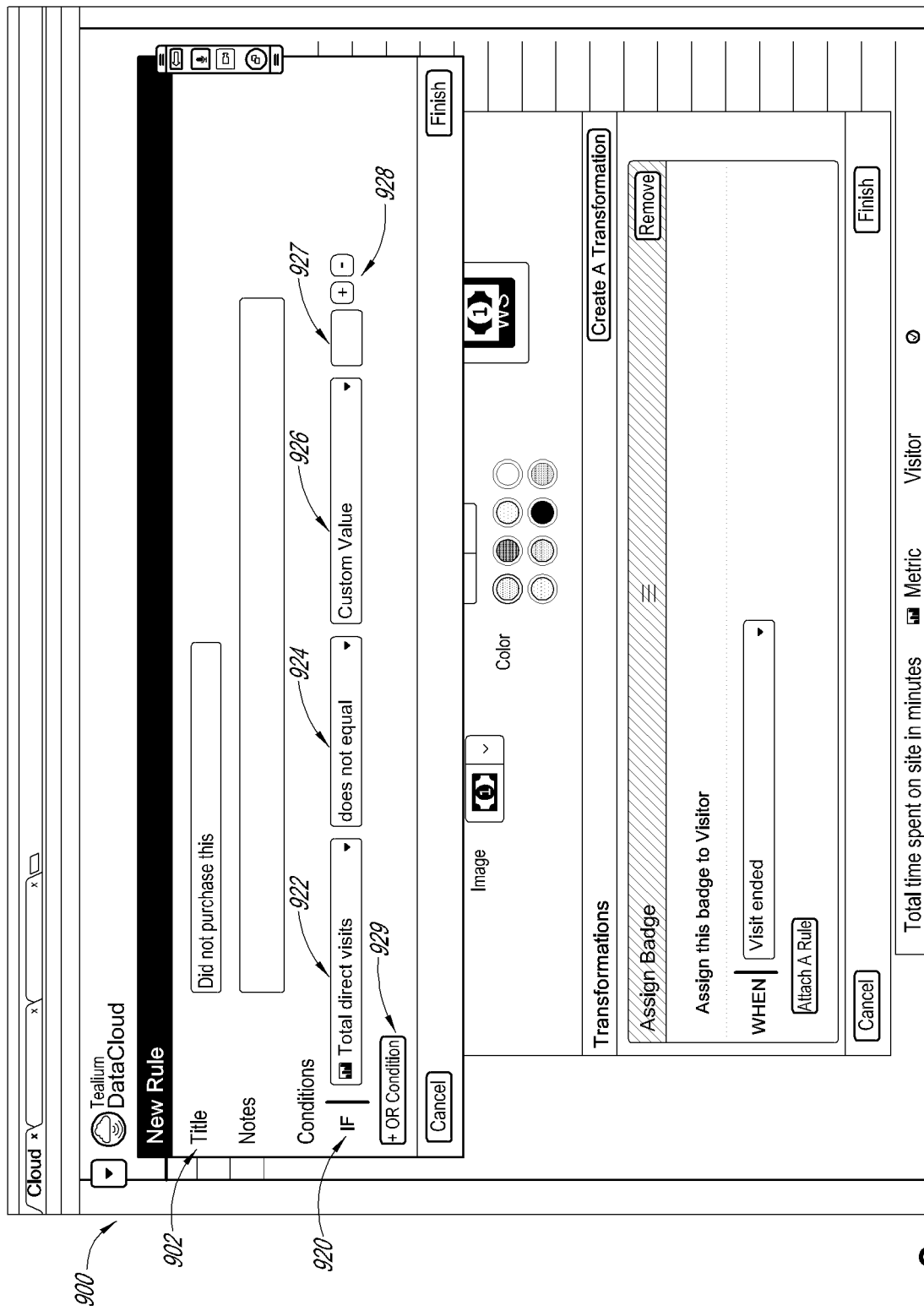
Figure 10:
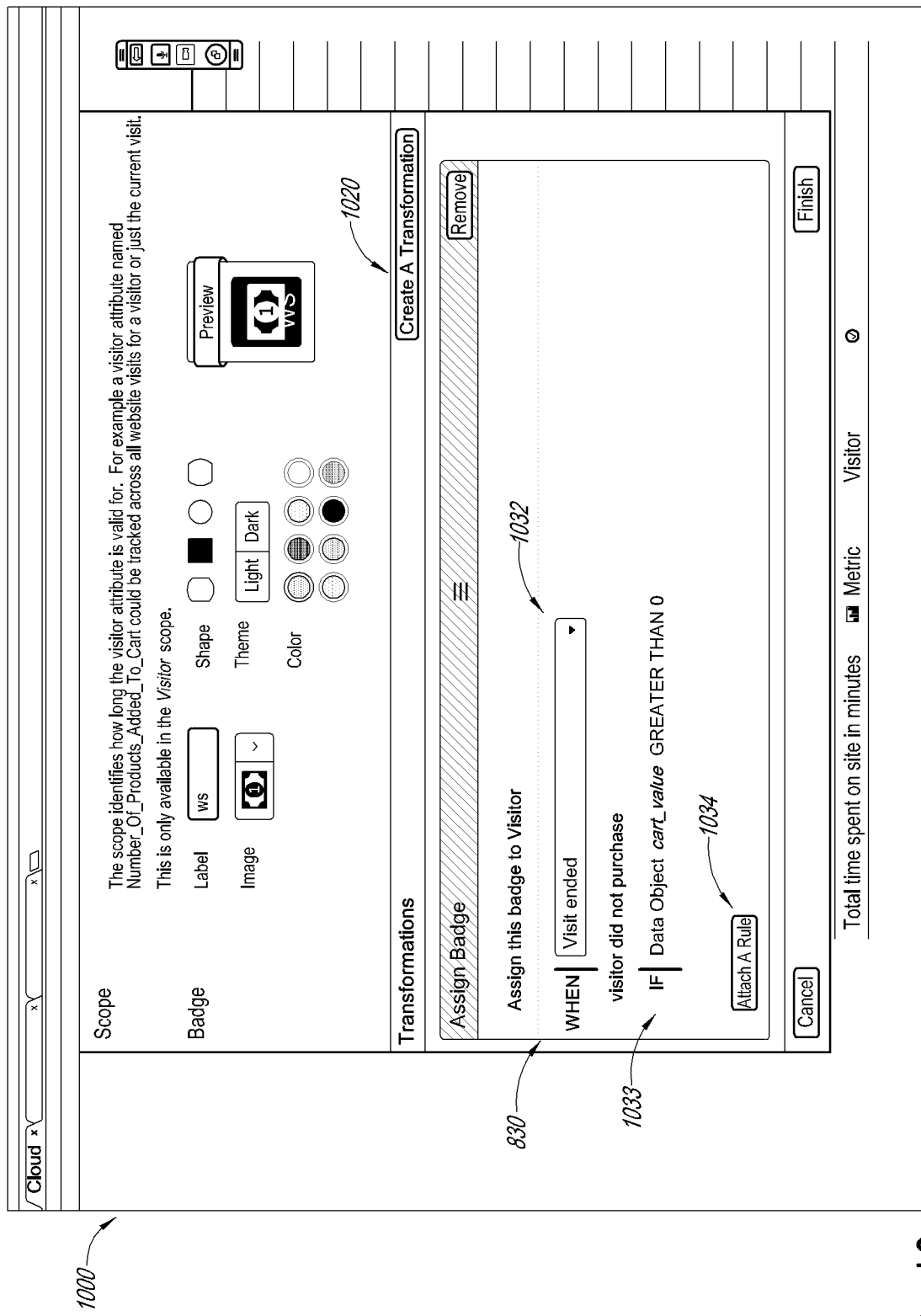

Referring to FIG. 10, a user interface 1000 is shown in which an example rule has been attached to the transformation 830 for the "Window Shopper" badge of FIG. 8B. The rule 1033 is entitled "visitor did not purchase." This rule is triggered if the data object "cart_value" is greater than zero. This rule may have been created using the user interface 900 of FIG. 9 to specify that the data object "cart_value," selected from the dropdown box 922, is greater than (box 924) a custom value (box 926) of zero (text entered into box 927).

Thus, in certain embodiments, the badge window shopper created in FIGS. 8 through 10 can be assigned to a visitor when a visit has ended and if the visitor did not purchase as specified by the rule 1033. Of course, additional rules may also be attached to any badge attribute to create a more complex set of conditions or rules that would trigger the badge being assigned to a visitor. Likewise, similar sets of one or more rules or conditions can be attached to a badge attribute to remove or deassign a badge from a visitor.

b. Example Attribute Creation—Other Attributes

Figure 11:
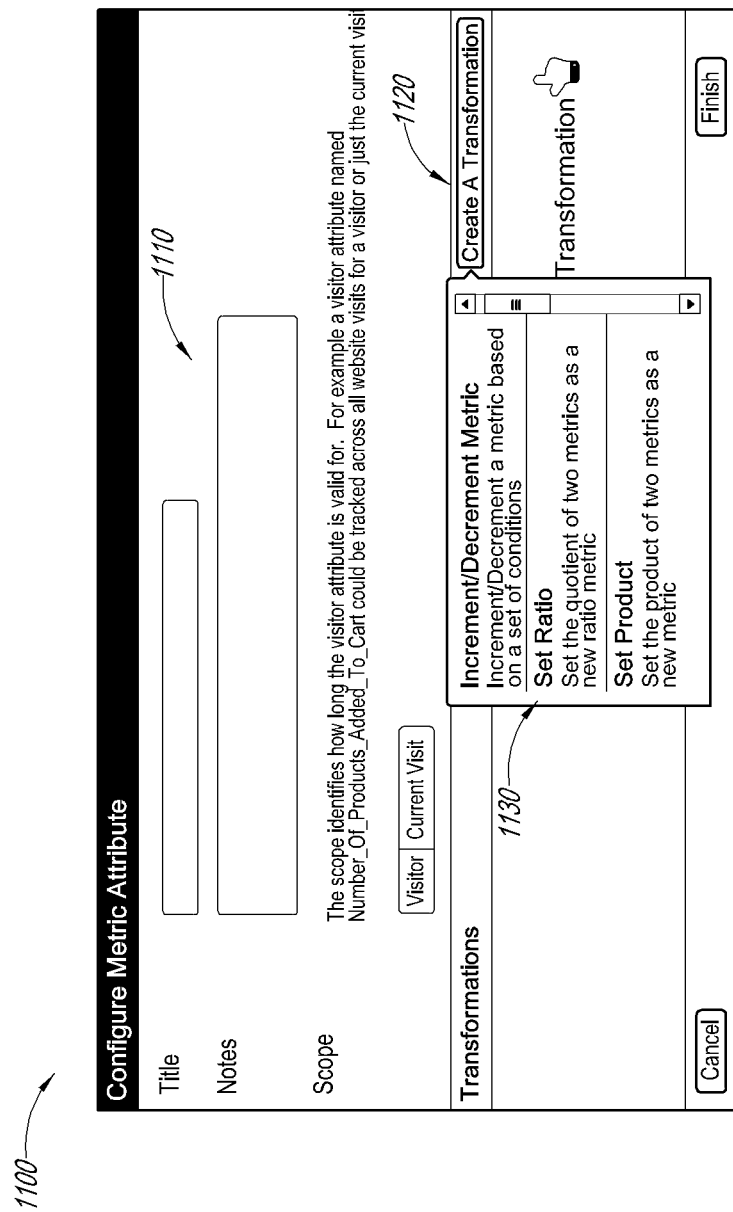

FIGS. 11 through 17 illustrate example user interfaces for creating other types of attributes. Referring specifically to FIG. 11, an example user interface 1100 is shown for configuring a metric attribute. As described above, metric attributes can store numerical data about a user visit or collection of visits. In addition, metrics can perform operations on numerical data to produce new metric values, for instance by performing transformations, much like the transformations that were discussed above with respect to the badge attribute. The user interface controls for configuring the metric attribute are similar to the user interface controls for configuring the badge attribute in some respects including, for example, controls 1110 for creating a title and entering optional notes about the metric attribute. In addition, a scope selector 1112 allows the scope to be identified for this metric attribute as being either associated with the visitor (e.g., over a collection of the visitor's visits) or for the current visit that the visitor has with the content site. Attributes created with the "current visit" scope can be triggered within each individual visit, as opposed to over several visits in some embodiments.

A "create a transformation button" 1120 may be selected by the user to create transformations. Upon selection of this button 1120, a select box 1130 is shown giving options for creating different types of transformations to associate with this metric attribute. These types can include an increment or decrement metric that increments or decrements a metric based on a set of conditions. For instance, a visit count can be a metric that uses the increment transformation such that each time an end user visits a content site, this metric is incremented by one to produce a total visit count over the lifetime of the visitor. Other metric creation options in the select box 1130 include a set ratio metric or transformation that can set the quotient of two metrics as a new ratio metric; a set product transformation that can set the product of two metrics as a new metric; a set difference transformation that can set the difference of two metrics as a new metric; a set sum transformation that can set the sum of two metrics as a new metric; set metric transformation that can set the metric to a specific number; and a set difference between two dates transformation that can set the difference between two dates as a new metric. These transformations are examples and may be further combined, for example, by creating both a product and a sum, or both a quotient and a difference, or any number of different operations to create a single metric from a plurality of data inputs related to visitor data.

Although not shown, a similar user interface could be used to define a metric set. Metric sets can include a set of metrics that is dynamic in nature, in contrast to metrics, which may be static in nature. An example of a static metric is "time on site," which can represent the amount of time a user spent in a browse session on a content site. A metric set can grow over time with name-value pairs that represent changing metrics with respect to user visit behavior. For example, a metric sent might include an array of times to be collected, such as "time-spent["football"]=120 minutes, time-spent["baseball"]=60 minutes," etc. The values in a metric set may be determined at runtime, rather than during configuration, although the opposite may be true in some embodiments.

Figure 12:
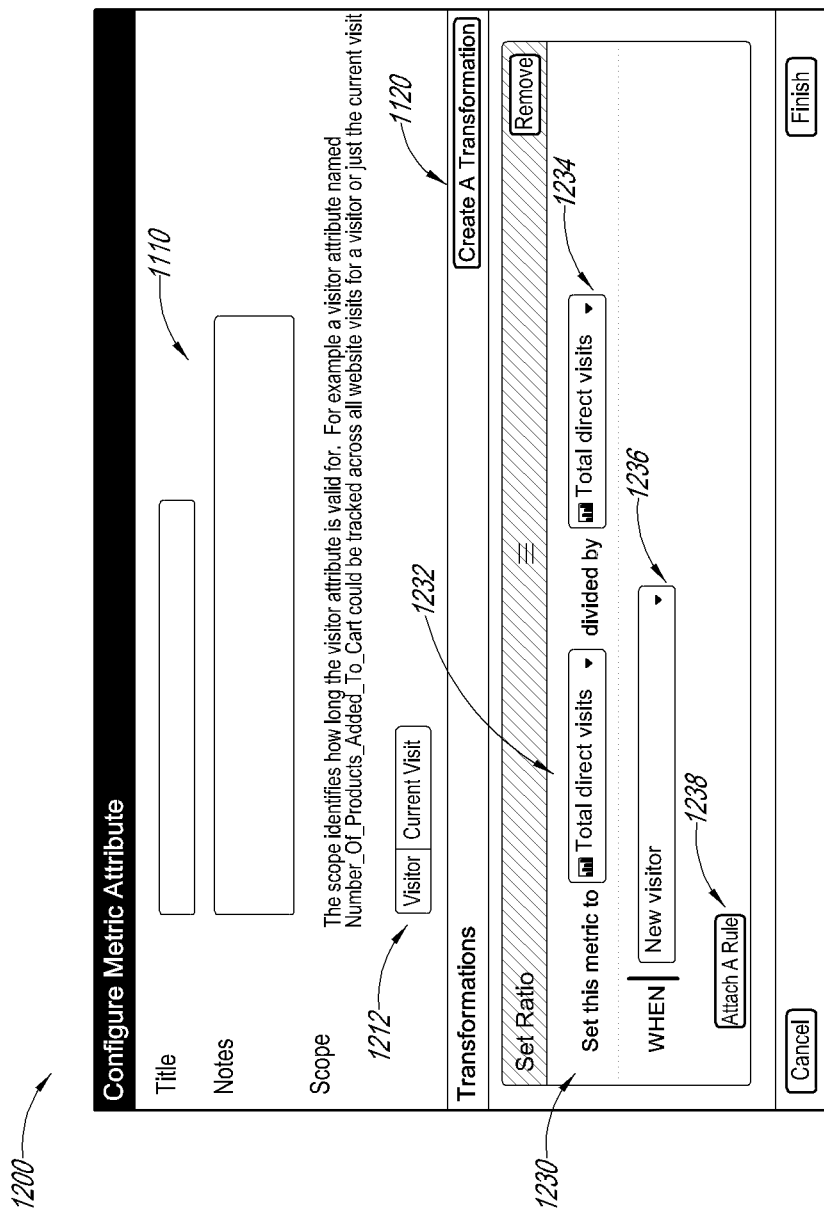

For instance, as shown in FIG. 12, an example user interface 1200 depicts a transformation 1230 selected from the create a transformation button 1120 to set a ratio. In the depicted embodiment, the options 1230 enable a metric to be set to a first attribute value 1232 selected from a dropdown box divided by a second attribute value 1234 selected from a dropdown box, when a certain triggering event occurs selected from a dropdown box 1236 (such as when the visitor is a new visitor or when the visit ends, etc.). Likewise, a rule 1238 can be attached to the metric to apply further processing or configuration to the metric. Rule creation using the attach a rule button 1238 can be similar to rule creation described above and below with respect to FIGS. 18A through 20.

Figure 13:
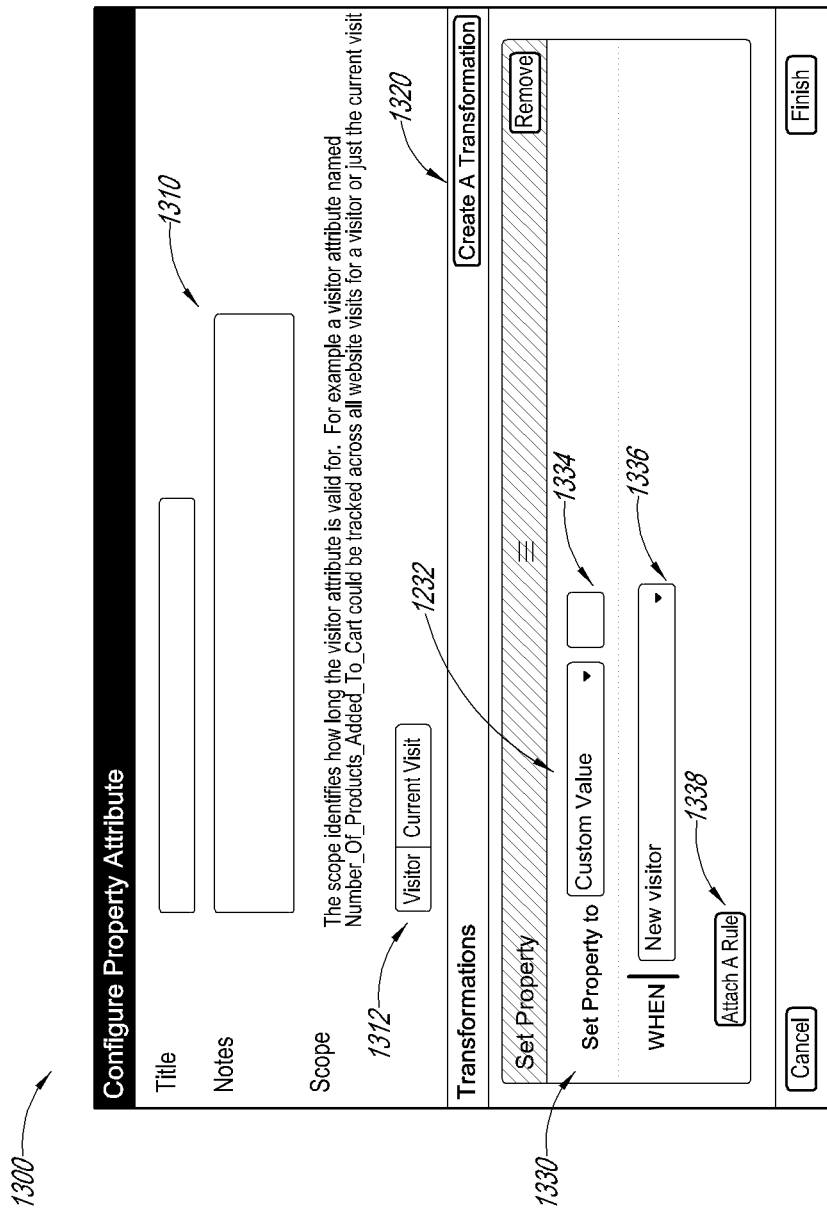

FIG. 13 depicts an example user interface 1300 for configuring a property attribute. The user interface 1300 is similar to the other user interfaces described above for creating or configuring attributes. For example, the user interface 1300 includes options 1310 for adding a title and optional notes to associate with the property attribute as well as scope buttons 1312 to determine the scope of this attribute. Upon selection of a creative transformation button 1320, transformations 1330 are shown. One or more transformations can be created for this attribute similar to the other attributes described above. The transformation 1330 provides options to set a property to a custom value or another value defined elsewhere in the visitor processing system. For instance, data sources can be specified that are provided in the content site's content pages (see, e.g., FIG. 23). These data sources can include, e.g., a user name of the visitor, page name, cart value for an electronic shopping cart value, or any other piece of data which the content page wishes to define and track. The property attribute can be set to this particular value specified by a data source or any other attribute via the transformation 1330. As a result, the property attribute can be stored and also operated upon by other attributes or rules. As an example, a "cart_value" property attribute can be checked by a rule in a "Window Shopper" badge attribute to determine whether a user ever purchases items or is merely just looking. Likewise, properties may be used to filter segments or otherwise arrange results in a reporting user interface (see, e.g., FIG. 21).

Although not shown, property sets can be configured similarly. The attribute of a property set can contain more than one assigned string property value. If a property (not a property set) called "category" is set to "football" (e.g., representing a football-related link selected by a user) and is then set again to "baseball" (e.g., representing a similar link), the result may change from "category=football" to "category=baseball." Each of these properties is a string. In contrast, as property set called "category" can be first set to "football," with the result that "category=[football]," and can then be set to "baseball," with the result that the string "baseball" is appended to the property set such that "category=[football, baseball]." Property sets can be used to detect correlations in visitor data, such as whether a visitor selected links related to both football and baseball within a visit (or multiple visits) to a content page.

Figure 14:
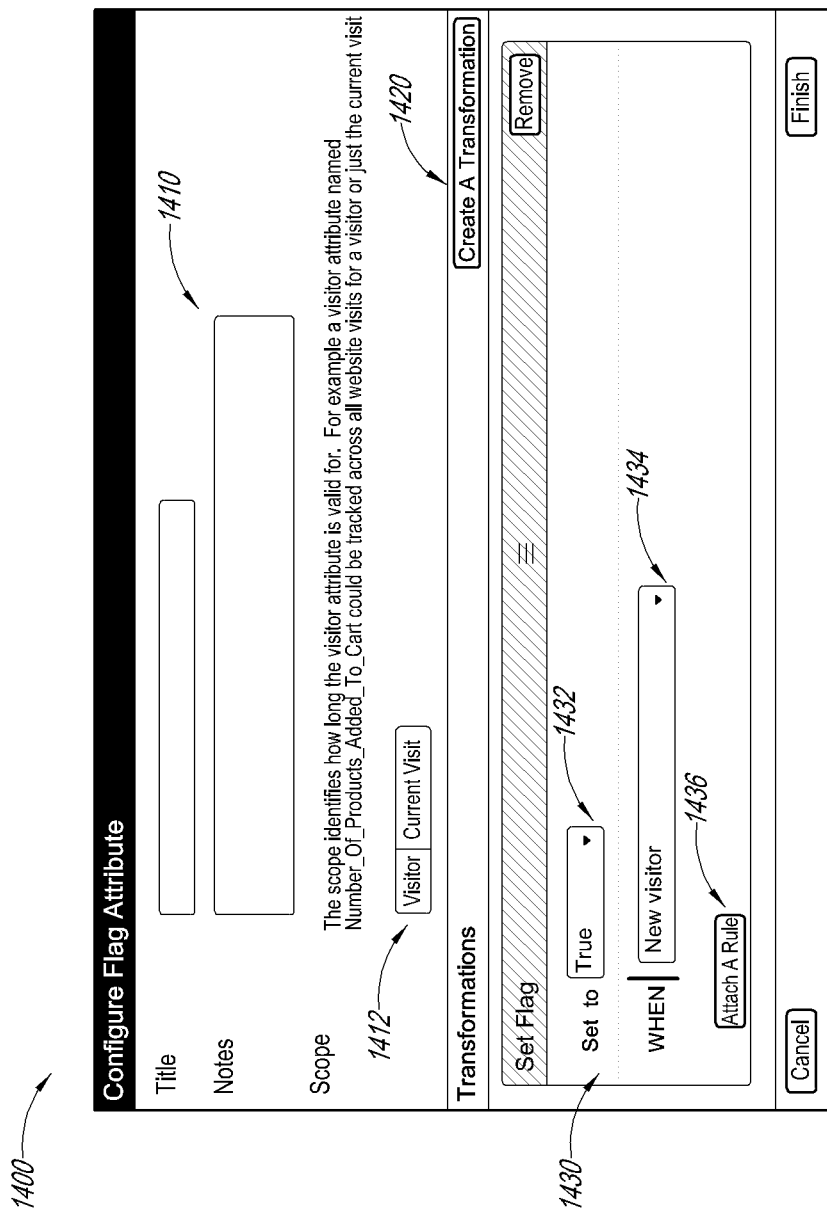

In FIG. 14, another example user interface 1400 is shown, which can be used to configure a flag attribute. The user interface 1400 also includes options 1410 for assigning a title and optional notes to the attribute as well as a scope button set 1412 to define the scope of the attribute. A create a transformation button 1420 is also shown, which can allow one or more transformations to be created. An example transformation 1430 shown can allow the flag to be set to a Boolean value such as true or false when a triggering condition or conditions occur, as defined by the dropdown box 1434, and optionally when one or more rules are satisfied as may be defined by attaching a rule 1436. In a simple example, the flag attribute may be a new visitor attribute and may be assigned when the condition of a new visitor being detected occurs. In another example, the flag attribute may be titled "added item to cart" and may be triggered when the condition of a visitor adding an item to a shopping cart has occurred. This condition may be detected by a rule that detects when their cart value associated with the visitor is greater than zero.

Figure 15:
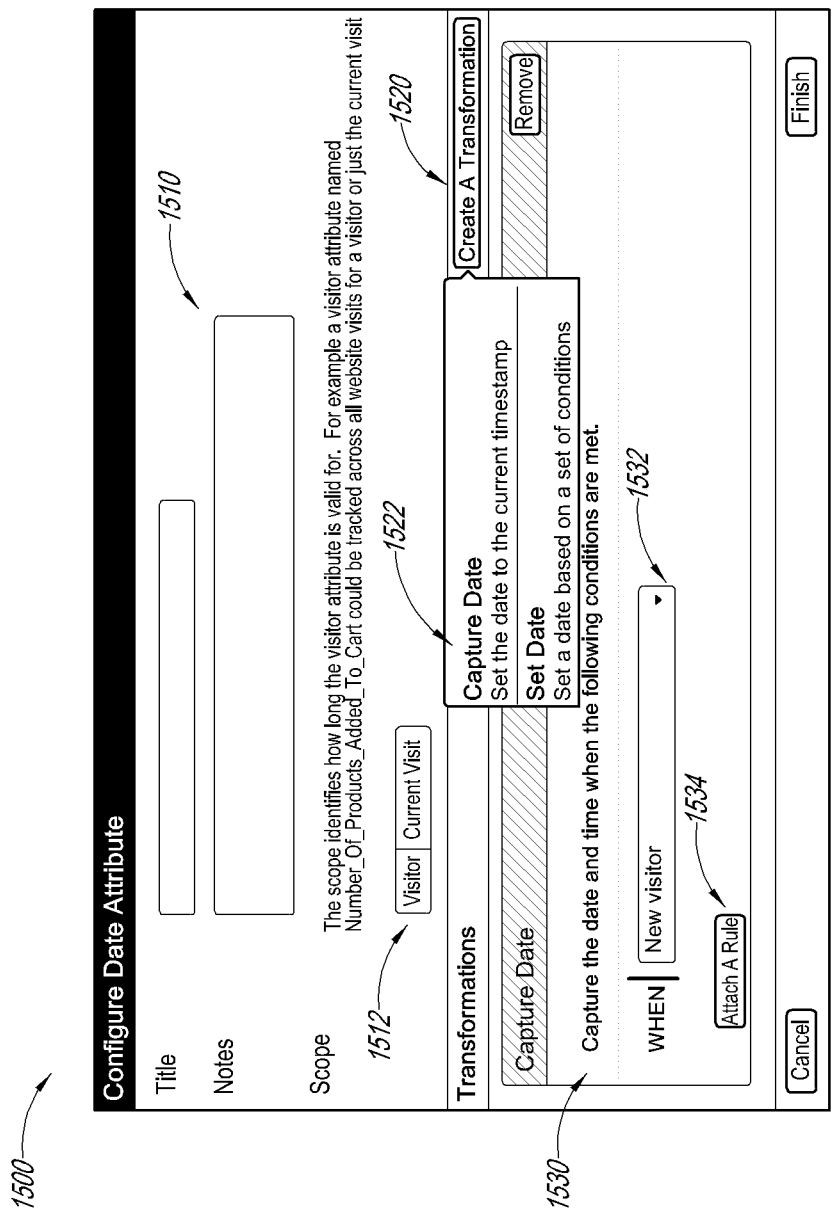

Turning to FIG. 15, an example user interface 1500 is shown for configuring a date attribute. Options 510 are provided for specifying the title of the attribute and optional notes are shown as well as scope buttons 1512 for selecting the scope of the attribute. A creative a transformation button 1520 is shown, which upon selection, enables the user to select from an options popup box 1522 to either "capture the date" to set the date to the current time stamp or to "set a date" based on a set of conditions. In the "capture the date" transformation shown as example transformation 1530, the date attribute can capture the date and time when one or more following conditions are met specified by condition 1532, such as during a visit. A rule may also be attached using button 1534. Thus, the date and time may be captured, for instance, when a user adds an item to a shopping cart or clicks a certain link taking the user to a certain page, etc.

Figure 16:
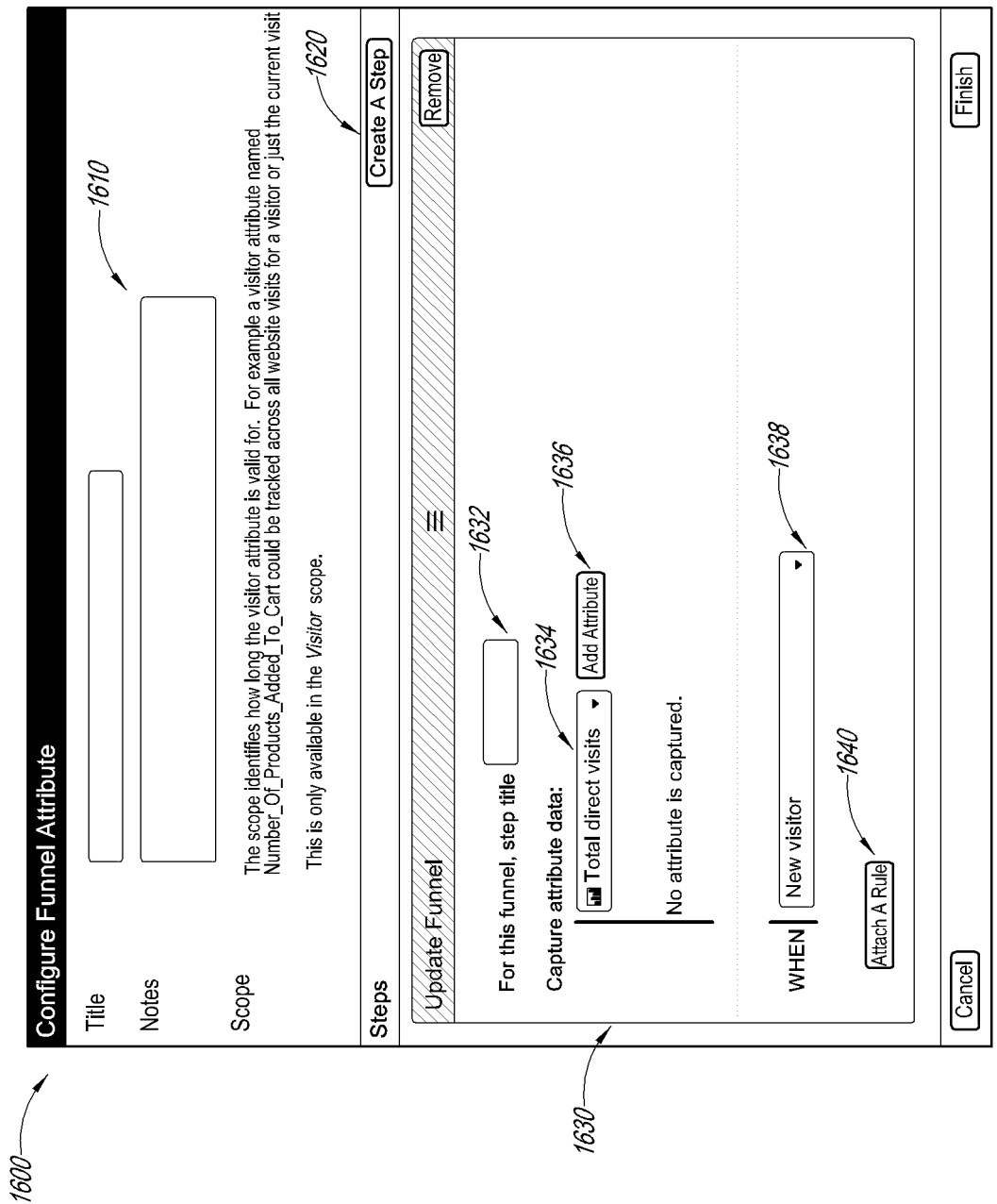

In FIG. 16, an example user interface 1600 is shown for configuring a funnel attribute. Option 1610 for assigning the title and notes are supplied in the depicted embodiment. Scope variables are not provided as the funnel attribute can be determined for a single visit. Alternatively, funnels can be determined from multiple visits. Create a step button 1620 is provided similar to the creative transformation buttons described above. A funnel may include a series of steps including one or more steps that, once satisfied, indicate that the attribute has occurred for a particular visitor. For instance, a funnel attribute can represent a series of steps taken by a visitor prior to (and optionally including) a purchase. Such a purchase funnel can be indicative of how close visitors come to purchasing items; visitors who make it further into the funnel come closer to purchasing, and vice versa.

One example step 1630 is shown to update the funnel, including options 1632 through 1638 for defining when the step has occurred. For instance, a text box 1632 is provided for specifying a title of the step, and a select box 1634 and attribute button 1636 are provided for adding attributes to capture related to the funnel. A condition box 1638 is provided for determining when this step is considered to have occurred. Further, a rule may be attached by selecting a rule button 1640.

In certain embodiments, funnels can provide for the configuration of an expected flow that has a known (or anticipated) start and end. For example, a shopping experience on an electronic commerce website can be modeled as a funnel attribute, with step 1 being viewing a product (e.g., any number of times), step 2 being adding the item to a cart, step 3 being to proceed to checkout, step 4 being filling out shipping information, step 5 including filling out billing information, and step 6 including confirming the order. The funnel attribute can allow the visitor to be traced through the funnel, providing a resulting report of where visitors fall out of the funnel (e.g., by stopping at a certain step in the funnel). This report may be useful to marketing users who wish to determine the conversion rate of end users, among other useful data.

Funnel attributes may be time-ordered, such that in order for a funnel to be associated with a visitor, the visitor must follow the steps of the funnel in order. Other configurations that are not based on time-ordering are possible. Data may be captured at each step of the funnel or at the end of the funnel. For instance, it may be useful to inspect the value of a shopping cart that a user abandoned midway into a purchase funnel. Other funnel attribute features can include the ability to make a step optional, meaning it can be skipped. In the example above, shipping is often skipped because the billing info often provides all the info needed for shipping.

Purchase funnels are merely one example use of funnel attributes. Other example uses for funnels include campaigns, flight check-ins, email sign-ups, or any other sequence of steps that use an online tool on the content site.

Figure 17:
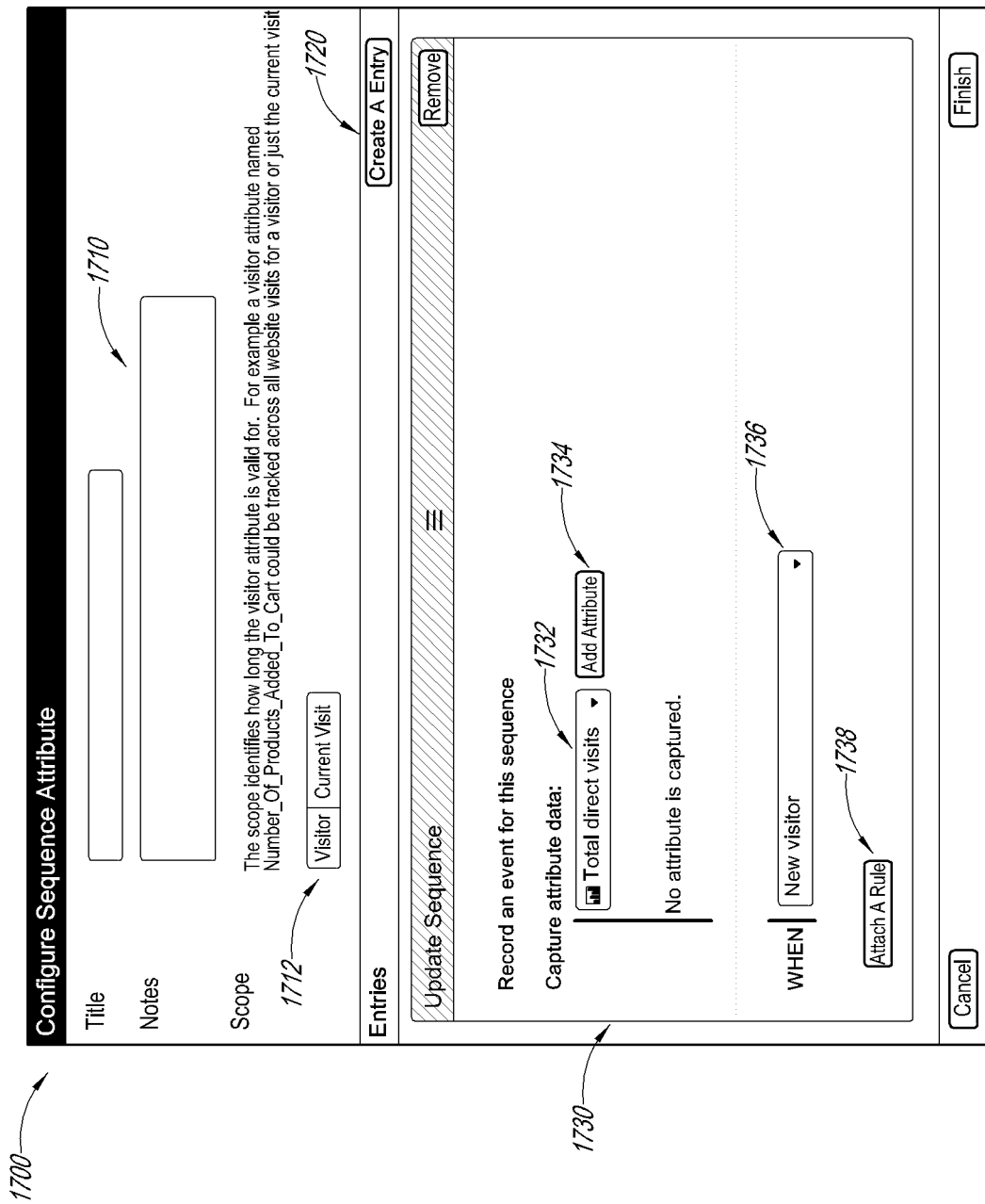

Referring to FIG. 17, an example user interface 1700 is shown for configuring a sequence attribute. The user interface 1700 includes option 1710 for specifying a title and optional notes and a scope button 1712 for selecting the scope. In addition, the user interface 1700 includes a button 1720 for creating an entry, which can be similar to the create transformation buttons described above. One or more entries may be created to update a sequence. An example entry 1730 is shown that records an event for the sequence. The entry 1730 can capture attribute data specified using a select box 1732 and add/or attribute button 1734 upon a condition occurring as specified by the dropdown box 1736. Optionally, a rule may also be attached 1738.

In contrast to funnel attributes, which may have a defined end-goal (such as a purchase), sequences can log or track more general data points, such as click actions or link selection actions of an end user. Sequences can provide a mechanism for logging significant visitor events as a historical trace, without the need to store all the data between the events. For example, an end user's purchase history with respect to an electronic commerce site can be represented by a sequence attribute. The purchase history sequence can include a list of the user's purchases but may not include, for example, each of the user links selected between purchases. Another example of a sequence can be a search keyword history that resulted in a user finding a content page. Yet another example can include a list of movies watched (e.g., in a Netflix™ queue), and the like. Events in a sequence may be associated with a timestamp so that later analysis of the sequence can compare timestamps of the events.

c. Additional Rule Creation Features

Figure 18A:
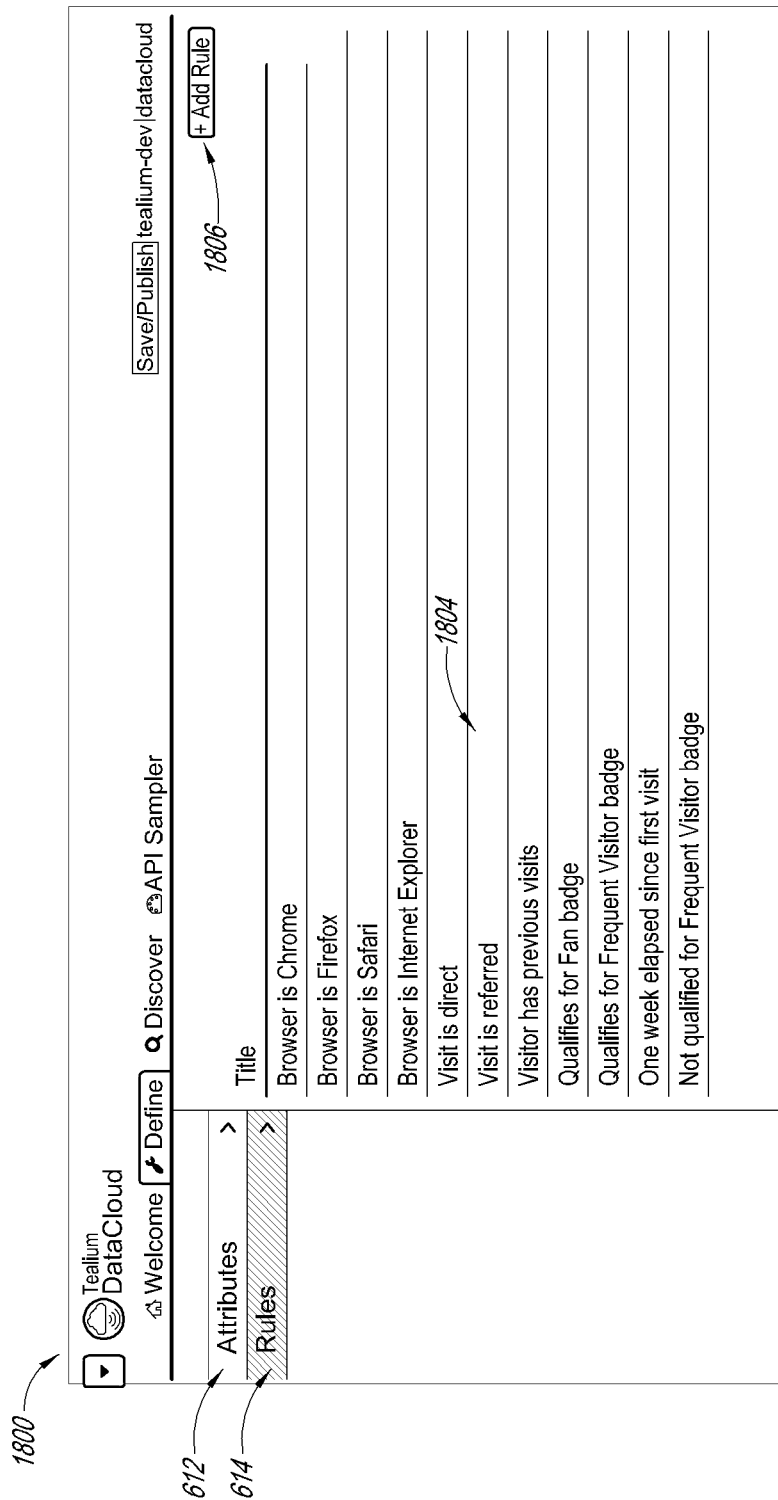

FIG. 18A shows another view of the example user interface 600 of FIG. 6. In particular, the user interface 1800 shows that the rules option 614 of FIG. 6 is selected. A set of rules 1804 is shown, which may have been created by the user or provided by the vendor of the visitor processing system. Each of the rules 1804 may be selected for customization by a marketing user. A new rule may also be created by selecting the add rule button 1806. Various features for creating rules have been described above.

Figure 18B:
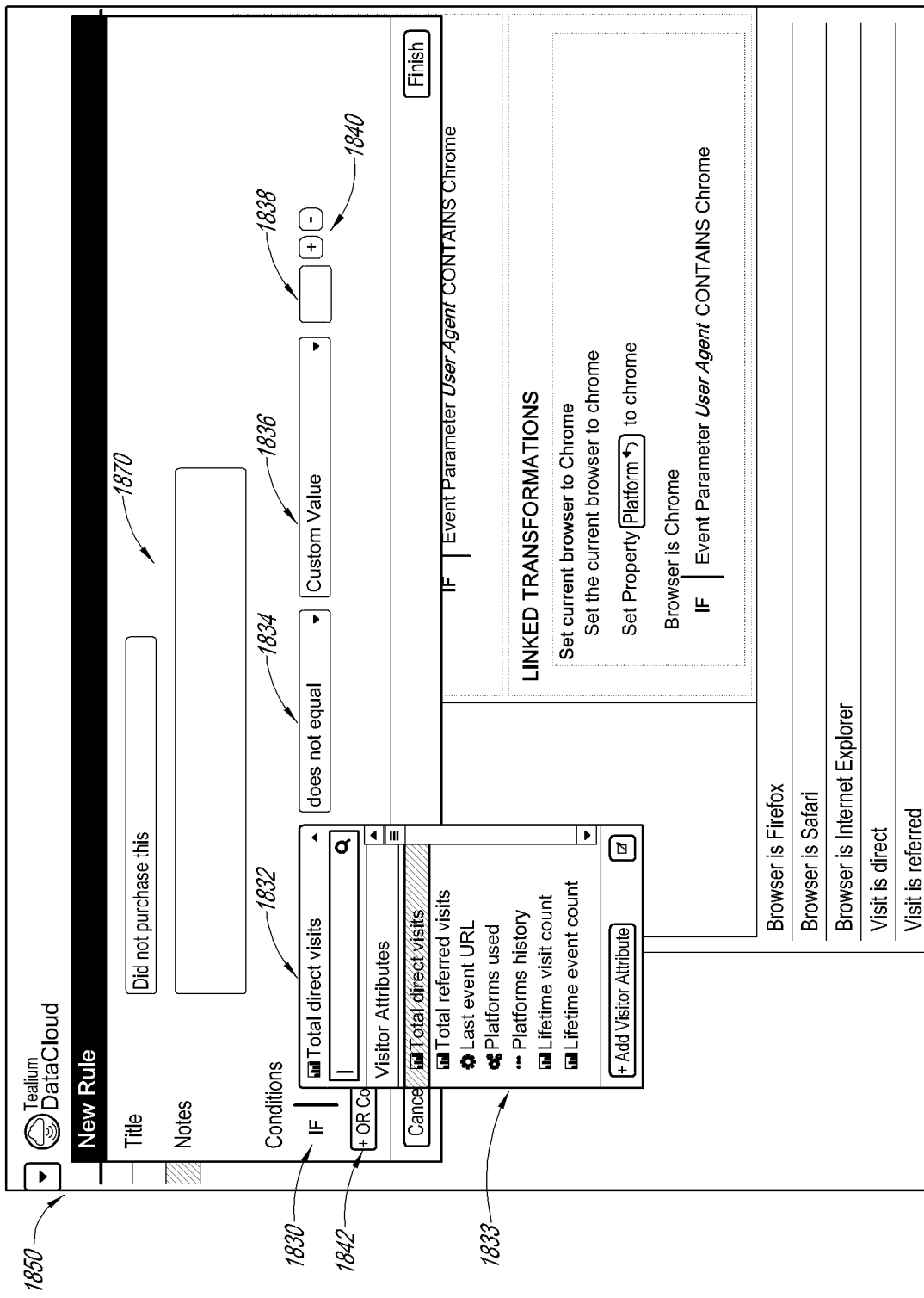

In addition, selecting the add rule button 1806 can show a user interface, such as an example user interface 1850 shown in FIG. 18B. The user interface 1850 provides options 1810 for titling and annotating a rule as well as conditions 1830 to specify for the rule. Selection of these conditions can include dropdown boxes 1832, 1834, and 1836 for specifying subconditions associated with the condition. An example list of attributes 1833 is shown, from which visitor attributes may be selected, data sources may be selected, or the like. Mathematical operators may be selected via the dropdown box 1834 to compare the attribute with a custom value as specified in the dropdown box 1836 or text box 1838. For example, an attribute may be selected from the dropdown box 1832 and compared with a metric or property that is defined elsewhere in the set of attributes described above. Select boxes 1840 can be used to add or take away conditions. An "add or condition" button 1842 can be selected to add one or more additional Boolean "OR" conditions.

Figure 19:
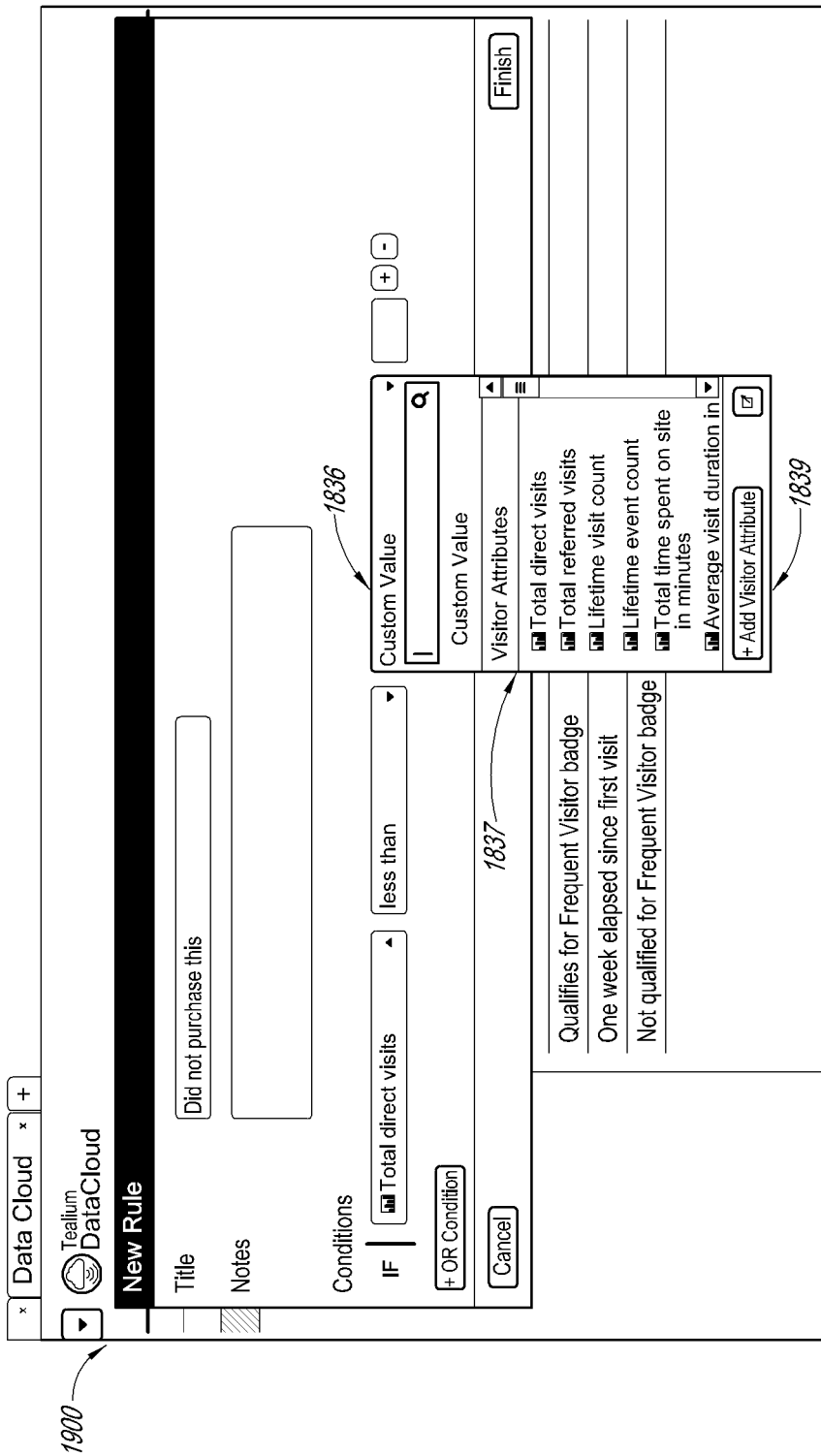

FIG. 19 shows an example user interface 1900 similar to that of FIG. 18B, depicting the custom value dropdown box 1836 selected to show various custom values 1837 that could be specified when creating a rule. In FIG. 20, an example user interface 2000 shows how attributes can be added from within the rule creation process with various attributes types 2010 being selectable. The user interface 2000 may be output for presentation to a user upon selection of an add visitor attribute button 1839 in FIG. 19 and may have similar functionality to the attribution creation user interfaces described above.

d. Example Report Generation Features

Turning to FIG. 21, an example reporting user interface is shown. In the example reporting user interface 2100, options are shown for filtering the various attributes that have been defined for visitors to produce a set of results 2140 that illustrate aggregations or segments of visitor profile data. The filters include metrics filters 2112 that enable a marketing user to select different metrics associated with visitors as well as flag filters 2114 and badge filters 2116. Other filters may also be included in other embodiments.

A user may select one or more of the metrics filters 2112 to adjust metrics associated with different users to be output in the reporting section 2140. In the depicted embodiment, these metrics include products purchased, orders placed, total visits, language, total purchase count, total purchase amount, and time of sale. These metrics may have been defined using the interfaces described above. Different slider selection tools 2111, 2113, and 2115 allow users to adjust the values of metrics data to be displayed. For instance, the slider 2111 depicts values for a total purchase count that may be selected. In this depicted embodiment, the user selected a total purchase count between 10 and 30 to thereby view a segment of visitors that purchased between 10 and 30 items. Likewise, the slider 2113 has been used to select a total purchase amount between values of 30,000 and 60,000. The slider 2115 shows the metric "time of sale" being selected between 10:00 a.m. and 5:00 p.m.

Within the flag filters 2114, various flags are shown such as "has made purchase," "emailed link," "retweeted link," and "returning visitor," as well as a number of times that those flags have occurred indicated by amount 2119. Check boxes 2117 next to the flags are provided for selectively selecting the flags to filter the output of the reporting area 2140. Similarly, check boxes 2117 are next to different badges in the badge filters 2116. Different badges are shown such as "VIP," "window shopper," "fan boy," and the like, next to amounts 2119 of visitors that have earned these badges or been assigned these badges. Any combination of the badges may be selected with the check boxes 2117 to filter the output of the reporting display 2140.

The output of the reporting display 2140 can also be adjusted by selecting the different perspective to show the reporting data from using a drop down box 2120 that shows (in this embodiment) that the perspective is from the point of view of flags. Thus, different bars 2141 in the reporting display 2140 reflect value amounts 2119 that different flags represent, such as "has made purchase," "emailed link," etc. A query is shown at the top represented by controls 2136 that represents the selections of the filters 2110 to filter the different flags. Each of the subaspects of the query can be deselected by clicking on X buttons 2137. In addition, selection of a particular bar of the bar graph 2142 can show snapshots 2150 of the metrics. The example reporting interface 2100 is illustrative only and may be varied considerably in other embodiments.

e. Example API Data Integration Features

Turning to FIG. 22, an example user interface 2200 is shown for integrating raw data output by the visitor processing system with third party vendor data or systems. The integration user interface 2200 can provide functionality for building a sample query using controls 2210 to query their live feed or other date ranges for data. Additional API access can be provided for developers of third party vendors to access the raw visitor data collected by the visitor processing system and processed using the transformations and rules described above.

The raw data may be used for more than just reporting, either by the visitor processing system itself or these third party vendors. For instance, the data output by the visitor processing system can be used for generating ads or ad campaigns, email campaigns, personalization including ads or recommendations or the like. For instance, in one embodiment the visitor processing system outputs a periodic feed (for example daily, monthly, weekly, hourly) of data from the visitor processing system to external vendors so that the vendors can use this data to update information about visitors. The data in the feed can be used to perform business intelligence, aggregate the data for long-term trends and trend analysis, and the like.

In yet another embodiment, the raw data or processed data output by the visitor processing system can be used to update the content site itself by personalizing the content of the content site based on the visitors and their attributes. For instance, a marketing user may create a "chatter" badge that is assigned to visitors who are influenced by chat because they tend to purchase items when they are using a chat function on the content site. If such a visitor comes to the content site, the content site can programmatically personalize itself to show a chat window more prominently for that particular visitor. As another example, if a visitor is assigned a VIP badge, the content site may not show ads to the user. If the user is a regular buyer, the content site may give a 10% discount offer to that user. As yet another example, if a badge "early adopter" is assigned to a visitor, the content site may show the latest electronic gadgets to the user or prioritize those gadgets in a display to a user over other gadgets or products.

f. Example Data Source Specification and Mapping Features

Referring to FIG. 23, an example data source user interface 2300 is shown. As described above, data sources may be accessed when creating attributes and/or rules to access data that is part of the content page or that is associated with the browser or end user system itself. These data sources may be specified by a marketing user associated with the content site so that the visitor processing system can be aware of these data sources and know to collect their data. For instance, if the content site is an electronic shopping site and has a shopping cart, and if one of its content pages has a "cart value" data source, the marketing user can use this user interface 2300 to specify that the cart value data source is available and should be obtained for analysis in the visitor data.

A button 2302 is provided for adding a data source. Upon selection of this button, a row can be added to the user interface 2300. Data inserted in the new row can be saved in computer storage, such as in a database. The row can include a text box 2310 for specifying the name of the data source, select boxes 2320 for specifying the type of the data source, and a description box 2334 providing a written description of the data source. The name 2310 in the text box 2310 can be the name of the data source used by the content site. Specifying this name can enable the visitor processing system to be aware of which variable or data source to look for when obtaining data using the tag container 114 and/or tag 118 (see FIG. 1).

The type of the data source identified in the dropdown box 2310 can be a data object that is associated with the page itself, it may be a Javascript page variable or other script value associated with the page, a meta tag associated with the page, a query string parameter associated with an HTTP PUT or GET statement, or a cookie value that is associated with the end user system or browser. Other options are also possible. Thus, if the data sources are specified in the user interface 2300, the visitor processing system can obtain data from the specified data sources using an appropriate tag 118.

As shown in FIG. 24, a user interface 2400 for mapping the data sources can be used for some tags. The user interface 2400 shows example tags added to the tag server(s) 120 from third party vendors. In the depicted embodiment, these tags include a live person tag and a Google™ Analytics tag. Configuration details 2702 for the Google™ Analytics tag are provided and mapped data sources 2710 are also shown. The mapped data source functionality can be provided to enable a user to map the data sources defined in the user interface 2300 to a data source in the tag vendor's tag. However, in certain embodiments, such mapping is not performed by the visitor processing system for the visitor attributes and rules described above. Rather, the mapping may not be needed because the visitor processing system can collect all the data sources specified by the marketing user and can make these available in the attributes and rules configuration displays without further mapping required. Mapping may instead be used with such visitor rules and attributes in other embodiments.

g. Detailed Example Computing Environments

Figure 25:
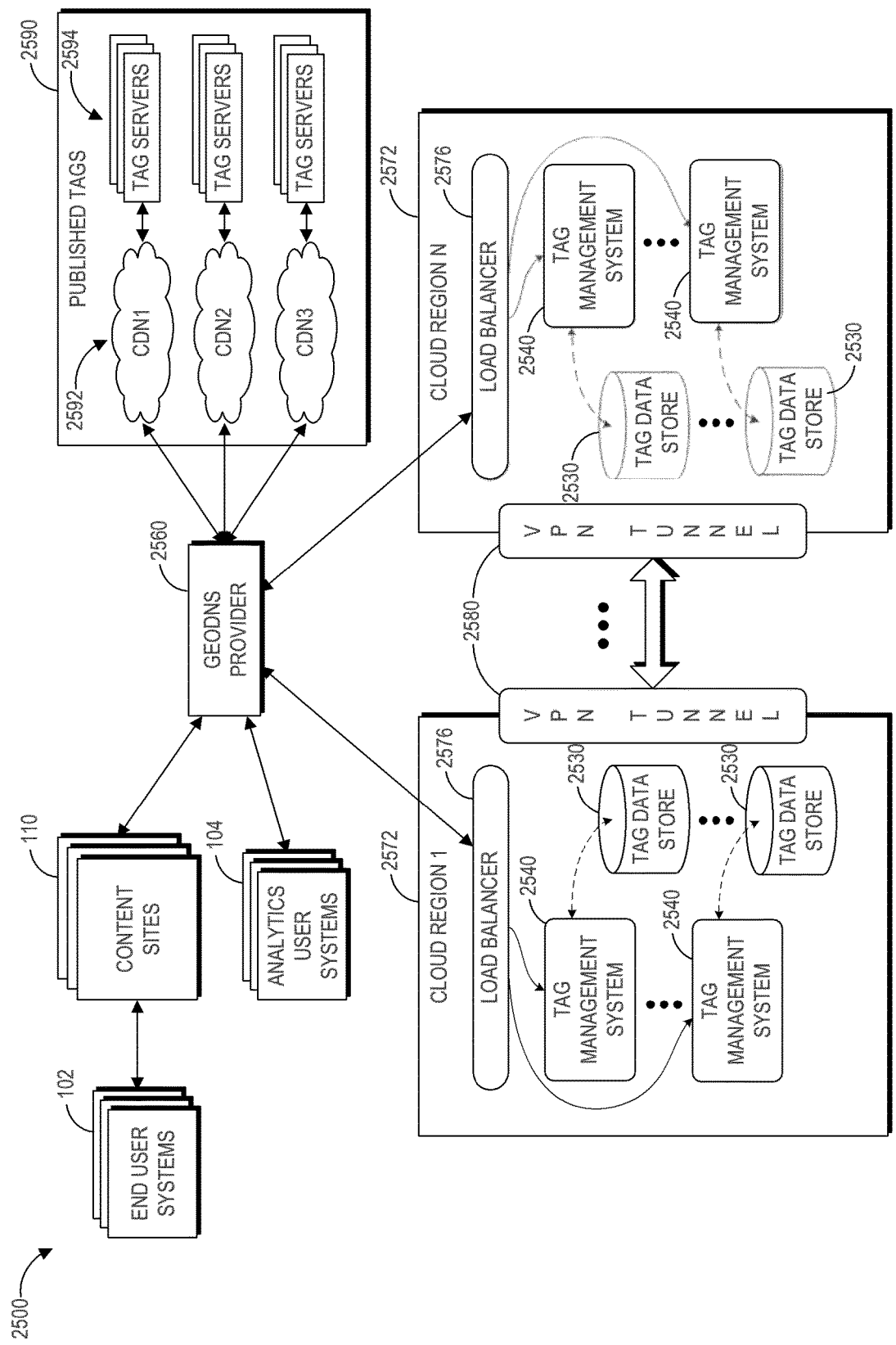
FIG. 25 depicts another embodiment of a computing environment, which provides distributed cloud-based access to a visitor processing system.

Turning to FIG. 25, a more detailed example embodiment of a computing environment 2500 is shown that can perform any of the tag management features described herein. The computing environment 2500 is a more detailed example of implementation of the computing environment 100 of FIG. 1. As in FIG. 1, end user systems 102 are shown in communication with content sites 110 which may communicate over a network (not shown). In addition, marketing user systems 104 are also shown. The computing environment 2500 facilitates implementation of a tag management system 2540, which may include the functionality of the visitor processing systems described above. Alternatively, the functionality of the visitor processing systems may be implemented in place of the tag management system 2540 in FIG. 25, without using some or all of the features of the tag management systems described herein.

In the depicted embodiment, the tag management system 2540 is shown distributed in a cloud platform that provides redundant and geographically dispersed access to the tag management system 2540. In particular, the tag management system 2540 is implemented in various cloud regions 2572. These cloud regions may be implemented in any type of cloud platform, which may simply be a data center operated by a vendor of the tag management system or by a third party vendor such as Amazon Web Services™, Microsoft Azure™, Rackspace™ Linode™, combinations of the same, or the like. Each cloud region 2572 includes a load balancer 2576 that can balance requests to tag management system instances 2540.

The tag management system instances 2540 can be implemented as virtual machines and/or physical machines. In the Amazon Web Services embodiment, the instances 2540 can be elastic compute cloud (EC2) instances that are distributed geographically for faster and redundant access to geographically dispersed analysis user systems 104. In addition, visitor profile data storage devices 2530 are shown in the different cloud regions 2572 and can store tag and visitor data in the cloud. Virtual private network (VPN) tunnels 2580 facilitate secure communication in a virtual private network among the different cloud regions 2572 and enable administrator users (not shown) of the tag management system to access tag management system instances 2540.

In an embodiment, the virtual private network is facilitated or provided by a private cloud service, such as the Virtual Private Cloud (VPC) service provided by Amazon Web Services™. The private cloud service can provide security to the tag management system instances 2540 by virtue of obscuring IP addresses of the tag management instances 2540. The tag management system instances 2540 may have nonpublic IP addresses so that each tag management system instance 2540 does not need to have security software that is responsible for securing the tag management system 2540 itself.

A geodns provider 2560 is provided for interfacing between content sites 110, analysis user systems 104, and the various tag management system instances 2540. The geodns provider 2560 also provides access to published tags 2590 which are stored in tag servers 2594 accessible through one or more or content delivery networks (CDNs) 2592. The function of the geodns provider 2560 in one embodiment is to periodically determine which CDN hosting the tags has the lowest latency, thereby selecting which CDN to point the content site 110 to when accessing tags on the tag servers 2594. The geodns provider 2560 may implement the DYN DNS system in one embodiment.

Advantageously, in certain embodiments, by storing tags in CDNs, tag access can be much faster than if tags were stored in locally hosted tag servers. Further, by using a geodns provider 2560, access to tags can be even more rapidly achieved by cycling through the fastest available CDNs 2592.

Figure 26:
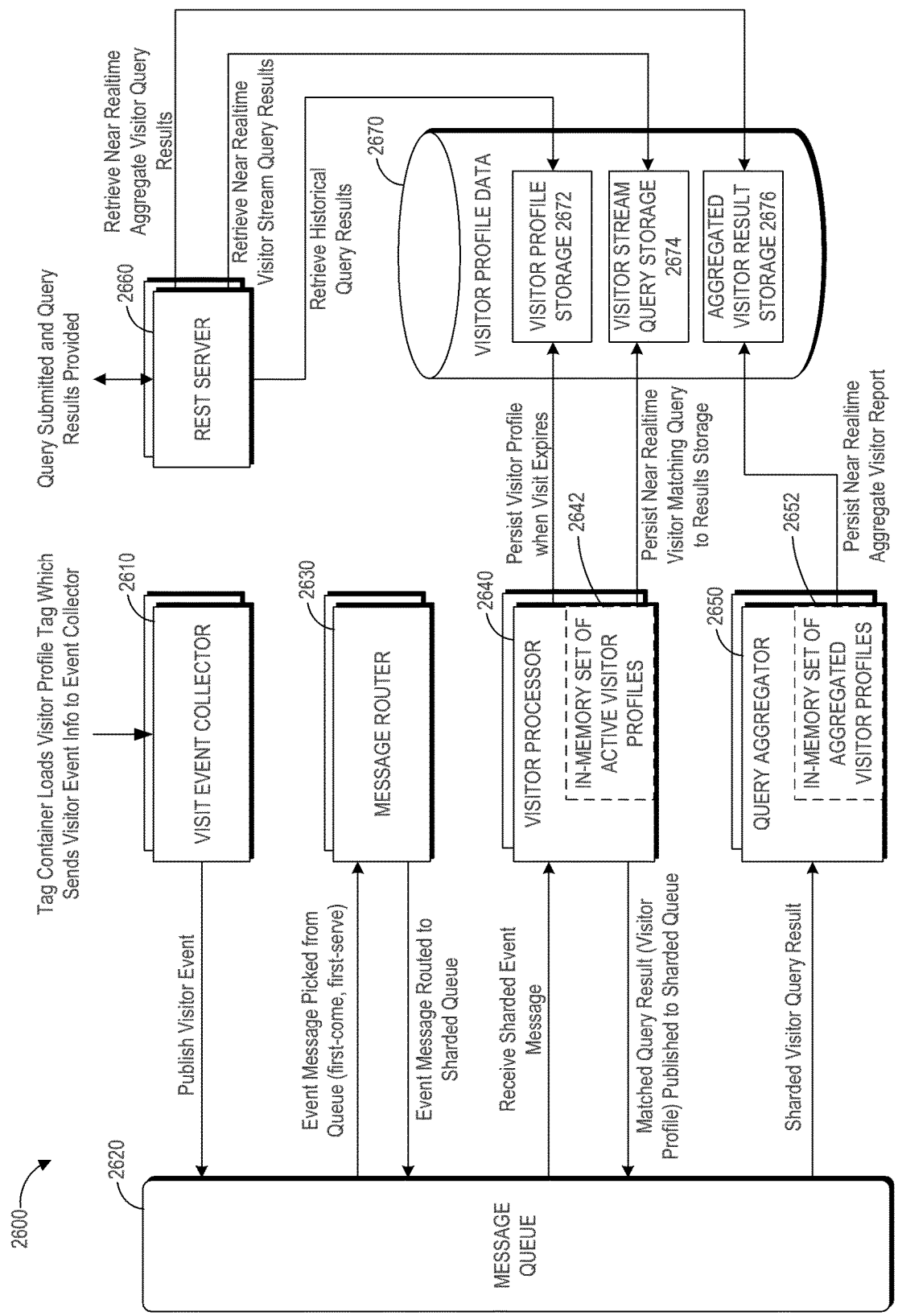
FIG. 26 depicts another embodiment of a visitor processing system.

Turning to FIG. 26, another embodiment of a visitor processing system 2600 is shown. The visitor processing system 2600 can include any of the features of the visitor processing systems 140, 240 described above. For instance, the visitor processing system 2600 can generate any of the user interfaces described above. Likewise, any of these visitor processing systems 140, 240 can implement any of the features of the visitor processing system 2600. The visitor processing system 2600 represents an example detailed implementation of tag management for visitor profile creation.

In the depicted embodiment, the visitor processing system 2600 includes a visit event collector 2610, a message queue 2620, a message router 2630, a visitor processor 2640, and a query aggregator 2650. In addition, the visitor processing system 2600 includes a visitor profile data repository 2670 and a REST server 2660. The visit event collector 2610 can include any of the features of the visitor data collector 244 of FIG. 3 or a portion thereof. Likewise, the visitor processor 2640 and query aggregator 2650 can implement the functionality of the visitor data aggregator 246 of FIG. 3 or a portion thereof. Further, the REST server 2660 can implement the functionality of the reporting module 248 of FIG. 3 or a portion thereof. Moreover, the visitor profile data store 2670 can store any of the data stored by the data store 270 of FIG. 3. In addition, the components shown in FIG. 26 can include additional functionality.

Each of the components shown can be implemented in computer hardware and/or software. In one embodiment, the components shown are implemented as software instances running in hardware. Some or all of the components may be implemented with multiple instances, which may be geographically co-located or geographically dispersed. Arrows between the components shown in FIG. 26 represent example flow of data and/or messages between the components, for example, over a network or via interprocess communication on the same computing device (e.g., a server). Although some possible communication paths between the components are indicated by these arrows, other communication paths between the components are also possible.

In the depicted embodiment, the visit event collector 2610 receives visitor event information. This visitor event information may be obtained by a tag container invoking a visitor tag. The tag container can be embedded in a content page of a content site accessed by a visitor, and the tag container can load the visitor tag (e.g., from a separate tag server—see, e.g., FIG. 3). The visitor event information can include any of the visitor profile data or visitor data described above, including data about any end user interaction with the content page(s), data about the end user's system hardware and/or software (such as browser type), and so forth.

The visit event collector 2610 can publish a visitor event containing the visitor event information in response to receiving the visitor event information. The visit event collector 2610 provides this visitor event to a message queue 2620 in one embodiment. The message queue 2620 can implement message broker functionality that implements the Advanced Message Queuing Protocol (AMQP) standard. For example, the message queue 2620 can perform asynchronous routing of messages between the various components of the visitor processing system 2600. In one embodiment, the message queue 2620 implements some or all of the features of the RabbitMQ message broker system. However, the message queue 2620 can implement other message brokering systems in other embodiments.

The message queue 2620 provides an event message, picked from a queue, to a message router 2630 on a first come, first serve basis. The event message can include the visitor event data published by the visit event collector 2610 to the message queue 2620. In response to receiving the event message, the message router 2630 can route the event message to a sharded queue implemented by the message queue 2620. The sharded queue may be implemented over multiple servers to increase parallelism and processing efficiency.

The sharded queue provides sharded event messages (e.g., portions of the event message) to a visitor processor 2640. The visitor processor 2640 can aggregate data from the sharded event messages based on attributes of the data and/or user. For instance, the visitor processor 2640 can perform any of the aggregation functionality of the visitor data aggregator 246 to produce visitor profile data based on attributes and rules, as described above. The visitor processor 2640 can persist visitor profile data in visitor profile storage 2672 of the visitor profile data store 2670, for example, in response to the end user's visit to the content site expiring or ending. The visitor processor 2640 can also include an in-memory set of active visitor profiles 2642 associated with current visitors to the content site (or sites). The visitor processor 2640 can persist the in-memory set of active visitor profiles 2642 to visitor stream query storage 2674 in the visitor data store 2670.

In addition, a query aggregator 2650 obtains sharded visitor query results from the message queue 2620 (e.g., in response to a query from a marketing user) and maintains an in-memory set of aggregated visitor profiles 2652. The query aggregator 2650 also persists a near realtime aggregate visitor report in aggregated visitor result storage 2676, which can be accessed as part of a user query.

The REST server 2660 can received submitted queries and return query results in response, using HTTP, SOAP, or other representational state transfer (REST) protocols (or another protocol). Upon receiving a query for visitor profile data (see FIG. 21 for a query example), the REST server 2660 can obtain the requested data from the visitor profile data store 2670. In particular, the REST server 2660 can retrieve historical query results from the visitor profile storage 2672, near realtime visitor stream query results from the visitor stream query storage 2674, and near realtime aggregate visitor query results from the aggregated visitor result storage 2676.

In an embodiment, the query can be streamed or reported. Streamed queries can include queries for the raw visitor profiles themselves, so that further processing can be done (for example) by a marketing user system. Reported queries can request reports based on visitor profiles, such as the example report shown in FIG. 21. Historical queries are also possible, showing reports for a set of visitors at a previous point in time (such as a day ago, or a week, month, or year ago) as opposed to live, real time or near-real time (which can be the default query option). A marketing user may wish to compare historical results from a year ago with current results (or with other historical results).

IV. Visitor Stitching Embodiments

A content site 110 can integrate the services of a traditional web analytics system for the purpose of tracking its visitors for behavioral analysis. Tracking these visitors can be done so that when visitors render content within the property or application, the tracking code is triggered. This tracking code can then invoke an event call (e.g., via HTTP(S)) back to the web analytics system for collection. Examples of such tracking code are described above, including the tag container 114 and tags 116, 118 (see, e.g., FIG. 1).

The collection of events from a single user-agent (e.g., the client software, such as the browser 103 of FIG. 1) may be associated as a chronological sequence of events known as a visit (sometimes referred to also as a session). More specifically, the visit can be comprised of some or all the sequenced set of events from the beginning of a visit until a pre-determined period of inactivity has occurred. For example, a user may open a fresh web browser, navigate to a content site such as www.acme.com, followed by some number of page views. Each page view can be considered an event. Further, data entered by the user into a form can also be considered an event. Other events can correspond to any of the attributes described above (such as events related to badges, funnels, sequences, etc.). Each event can be associated with a single visit of a user. In an embodiment, once thirty minutes (or some other predefined time value) pass without another page view, the web analytics system can consider that visit concluded. Another following page view (whether the browser was closed or not) may be considered the first event of a new visit.

A visitor can be associated with a visitor profile having a collection of visits associated with a single user-agent. A user-agent can include a single web browser or application on a single device or end user system 102. Such visitors may be provided a tracking identifier provided by the web analytics system (see FIG. 27, described below). These identifiers may be random in nature, in order to ensure that no duplicates occur. These identifiers may be provided back by the user-agent in order for the web analytics system to identify the historical data to associate freshly received (incoming) events.

A challenge of this tracking results from many people interacting with a web property or application from multiple user-agents or devices. The same challenge can be expressed in a much older scenario regarding the deletion of cookies. Any standards-based web browser provides a feature allowing the user to delete any or all cookies. Because cookies may be utilized by web analytic services (including any of the systems described herein) to store the visitor identifier, the ability to delete cookies may cause the web analytic vendors to interpret the visitor as new upon the next visit, resulting in the assignment of a new identifier. Because this new identifier can be different from the previous identifier, the visitor may now be severed from any historical behavior.

In both of these cases, it can be highly desirable to capture the complete picture of a user's behavior as it can be expressed across devices and web browser cookie cleanses. Desirably, a single user should be identifiable as one visitor as the user navigates a web property or application across browsers or devices.

Embodiments of the systems described herein can advantageously implement one or more visitor stitching processes to address some or all of the drawbacks identified above. Visitor stitching can include, among other things, one or more processes by which multiple visitors that may appear distinctly independent may be merged into a single united visitor profile (often referred to herein simply as a "visitor") due to the leveraging of one or more persistent identifiers. Like the identifier issued by the web analytics service, a persistent identifier can be unique to the visitor. However, its uniqueness may go beyond that of the uniqueness of the web analytics service. Due to the nature of a persistent identifier, a persistent identifier may not change based on which device is used or which browser is used. A persistent identifier can also be less sensitive to "cookie cleansing."

Some examples of persistent identifiers include email addresses, social networking identifiers (such as Facebook™ or Twitter™ identifiers), login credentials such as web property or application login usernames, phone numbers, mailing addresses, and the like. These identifiers can have the unique characteristic of being the user's credentials for one or more websites or applications. More generally, any identifier associated with a user that can represent a user from a different perspective or channel from an identifier provided by the visitor processing system can be used as a persistent identifier. These identifiers might be first-party identifiers or third-party identifiers intended to provide direct or cross-site authentication (such as social networking identifiers such as Facebook Connect identifiers). Persistent identifiers can provide a much more consistent representation of a user than the content-page specific visitor identifiers provided by the visitor processing system.

Visitor stitching can be performed by any of the systems described herein. For example, the visitor processing system 140 or 240, tag management system 2540, or visitor processor 2640 can implement the visitor stitching processes described herein. For convenience, the remainder of this disclosure will refer to the visitor stitching and related processes as being implemented by a visitor processing system or visitor processor, although it should be understood that these shorthand references can refer to any of the systems or subsystems described herein.

As described more fully above, the visitor processing system can provide a new level of marketing agility by providing a solution that, in certain embodiments, allows for a fully-configurable visitor model, while seeing the results of this model in real time or pseudo-real time. This level of configurability can be beneficial when the goal can be to reduce a visitor set to a highly targeted visitor segment. As described above with respect to FIGS. 1-26, this rich configurability can include the ability to set and manipulate a number of attributes on a visitor. By allowing the user to configure attributes on their visitor definition, the user can subsequently view reports on these attributes. These reports can provide the capability to filter a live or historic stream of visitors on these specific attributes, resulting in a highly segmented and highly targeted segment of visitors.

A visitor stitching process can be a real-time or pseudo-real time process that can be initiated whenever a persistent identifier is received. The above description of the visitor processing system mentions a property as one of the available attributes or data points that can be associated with a visitor. A persistent identifier can be configured as a special type of property. A persistent identifier can be a property that triggers the visitor stitching process. This special property can be referred to within the visitor processing system and by the user interface as a multi-channel visitor ID in some implementations.

When an event containing one or more persistent identifiers is received by the visitor processing system, a visitor stitching process can be initiated, which can conclude by associating the event with the resultant merged visitor. This merged visitor can be the product of the visitor stitching process merging any and some or all seemingly independent visitors (e.g., visitor profiles). This resultant merged visitor or visitor profile may later be further stitched or merged into a more comprehensive stitched visitor as other persistent identifiers are discovered, as will be described in greater detail below.

a. Example Visitor Stitching Processes

Example visitor stitching processes will now be described with respect to FIGS. 27 through 30. Prior to describing example visitor stitching processes in FIGS. 29 and 30, an initial visitor profile creation process will be described with respect to FIG. 27, and a persistent visitor profile process will be described with respect to FIG. 28. Each of these processes may be implemented by any of the visitor processing systems or visitor processers described herein, or by any other computing device.

Figure 27:
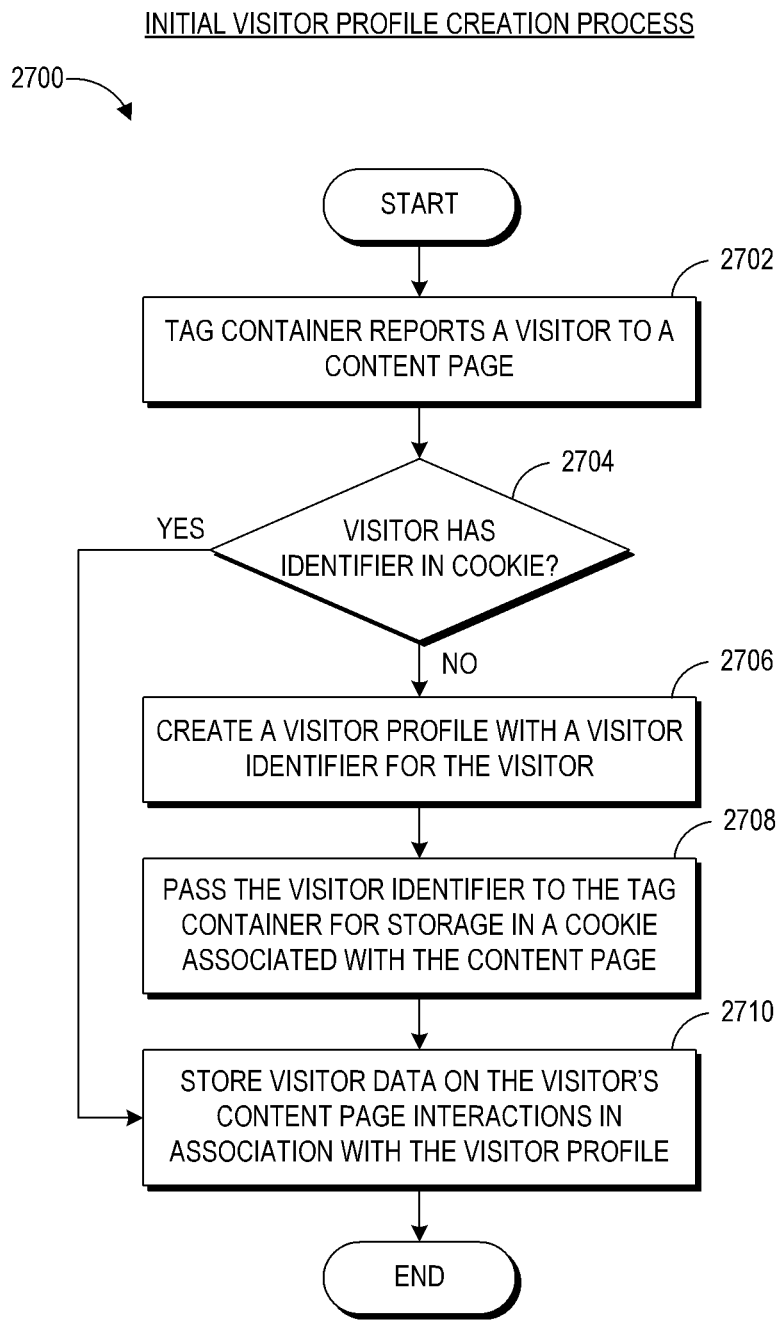
FIG. 27 depicts an embodiment of an initial visitor profile creation process.

Turning to FIG. 27, an initial visitor profile creation process 2700 is shown. At block 2702, the tag container 114 of FIG. 1 or another tag (e.g., 116 or 118) reports a visitor to a content page 112 to the visitor processing system. The information reported by the tag or tag container may include an identifier that the tag or tag container obtained from a cookie from the visitor's browser 103. Thus, at block 2704, it is determined whether the visitor has an identifier (previously set by the visitor processing system) in a cookie associated with the content page. If so, the process 2700 ends, as the purpose of this process 2700 is to assign a visitor identifier to visitors that do not already have one.

If the visitor does not have a visitor identifier, the process 2700 proceeds to block 2706, where a visitor profile with a visitor identifier is created for the visitor. The visitor identifier can be an alphanumeric (or just alpha or just numeric) identifier that is randomly selected or incremented to be unique from other visitor identifiers. The visitor processing system passes the visitor identifier to the tag container (or other tag) for storage in a cookie associated with the content page at block 2708. This way, when the visitor subsequently accesses the page, the tag container or tag can access the visitor identifier from the cookie so that visitor data from the subsequent visit can be combined with the prior visit's data. At block 2710, the visitor processing system stores visitor data regarding the visitor's interactions with the content page in association with the visitor profile.

The visitor processing system may access another identifier associated with a user, user agent (e.g., browser), or user device in place of cookies for tracking user identities. Other identifiers that may be used in place of cookies for tracking visitors include Internet Protocol (IP) addresses, Media Access Control (MAC) addresses (which may be obtained using a suitable protocol), device-specific identifiers (e.g., any static identifier associated with a device or software install on a device), device fingerprints (which may include a profile of two or more separate features of a device or user that individually may not be identifying, such as any combination of the user agent type (e.g., browser type) of a user device, the language supported by a user's browser, plugins installed in a user's browser, the user's IP address, operating system of the user device, etc.), mobile advertising identifiers, and the like. More generally, these identifiers and cookies are examples of user-device-specific, user-agent specific, or client-specific identifiers. Any reference to cookie-based identifiers herein may be interchangeable with any other user-device-specific, user-agent specific, or client-specific identifier.

Figure 28:
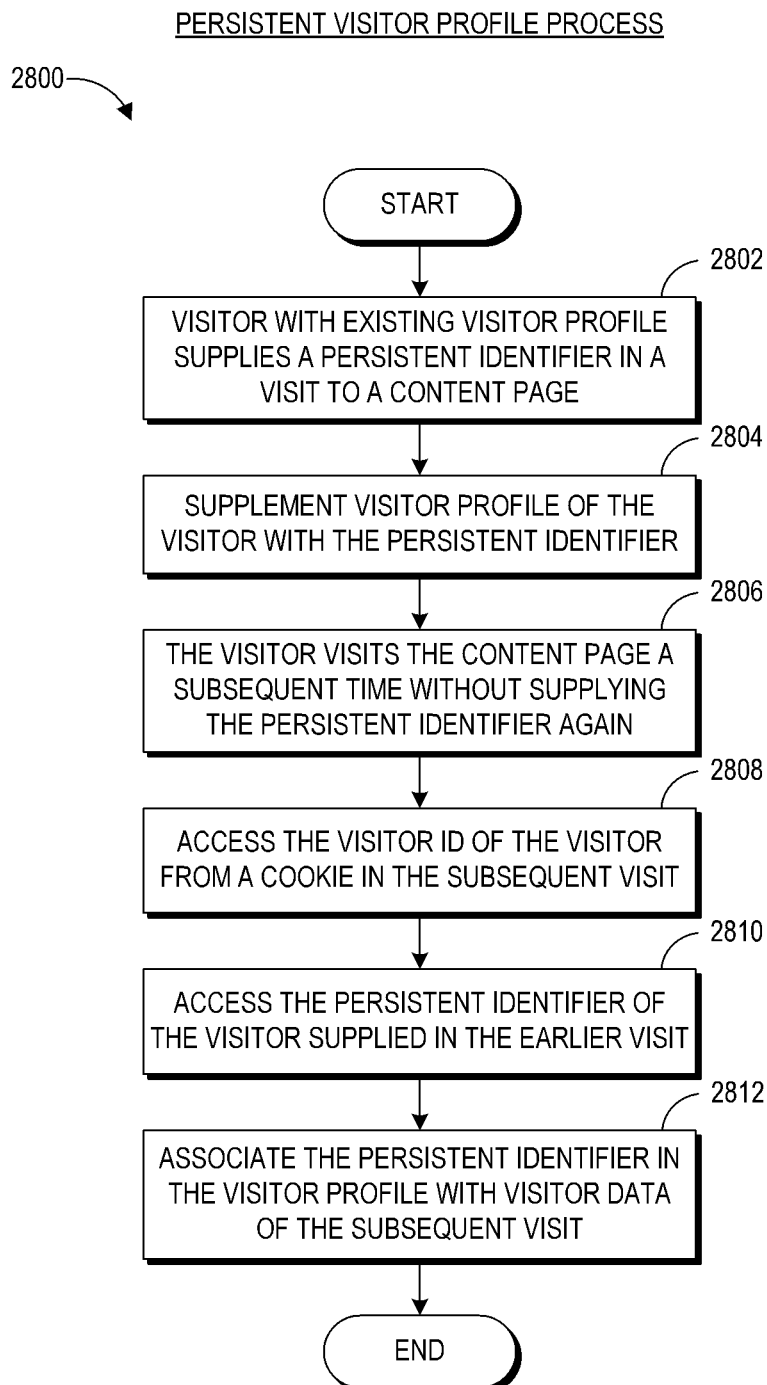
FIG. 28 depicts an embodiment of a persistent visitor profile process.

Turning to FIG. 28, an example persistent visitor profile process 2800 is shown. Like the process 2700, the persistent visitor profile process 2800 can be implemented by any of the systems described herein or by another computing device. The persistent visitor profile process 2800 illustrates an example technique for associating a visitor with a persistent identifier of the visitor. This association with a persistent identifier can enable visitor stitching to be performed.

At block 2802, a visitor with an existing visitor profile (see FIG. 27) supplies a persistent identifier in a visit to a content page. As described above, the persistent identifier can be an email address, social network identifier, login credential (e.g., username), or the like associated with a user or visitor. The visitor to a content page may supply this information as part of a login process to the content page, for example, by filling in a form, supplying social networking login information (using a service such as Facebook Connect™), or the like. Since the user is supplying the persistent identifier to the content page, the persistent identifier becomes part of the document object model (DOM) of the page and can be read by the tag container or another tag within the tag container. The tag or tag container can transmit the persistent identifier or a hash thereof to the visitor processing system. If the tag or tag container passes the persistent identifier without hashing (e.g., in the clear), the visitor processing system can hash the persistent identifier instead.

At block 2804, the visitor processing system supplements the visitor profile of the visitor with the persistent identifier. Thus, when the visitor visits the content page a subsequent time, the persistent identifier can be associated with the visitor's subsequent visit. For example, at block 2806, the visitor visits the content page a subsequent time without supplying the persistent identifier again. At block 2808, the tag container or tag can access the visitor identifier of the visitor from a cookie in the visitor's browser and supply this visitor ID to the visitor processing system. The visitor processing system can look up the persistent identifier of the visitor based on the visitor ID at block 2810. The visitor processing system can then associate the persistent identifier in the visitor profile with the visitor data of the subsequent visit to the content page at block 2812. Thus, once the visitor supplies a persistent identifier, the visitor need not supply it again for the visitor processing system to associate the persistent identifier with the visitor's profile on subsequent visits. Further, the visitor processing system can store the persistent identifier in a cookie in the user device.

The following example illustrates a before and after view of a visitor profile processed to include a persistent identifier based on the process 2800 of FIG. 28. In Table 1A below, assume the following are known (timestamp values shown may not be intended to reflect any particular unit of time, but rather can demonstrate relative time):

TABLE 1A

| Visitor ID: 1a | Visitor ID: 2b |
|---|---|
| Account: acme | Account: acme |
| Visit: first | Visit: first |
| Events: | Events: |
|   event - timestamp 1 |   event - timestamp 2 |
|   event - timestamp 5 |   event - timestamp 6 |
|   event - timestamp 10 |   event - timestamp 9 |
| Visitor: 1a | Visitor: 2b |
| Account: acme | Account: acme |
| Visit: second | Visit: second |
| Events: | Events: |
|   event - timestamp 100 |   event - timestamp 105 |
|   event - timestamp 110 |   event - timestamp 115 |
|   event - timestamp 120 |   event - timestamp 125 |

The visitor ID shown for each visitor in Table 1A is an example of the visitor identifier created with respect to the process 2700 of FIG. 27. For convenience, each visitor is also referred to by his or her visitor ID, such as "Visitor 1a" or "Visitor 2b." Each row in Table 1A and in subsequent tables represents a separate visit for each visitor, with two total visits being represented in Table 1A.

Assume Visitor 1a visits the content page a third time, this time supplying a persistent identifier as the following email address: user@acme.com. The visitor's profile may look as follows in Table 1B based on this third visit:

TABLE 1B

| |
|---|
| Visitor: 1a |
| Account: acme |
| Visit: third |
| Events: |
| event - timestamp 200 |
| event - timestamp 210 - supplies email=user@acme.com |
|   (visit not expired, that is, event has just been |
|   received) |

When this latest event is received, the visitor processing system can invoke a visitor stitching process (which may include one or more code modules executing as a local code base within the visitor processing system). This visitor stitching process can merge events of the Visitor 1a under the same persistent identifier. This process could result in a visitor profile such as the following shown in Table 2A:

TABLE 2A

| | |
|---|---|
| Visitor: _acme_email_user@acme.com_ | Visitor: 1a replaced_by: _acme_email_user@acme.com_ |
| Visit: first | |
| Events: | |
|    event - timestamp 1 | |
|    event - timestamp 5 | |
|    event - timestamp 10 | |
| Visitor: _acme_email_user@acme.com_ | |
| Visit: second | |
| Events: | |
|    event - timestamp 100 | |
|    event - timestamp 110 | |
|    event - timestamp 120 | |
| Visitor: _acme_email_user@acme.com_ | |
| Account: acme | |
| Visit: third | |
| Events: | |
|    event - timestamp 200 | |
|    event - timestamp 210 | |

Note the following points: Visitor 2b is unaffected in this example and therefore is not listed in Table 2A. In addition, Visitor 1a can be updated with a replaced_by field, set to the new persistent ID. Any future request or event directed to Visitor 1a can be directed to the replaced_by visitor instead of the initial visitor identifier assigned by the process of FIG. 27. However, this initial visitor identifier can be maintained in the visitor profile in some embodiments, and the persistent identifier can supplement the initial visitor identifier.

The visitor stitching process performs the following steps in an embodiment: The visitor stitching process can check to see if the visitor processing system has a live visitor in cache (e.g., currently interacting with a content page) with the same persistent identifier (e.g., visitor_acme_email_user@acme.com_). In this case, there is not. The visitor stitching process can check to see if there is a visitor_acme_email_user@acme.com_ in the database (e.g., visitor profile repository 160). In this case, there is not. The visitor stitching process then creates the _acme_email_user@acme.com_visitor. The visitor stitching process can merge Visitor 1a into Visitor_acme_email_user@acme.com_. In this simple case, this merge can include copying some or all of the history from Visitor 1a to this new visitor profile. The visitor stitching process can update the Visitor 1a with a 'replaced_by' field, set to _acme_email_user@acme.com_.

Next, assume another event is received from Visitor 1a, during the same (third) visit: event—timestamp 220. The Visitor Processing system can inspect the event to find that this can be associated with Visitor 1a. It can be useful to note that this event does not have to provide the persistent identifier. Instead, the visitor processing system can retrieve Visitor 1a for updating (as it may for any event), but may notice the existence of the replaced_by field. The value of this field can be retrieved, in this case, _acme_email_user@acme.com_. The visitor processing system can then retrieve this visitor instead, and can update the visitor profile with the newly received event, resulting in the following visitor profile update in Table 2B:

TABLE 2B

| |
|---|
| Visitor: _acme_email_user@acme.com_ |
| Account: acme |
| Visit: third |
| Events: |
|    event - timestamp 200 |
|    event - timestamp 210 |
|    event - timestamp 220 |

It should be clear that now each subsequent event (e.g., page load, form entry, etc.) of this visit can contribute to this visitor's (_acme_email_user@acme.com_) visit. Additionally, some or all events for future visits made by Visitor 1a can contribute to the_acme_email_user@acme.com_visitor profile instead of the initial Visitor 1a profile in the same manner. In certain embodiments, some or all events for future visits made by Visitor 1a can contribute to the_acme_email_user@acme.com_Visitor instead in the same manner without the need to continually supply the persistent identifier as described above.

Figure 29A:
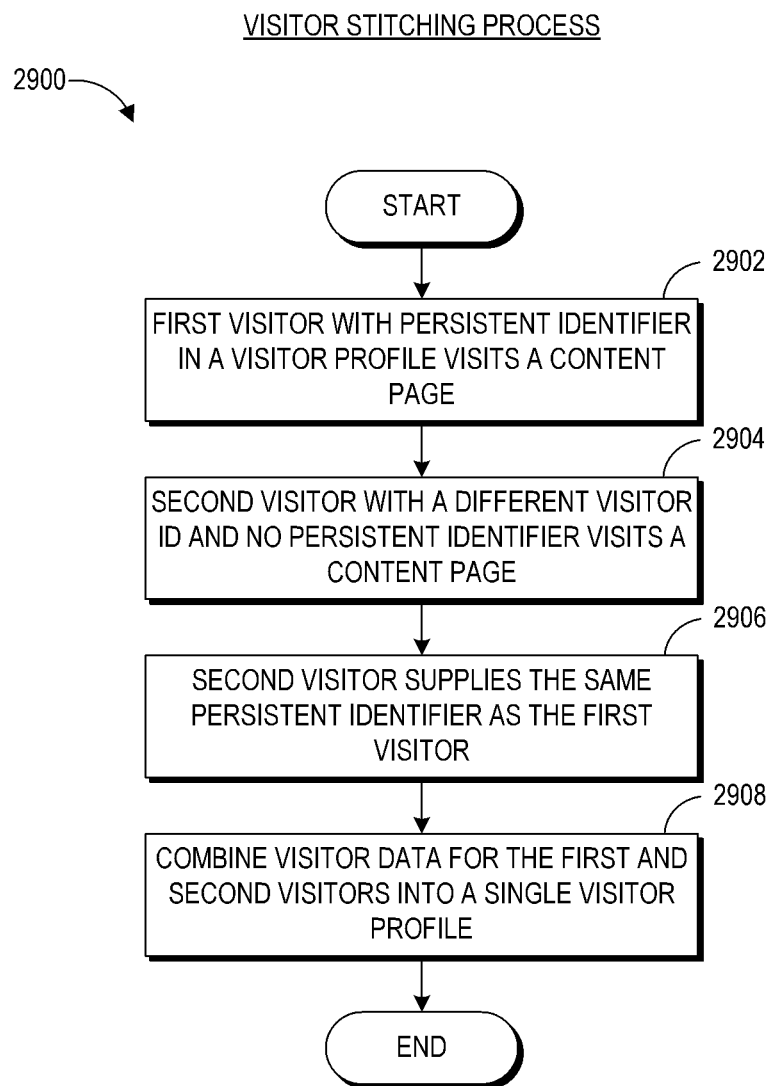
FIGS. 29A and 29B depict embodiments of visitor stitching processes.

Note that although the visitor stitching process has been invoked, the process may have additional features when another, seemingly distinct visitor provides the same persistent identifier, as illustrated with respect to FIG. 29A.

In FIG. 29A, an example visitor stitching process 2900 is shown, which may also be implemented by any system described herein or by another computing device. At block 2902 of the process 2900, a first visitor already having a persistent identifier in a visitor profile visits a content page. This persistent identifier may have been associated with the visitor profile using the process 2800 of FIG. 28. At block 2904, a second visitor with a different visitor identifier (assigned, e.g., using the process 2700 of FIG. 27) and no persistent identifier (or a different persistent identifier from the first visitor's) visits a content page. The content page may be the same or a different page visited by the first visitor.

At block 2906, the second visitor supplies the same persistent identifier as the first visitor. This persistent identifier may be detected using, for example, the features described above with respect to FIG. 28. In response to receiving this persistent identifier, the visitor processing system combines the visitor data for the first and second visitors into a single visitor profile at block 2908.

The following features illustrated with respect to Tables 3A through 5 illustrate one example implementation of the process 2900 of FIG. 29A.

Continuing from the previous examples above, assume that sometime later Visitor 2b returns for a third visit. This could result in the following (historical visits and current third visit) for visitor 2b, in Table 3A:

TABLE 3A

| |
|---|
| Visitor: 2b |
| Account: acme |
| Visit: first |
| Events: |
|    event - timestamp 2 |
|    event - timestamp 6 |
|    event - timestamp 9 |
| Visitor: 2b |
| Account: acme |
| Visit: second |
| Events: |
|    event - timestamp 105 |
|    event - timestamp 115 |
|    event - timestamp 125 |
| Visitor: 2b |
| Account: acme |
| Visit: third (the current active visit) |
| Events: |
|    event - timestamp 400 |

To this point, no visitor stitching has been used. Consider when another event within the visit contains the same persistent identifier as Visitor 1a (the first visitor in this example), email=user@acme.com:

TABLE 3B

Visitor: 2b
Account: acme
Visit: third
Events:
　event - timestamp 400
　event - timestamp 410 - supplies email=user@acme.com
　(visit not expired, that is, this event has just been received)

When this latest event is received, the visitor processing system can invoke the visitor stitching process code module, which can merge the two visitor profiles (1a and 2b) as shown in Table 4:

TABLE 4

| Visitor: _acme_email_user@acme.com_ | Visitor: 1a replaced_by: _acme_email_user @acme.com_ | Visitor: 2b replaced_by: _acme_email_user@ acme.com_ |
|---|---|---|

Visit: first
Events:
　event - timestamp 1
　event - timestamp 2
　event - timestamp 5
　event - timestamp 6
　event - timestamp 9
　event - timestamp 10
Visitor: _acme_email_user@acme.com_
Visit: second
Events:
　event - timestamp 100
　event - timestamp 105
　event - timestamp 110
　event - timestamp 115
　event - timestamp 120
　event - timestamp 125
Visitor: _acme_email_user@acme.com_
Account: acme
Visit: third
Events:
　event - timestamp 200
　event - timestamp 210
Visitor: _acme_email_user@acme.com_
Account: acme
Visit: fourth (the current active visit)
Events:
　event - timestamp 400
　event - timestamp 410

For example, the visitor stitching process can perform the following steps: The visitor stitching process checks to see if the visitor processing system has a 'live' visitor in cache with the same persistent identifier (e.g., Visitor_acme_email_user@acme.com_). In this case, there is not. The visitor stitching process can check to see if there can be a visitor_acme_email_user@acme.com_ in the database (e.g., visitor profile repository 160). In this case, there is. This visitor can be retrieved. The visitor stitching process then proceeds to merge Visitor 2b into Visitor_acme_email_user@acme.com_. The visitor stitching process updates the Visitor 2b with a "replaced_by" field, set to _acme_email_user@acme.com_. The visitor identifier "2b" may be preserved in the database as well.

This merge process can reconstruct the visit history and reprocess each event of each visit as though it was received for the first time, in the way that any event can be processed by the visitor processing system. This can ensure or attempt to ensure that visitor attributes reflect the entirety of the history of events. Reconstructing visits can be done by combining some or all overlapping visits into a single visit and by sorting the events in chronological order. From the above first visits of each Visitor 1a and 2b, one can see in Table 5 that these visits have overlapping event timestamps:

TABLE 5

| Visitor: 1a | Visitor: 2b |
|---|---|
| Account: acme | Account: acme |
| Visit: first | Visit: first |
| Events: | Events: |
| 　event - timestamp 1 | 　event - timestamp 2 |
| 　event - timestamp 5 | 　event - timestamp 6 |
| 　event - timestamp 10 | 　event - timestamp 9 |

The overlapping events may have resulted from the visitor using two devices (or two different browsers on one device) to access the same content page. Because these visits have overlapping event timestamps, a single visit can be created, where the first event of the visit can be the event with the oldest timestamp (smallest), the last event can be the event with the newest timestamp (largest), and some or all other events may be in chronological order. This can result in the single "first" visit for visitor_acme_email_user@acme.com_ comprising of, in this case, the above six events.

Visits with no overlapping events may be simply copied to the newly stitched visitor profile, as can be the case with the original visit "third" from Visitor 1a and the latest visit from Visitor 2b.

It should be clear that now each subsequent event of this visit can contribute to this visitor's (_acme_email_user@acme.com_) visitor profile. Additionally, some or all events for future visits made by Visitor 1a or 2b can contribute to the_acme_email_user@acme.com_Visitor profile instead in the same manner. In certain embodiments: some or all events for future visits made by Visitor 1a or 2b can contribute to the_acme_email_user@acme.com_Visitor instead in the same manner without the need to continually supply the persistent identifier from either visitor.

Further, due to the nature of the persistent identifier, Visitor 1a and Visitor 2b may be considered to be the same individual or user. This fact can facilitate performing cross-platform (device or web browser) tracking, where the tracking may not only be performed in real time or near real time, but the individual's history can be considered to be a singular visitor's history. Visitor stitching can therefore allow the visitor processing system to provide analysis of the individual's history in the singular.

Figure 29B:
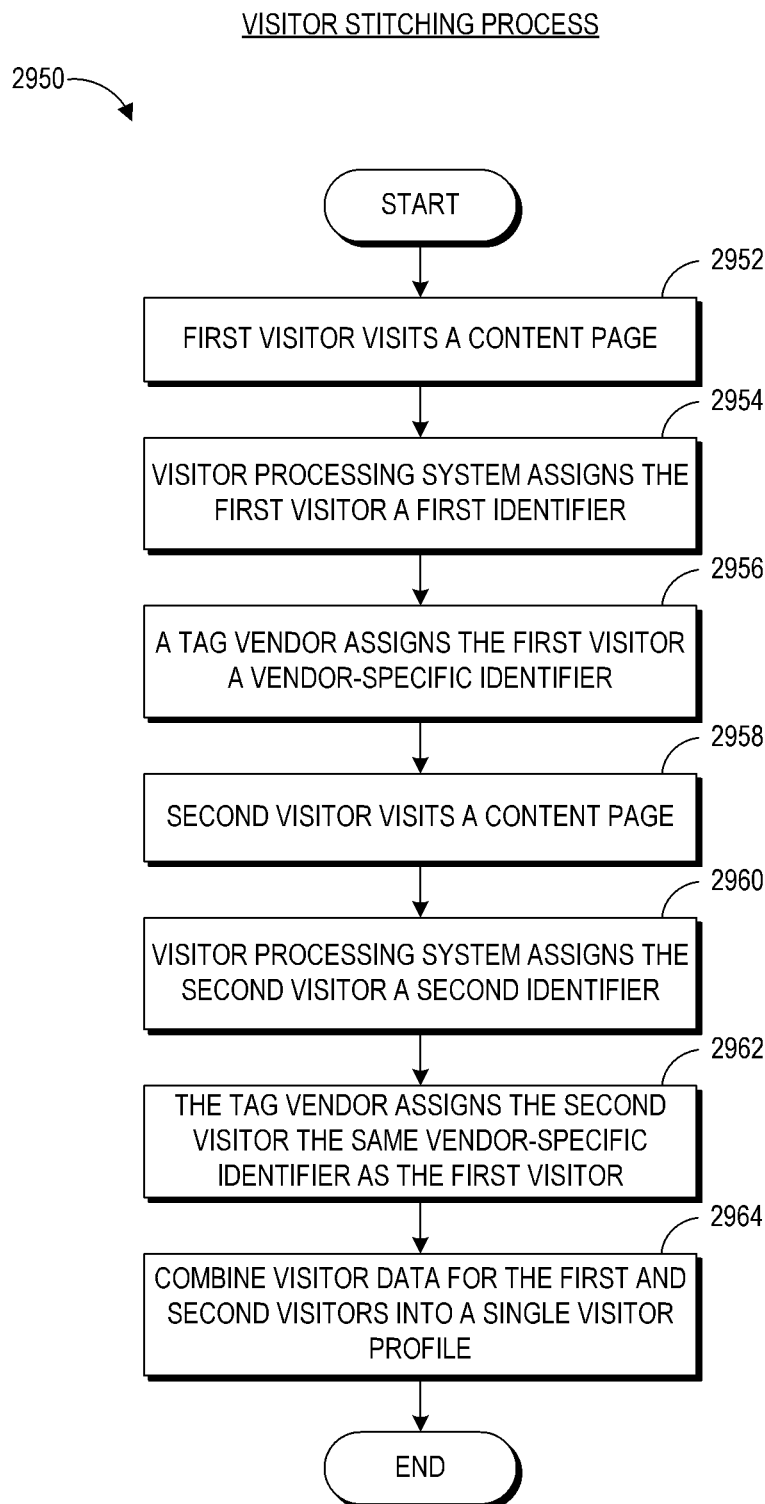

Turning to FIG. 29B, another example visitor stitching process 2950 is shown. This process 2950 may also be performed by any of the systems described herein or by another computing device. The process 2950 illustrates a situation where the persistent identifier is supplied by a different entity than the visitor or user. Rather, in this process 2950, the visitor identifier is an identifier provided by a third-party tag vendor.

As described above in more detail with respect to FIG. 1 et seq., the tag container 114 can reference multiple tags 116 from third party tag vendors/operators of the tag vendor systems 170. Individual tag vendors may each maintain their own visitor identifier for a visitor that is separate from the visitor identifier maintained by the visitor processing system 140. When a persistent identifier supplied by a visitor is not available, the visitor processing system 140 can use an identifier provided by another tag vendor to stitch two related visitor profiles together. While this third-party identifier may be less persistent than a user email address or social network identifier, the third party identifier is still referred to herein as a persistent identifier. More generally, the third party identifier as well as the other persistent identifiers described herein (including email-based, social-based, or login-based) can also be referred to as external identifiers (since they may be created external to the visitor processing system 140) or alternative identifiers (as alternative sources of identification to the visitor processing system-generated identifier).

With continued reference to FIG. 29B, at block 2952, a first visitor visits a content page. The visitor processing system assigns the first visitor a first identifier at block 2954, similar to as described above with respect to FIG. 27. A tag vendor assigns the first visitor a vendor-specific identifier at block 2956, also using (for example) similar techniques as described above with respect to FIG. 27.

At block 2958, a second visitor visits a content page (which may or may not be the same content page that the first visitor visited). The second visitor is assigned a second identifier by the visitor processing system 2960. This identifier would differ in some embodiments from the identifier assigned to the first visitor. At block 2962, the tag vendor assigns the second visitor the same vendor-specific identifier as the first visitor. The visitor processing system can recognize that this vendor-specific identifier is the same for both visitors and combine the visitor data for both visitors into a single visitor profile at block 2964.

b. Example Distributed Visitor Stitching Process

The above sequences demonstration example logic of the visitor stitching process. However, embodiments described herein go further to function within a distributed environment including multiple computing devices, such as multiple physical and/or virtual servers, which may be geographically dispersed or co-located (e.g., in one or more data centers). A distributed environment can add additional complexity that can be accounted for as shown in an example distributed visitor stitching process 3000 of FIG. 30. With respect to the process 3000, visitor profiles can be assigned to partitions in the distributed system. Each partition can represent a logical grouping of physical and/or virtual servers (referred to as visitor processors for the remainder of this specification). Each visitor processor can implement the features of any of the systems described herein. The partitions can be numbered, for example, from 0 to N (where N is an integer). As new visitor processors are brought online, they can be assigned to one of the partitions or a range of partitions. Visitor identifiers, whether persistent or assigned by a visitor processor, can be hashed into a numerical value that corresponds to a partition. Thus, visitor profiles can be assigned to a single partition in one embodiment so that each time a visitor event occurs, the same partition handles that visitor's profile. In this manner, visitor profiles can be kept consistent across a distributed computing environment.

An example of partitioning will now be described in more detail. In a local or non-distributed (non-clustered) environment, the check for a live visitor can involve a query into the local cache of active visitors. However, in a distributed (e.g., clustered) environment, there can exist any number of visitor processor instances, each with a portion of the live visitors (e.g., who are currently visiting content pages). The portion of the live visitors each visitor processor manages can be deterministic, based on a partitioning algorithm for consistent hashing. A partition, in this case, can be a slot that represents an equal subportion of the total range of capacity. The partitioning algorithm assumes N number of available partitions. Each visitor processor can be assigned a range of partitions, based on the total number of visitor processors in the cluster. Then, as a visitor identifier (not necessarily the persistent identifier) enters the load balancer, a load balancer (e.g., the load balancer 2576 of FIG. 25) can calculate the partition to which that visitor can be assigned. This calculation can be a simple yet deterministic arithmetic modulus of the identifier's hash code (also deterministic).

For example, assume a cluster of four Visitor Processors. Each can manage one-fourth of the partitions. Assume a total partition count of 100. In this case, each Visitor Processor can be assigned 25 partitions as shown in Table 6:

TABLE 6

| VP1 | VP2 | VP3 | VP4 |
|---|---|---|---|
| Partitions 0-24 | Partitions 25-49 | Partitions 50-74 | Partitions 75-99 |

A partition can be deterministically determined from a unique identifier using an equation such as the following:

$$f(x) = h(x) \% N \qquad (1)$$

where x can be the visitor identifier, h(x) can be a deterministic hash code algorithm which converts an identifier into a numerical value, and N can be the number of visitor processors in the cluster.

Figure 30:
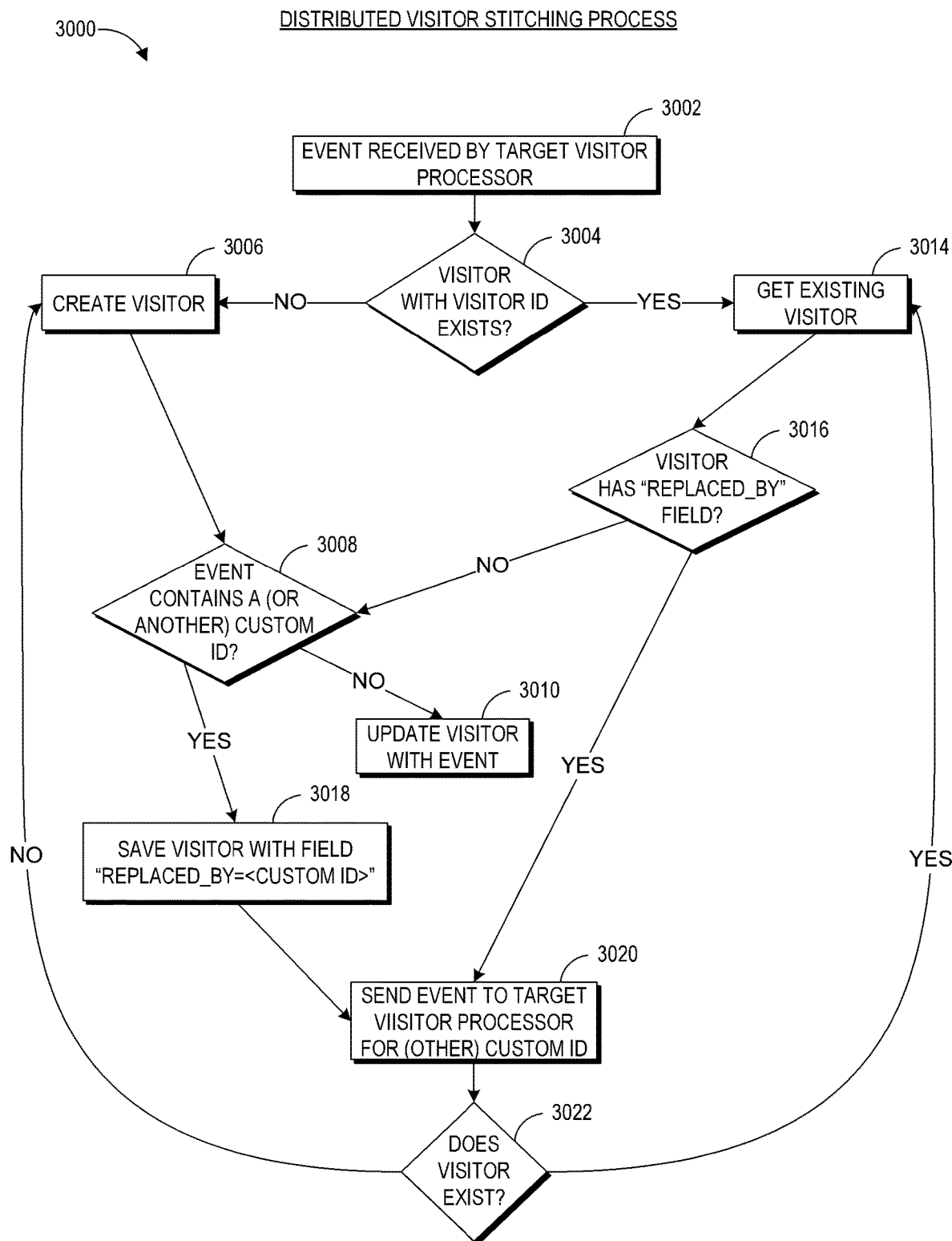
FIG. 30 depicts an embodiment of a distributed visitor stitching process.

With specific reference to FIG. 30, at block 3002, an event is received by a target visitor processor. The target visitor processor may be selected based on an initial hash of a visitor identifier associated with the event. If no visitor identifier or persistent identifier are associated with the event, the target visitor processor may be selected randomly or using another load-balancing algorithm (e.g., by the load balancer 2576 of FIG. 25).

At block 3004, the visitor processor checks to see if the visitor processing system has a live visitor in cache (or in the database) with the same visitor identifier. If not, at block 3006, the visitor processor creates a new visitor (e.g., visitor profile) with an initial visitor identifier at block 3006. From block 3006, the visitor processor determines at block 3008 whether the event contains a custom identifier, such as a persistent identifier. If not, the visitor processor can update the new visitor profile with information from the event at block 3010 and then end.

If the event does contain a custom identifier, the visitor processor can save the visitor with the new custom (or persistent) identifier replacing (or supplementing) the initial visitor identifier at block 3018. The visitor processor can then hash this persistent identifier and send the event to the target visitor processor based on the new hash at block 3020, assuming the hash results in a different partition than the original target visitor processor. This is done in an embodiment to ensure or attempt to ensure that future visits by the visitor can be sent to a single visitor processor partition for consistent hashing and consistent maintenance of a single, unified visitor profile.

Thereafter, the new visitor processor determines at block 3022 whether the visitor already exists in the new visitor processor. The visitor may already exist in this visitor processor if the visitor has supplied the same persistent identifier before. If not, the process proceeds to blocks 3006, 3008, and block 3010. Visitor stitching of the initial visitor created at block 3002 and the newly created visitor can occur at block 3006 in such a scenario. If the visitor already exists on the new visitor processor, the process proceeds to block 3014, where the existing visitor profile is retrieved. It is then determined whether the visitor profile already has a persistent identifier at block 3016, and if so, the visitor can continue to be processed by the new visitor processor at block 3020 (e.g., by updating the visitor profile with the event as in block 3010).

Returning again to the initial scenario of block 3004, if the visitor identifier does exist on the initial target visitor processor, the existing visitor can be retrieved at block 3014, and the process 3000 can flow through the blocks discussed above according to the flow shown in FIG. 30.

Thus, in certain embodiments, a solution to ensuring or attempt to ensure that visitor stitching operates correctly in a distributed environment can be to forward the event that contains a persistent identifier to a correct visitor processor based on the partition derived by the persistent identifier. This forwarding can include as a payload, the content of the live visitor represented by the originating visitor identifier. It may be tempting by a software developer to simply recognize the persistent identifier within the load balancer in addition to the standard visitor identifier and simply send the event to the correct visitor processor directly. But it should be noted that doing so might be less desirable in an embodiment, as this would skip and incorrectly ignore any ongoing live information collected so far within the initial target visitor processor represented by the standard visitor identifier. Nevertheless, such an approach can be used in other embodiments.

c. Example Visitor Stitching with Multiple Persistent Identifiers

It can be desirable to ensure or attempt to ensure that the visitor stitching process works as expected in the case a visitor can be associated with more than one persistent identifier. Some or all of the above examples demonstrate the case of a single persistent identifier. When an additional persistent identifier is presented, the visitor stitching process can extend and repeat the stitching process for every unique persistent identifier presented.

For example, assume the visitor that was stitched on a single persistent identifier from the above example:

TABLE 7A

| | |
|---|---|
| Visitor:<br>_acme_email_user@acme.com_<br>Visit: first<br>Events:<br>   event - timestamp 1<br>   event - timestamp 5<br>   event - timestamp 10<br>Visitor:<br>_acme_email_user@acme.com_<br>Visit: second<br>Events:<br>   event - timestamp 100<br>   event - timestamp 110<br>   event - timestamp 120<br>Visitor:<br>_acme_email_user@acme.com_<br>Account: acme<br>Visit: third<br>Events:<br>   event - timestamp 200<br>   event - timestamp 210 | Visitor: 1a<br>replaced_by:<br>_acme_email_user@acme.com_ |

Next, assume the visitor later returns for a fourth visit, and during the visit, the visitor presents a second identifier: facebookid='ABC'

TABLE 7B

| |
|---|
| Visitor: 1a<br>Account: acme<br>Visit: fourth<br>Events:<br>   event - timestamp 300<br>   event - timestamp 310 - supplies facebookid=ABC<br>   (visit not expired, that can be, this event has just been<br>   received) |

In this case, because the visitor stitching process can recognize the event field 'facebookid' as a persistent identifier, the visitor stitching process can occur again. However, this process does not occur in an embodiment until after the event has been associated with the_acme_email_user@acme.com_visitor. For example, the facebookid field may not be considered until after the event has been fully processed and associated with the correct visitor. Then additional identifiers can be considered.

Further, in order to correctly associate both persistent identifiers, the newly generated visitor identifier can consider both persistent identifiers. Recall that in the single persistent identifier case, the generated identifier resulted in _acme_email_user@acme.com_. Now in the case of multiple identifiers, some or all of them can be considered. In this case, yet another new identifier can be created by concatenating these identifiers as such:

_acme_email_user@acme.com_ + _acme_facebookid_ABC_ to produce:
_acme_email_user@acme.com acme_facebookid_ABC_

Note that the order of these identifiers may be non-random (or instead may be), and can be deterministic. This can be achieved by the order in which they were received (as they coincidentally show here), but instead may be concatenated in alphanumerical sort order for easier processing. This would result in the 'facebookid' field being appended to the end of the 'email' field.

The same visitor stitching process can then occur as in the above examples, and can then result in the following in Table 8:

TABLE 8

| | | |
|---|---|---|
| Visitor:<br>_acme_email_user@acme.com_<br>_acme_facebookid_ABC_<br>Visit: first<br>Events:<br>   event - timestamp 1<br>   event - timestamp 5<br>   event - timestamp 10<br>Visitor:<br>_acme_email_user@acme.com_<br>_acme_facebookid_ABC_<br>Visit: second<br>Events:<br>   event - timestamp 100<br>   event - timestamp 110<br>   event - timestamp 120<br>Visitor:<br>_acme_email_user@acme.com_<br>_acme_facebookid_ABC_<br>Account: acme<br>Visit: third<br>Events:<br>   event - timestamp 200<br>   event - timestamp 210<br>Visitor:<br>_acme_email_user@acme.com_<br>_acme_facebookid_ABC_<br>Account: acme<br>Visit: fourth<br>Events:<br>   event - timestamp 300<br>   event - timestamp 310 | Visitor:<br>_acme_email_user<br>@acme.com_<br><br>replaced_by:<br>_acme_email_user<br>@acme.com_acme<br>_facebookid_ABC_ | Visitor: 1a<br>replaced_by:<br>_acme_email_user@ac<br>me.com_acme_facebo<br>okid_ABC_ |

Note that Visitor 1a has now been updated with the correct 'replaced_by' field, so that future events can be forwarded to the correct multi-stitched visitor. Additionally, the original stitched visitor, _acme_email_user@acme.com_, has also been updated to reflect the further second stitching resulting in the visitor_acme_email_user@acme.com_acme_facebookid_ABC_.

V. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Disjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for configuring gathering of data indicative of user interactions with a content page, the system comprising:
   one or more hardware processors configured to generate one or more user interfaces comprising functionality for a configuration user to:
     identify a plurality of data collection tags that are available to associate with a tag container, the plurality of data collection tags comprising instructions that, when executed by a user system, cause the user system to gather the data indicative of the user interactions with the content page and transmit the data indicative of the user interactions via a computer network,
     associate one or more of the plurality of data collection tags with the tag container responsive to a selection of the one or more of the plurality of data collection tags by the configuration user,
     map data sources in the content page to data sources gathered by the one or more of the plurality of data collection tags to designate the data sources in the content page from which at least some of the data indicative of the user interactions are gathered, and
     define conditional logic to be applied to at least some of the data indicative of the user interactions, the conditional logic being configured to transform the at least some of the data indicative of the user interactions to generate attribute data denoting a trait of the user interactions; and
   a memory device in communication with the one or more hardware processors, the memory device being configured to store the one or more user interfaces.

2. The system of claim 1, wherein the one or more user interfaces comprise functionality for the configuration user to associate two or more of the plurality of data collection tags with the tag container responsive to a selection of the two or more of the plurality of data collection tags by the configuration user.

3. The system of claim 1, wherein the one or more hardware processors are configured to output the one or more user interfaces for presentation to the configuration user on a display via a browser.

4. The system of claim 1, wherein the one or more user interfaces comprise functionality for the configuration user specify a name for one of the data sources in the content page.

5. The system of claim 1, wherein the one or more user interfaces comprise functionality for the configuration user specify a type associated with one of the data sources in the content page.

6. The system of claim 5, wherein the type is a data object associated with one of the data sources in the content page.

7. The system of claim 5, wherein the type is a script variable associated with one of the data sources in the content page.

8. The system of claim 5, wherein the type is a meta tag associated with one of the data sources in the content page.

9. The system of claim 5, wherein the type is a query string parameter associated with one of the data sources in the content page.

10. The system of claim 5, wherein the type is a cookie value.

11. The system of claim 1, wherein the one or more user interfaces comprise functionality for the configuration user to query the data indicative of the user interactions and the attribute data.

12. A method for configuring gathering of data indicative of user interactions with a content page, the method comprising:
  generating, by one or more hardware processors, one or more user interfaces comprising functionality for a configuration user to:
    identify a plurality of data collection tags that are available to associate with a tag container, the plurality of data collection tags comprising instructions that, when executed by a user system, cause the user system to gather the data indicative of the user interactions with the content page and transmit the data indicative of the user interactions via a computer network,
    associate one or more of the plurality of data collection tags with the tag container responsive to a selection of the one or more of the plurality of data collection tags by the configuration user,
    map data sources in the content page to data sources gathered by the one or more of the plurality of data collection tags to designate the data sources in the content page from which at least some of the data indicative of the user interactions are gathered, and
    define conditional logic to be applied to at least some of the data indicative of the user interactions, the conditional logic being configured to transform the at least some of the data indicative of the user interactions to generate attribute data denoting a trait of the user interactions; and
  storing, by a memory device, the one or more user interfaces.

13. The method of claim 12, wherein the one or more user interfaces comprise functionality for the configuration user to associate two or more of the plurality of data collection tags with the tag container responsive to a selection of the two or more of the plurality of data collection tags by the configuration user.

14. The method of claim 12, further comprising outputting the one or more user interfaces for presentation to the configuration user on a display.

15. The method of claim 12, wherein the one or more user interfaces comprise functionality for the configuration user specify a type associated with one of the data sources in the content page.

16. The method of claim 15, wherein the type comprises a data object or a script variable associated with one of the data sources in the content page.

17. The method of claim 12, wherein the one or more user interfaces comprise functionality for the configuration user to query the data indicative of the user interactions and the attribute data.

18. The method of claim 12, wherein the one or more user interfaces comprise functionality for the configuration user to filter visitor data for the content page according to the attribute data.

19. Non-transitory physical computer storage comprising computer-executable instructions stored thereon that, when executed by one or more processors, are configured to implement a process for managing gathering of data indicative of user interactions with a content page, the process comprising:
  generating one or more user interfaces comprising functionality for a configuration user to:
    identify a plurality of data collection tags that are available to associate with a tag container, the plurality of data collection tags comprising instructions that, when executed by a user system, cause the user system to gather the data indicative of user interactions with the content page and transmit the data indicative of the user interactions via a computer network,
    associate one or more of the plurality of data collection tags with the tag container responsive to a selection of the one or more of the plurality of data collection tags by the configuration user,
    map data sources in the content page to data sources gathered by the one or more of the plurality of data collection tags to designate the data sources in the content page from which at least some of the data indicative of the user interactions are gathered, and
    define conditional logic to be applied to at least some of the data indicative of the user interactions, the conditional logic being configured to transform the at least some of the data indicative of the user interactions to generate attribute data denoting a trait of the user interactions; and
  outputting the one or more user interfaces for presentation to the configuration user on a display.

20. The non-transitory physical computer storage of claim 19, wherein the one or more user interfaces comprise functionality for the configuration user specify a name and a type for one of the data sources in the content page.

* * * * *